(12) United States Patent
Rolfe et al.

(10) Patent No.: US 8,317,257 B2
(45) Date of Patent: Nov. 27, 2012

(54) BODY FOR PNEUMATIC VEHICLE

(75) Inventors: Bernard Frank Rolfe, Kensington (AU); Timothy Ian De Souza, Marshall (AU); Gregory Ryan Pitts, Belmont (AU); Stuart James McFarlane Hanafin, Leopold (AU); Steven Lewis Anthony Agius, St. Leonards (AU); Benjamin Paul Adamson, Bannockburn (AU); Michael Pio Gordon Pereira, Clarinda (AU); Timothy John Black, Belmont (AU); Christopher James Hurren, Winchelsea (AU); Noel Egan Miller, Ocean Grove (AU)

(73) Assignee: Deakin University, Vic (AU)

( * ) Notice: Subject to any disclaimer, the term of this patent is extended or adjusted under 35 U.S.C. 154(b) by 1073 days.

(21) Appl. No.: 12/240,391

(22) Filed: Sep. 29, 2008

(65) Prior Publication Data

US 2010/0078254 A1    Apr. 1, 2010

(51) Int. Cl.
*B60J 7/00* (2006.01)

(52) U.S. Cl. .............. 296/193.06; 296/193.04; 296/204; 296/96.12; 280/831

(58) Field of Classification Search ................. 296/35.1, 296/901.01, 181.1, 181.3, 193.04, 193.06, 296/204, 205, 96.12; 180/65.3; 280/831
See application file for complete search history.

(56) References Cited

U.S. PATENT DOCUMENTS

| | | | |
|---|---|---|---|
| 1,902,124 A | 3/1933 | Halloran | |
| 2,346,123 A | 4/1944 | Willson | |
| 3,869,017 A | 3/1975 | Feustel et al. | |
| 3,925,984 A | 12/1975 | Holleyman | |
| 4,355,508 A | 10/1982 | Blenke et al. | |
| 4,361,204 A | 11/1982 | Earle | |
| 4,453,763 A * | 6/1984 | Richards | 296/181.2 |
| 4,573,546 A | 3/1986 | Irimajiri et al. | |
| 5,009,463 A * | 4/1991 | Saitoh et al. | 296/210 |
| 5,248,011 A | 9/1993 | Richards | |
| 5,460,239 A | 10/1995 | Jensen | |

(Continued)

FOREIGN PATENT DOCUMENTS

EP    1092612 A2    4/2001

(Continued)

OTHER PUBLICATIONS

U.S. Office Action for U.S. Appl. No. 12/240,497, mailed Jun. 1, 2011, 10 pages.

(Continued)

*Primary Examiner* — Joseph Pape
(74) *Attorney, Agent, or Firm* — Brooks Kushman P.C.; Frank A. MacKenzie

(57) ABSTRACT

A pneumatic vehicle is provided with a first and second sub-assembly. The first sub-assembly has a chassis supporting an air tank. The second sub-assembly has part of the vehicle body and is bonded to the first-sub-assembly using a structural adhesive. Another pneumatic vehicle is provided with a first and second sub-assembly. The first sub-assembly has a chassis, air tank, part of the vehicle body, a pair of B-pillars, and a pair of rear rails. The second sub-assembly has a part of the vehicle body, a pair of A-pillars, and a pair of roof rails. A vehicle seat is provided with a seat base and upright seat back providing a seating area. A bladder located in the central region of the seating area inflates to provide two bucket seats, and deflates to provide a bench seat. The vehicle seat also has inflatable inserts to provide cushioning.

15 Claims, 62 Drawing Sheets

LOWER VEHICLE STRUCTURE EXPLODED VIEW

U.S. PATENT DOCUMENTS

| | | | |
|---|---|---|---|
| 5,964,490 A * | 10/1999 | Schroeder et al. | 296/35.1 |
| 6,149,844 A | 11/2000 | Graham | |
| 6,560,872 B2 | 5/2003 | Morrison et al. | |
| 6,629,573 B1 | 10/2003 | Perry | |
| 6,749,039 B1 | 6/2004 | Uphaus | |
| 6,883,629 B2 | 4/2005 | Hanagan | |
| 7,306,692 B2 | 12/2007 | Graham | |
| 7,315,089 B2 | 1/2008 | Lambertson | |
| 7,347,477 B2 * | 3/2008 | Carty | 296/65.03 |
| 7,543,672 B2 | 6/2009 | Codere et al. | |
| 7,819,220 B2 | 10/2010 | Sunsdahl et al. | |
| 8,056,928 B2 | 11/2011 | Ijaz et al. | |
| 2003/0089545 A1 | 5/2003 | Seksaria et al. | |
| 2003/0230443 A1 | 12/2003 | Cramer et al. | |
| 2004/0035625 A1 | 2/2004 | Talbot et al. | |
| 2004/0163875 A1 | 8/2004 | Chernoff et al. | |
| 2005/0098373 A1 | 5/2005 | Horii | |
| 2005/0211480 A1 | 9/2005 | Kejha | |
| 2006/0027406 A1 | 2/2006 | Borroni-Bird et al. | |
| 2006/0214415 A1 | 9/2006 | Rife et al. | |
| 2006/0260860 A1 | 11/2006 | Byers et al. | |
| 2007/0137919 A1 | 6/2007 | Jolley | |
| 2008/0284124 A1 | 11/2008 | Brady et al. | |
| 2010/0078253 A1 | 4/2010 | Rolfe et al. | |

FOREIGN PATENT DOCUMENTS

| | | |
|---|---|---|
| GB | 2093917 A | 9/1982 |
| GB | 2434978 A | 8/2007 |
| JP | 2003118634 A | 4/2003 |
| JP | 2008068808 A | 3/2008 |
| WO | 99/11507 A1 | 3/1999 |
| WO | 02/058916 A1 | 8/2002 |
| WO | 2006/099671 A1 | 9/2006 |
| WO | 2007/003011 A1 | 1/2007 |
| WO | 2007/022593 A1 | 3/2007 |
| WO | 2007111581 A1 | 10/2007 |

OTHER PUBLICATIONS

International Search Report and Written Opinion for copending Application No. PCT/IB2009/006502, mailed Jan. 4, 2010, 20 pages.
The Wall Street Journal, Ford's China Sales Were Brisk in '05; Outlook is Bright Jan. 17, 2006, 2 pages.
Webb, Alysha, "Ford May Build Fiesta, Mazda2 in Nanjing", Automotive News, Aug. 2, 2004 http://www.autonews.com/apps/pbcs.dll/article?AID=/20040802/SUB/408020753, 3 pages.
Wikipedia—Beijing article, http://en/wikipedia.org/wiki/Beijing, Aug. 7, 2007, 27 pages.
Wikipedia—Shanghai article, http://en.wikipedia.org/wiki/Shanghai, Aug. 8, 2007, 21 pages.
Wikipedia—Tiananmen Square article, http://en.wikipedia.org/wiki/Tiananmen Square, Aug. 3, 2007, 4 pages.
The World Bank, "An Overview of China's Transport Sector—2007" Final Report, Dec. 19, 2007. Easte Working Paper No. 15, 66 pages.
World Resource Foundation, "Life Cycle Analysis and Assessment", Aug. 13, 2007 from http://www.gdrc.org/uem/waste/life-cycle.html, 5 pages.
Zhang, Yu, et al., "Lightweight Design of Automotive Front Side Rail Based on Robust Optimization", Thin-Walled Structures 45, (Jul./Aug. 2007) pp. 670-676.
U.S. Environmental Protection Agency, "Clean Alternative Fuels: Compressed Natural Gas", EPA 420-F-00-033, Mar. 2002, 2 pages.
KPMG, "Momentum Driving Forces in China's Car Market" Dec. 2007, 20 pages.
Daniel Lockton, "Wheelchair Drive", May 14, 2004, 170 pages.
http://www.cool-cars.biz/MDI-aircar.html, "MDI Air Car", 2006, 2 pages.
http://www.robots-dreams.com/2004/12/a_tutorial_and_.html, "Robots Dreams: Differential Steering System—A Tutorial", posted on Dec. 15, 2004, 5 pages.
http://westminsterresearch.wmin.ac.uk/5292/, "The performance of a power pack for a compressed air driven vehicle", Jan. 10-11, 2007, 1 page.
http://media.mitsubishi-motors.com/pressrelease/e/corporate/detail1380.html, "Mitsubishi Motors to unveil Mitsubishi Concept-CT MIEV hybrid sport compact and new Eclipse Spyder convertible at 2006 Detroit Motor Show", Dec. 5, 2005, 2 pages.
The Mars Society Australia, "Mars Analog Rover Initiative Design Competition", 2000, 37 pages.
"Aircar", http://aefc.itu.edu.tr/term_papers_2006_2007_fall/aerocar.doc, Jan. 26, 2007, 38 pages.
Office Action for U.S. Appl. No. 12/240,497, mailed Dec. 8, 2011, 12 pages.
Australian Government—Dept. of the Environment, "Environmental Impact of End-of-Life Vehicles: An Information Paper", 2002, 3 pages.
Australian Govt., "Consumption and the Environment", Environmental Economics Seminar Series, 1996 http://www.environment.gov.au/archive/about/publications/economics/consumption/index.html, 59 pages.
Auto Parts Recyclers Association of Australia, "Environmental Issues", Aug. 29, 2007 from http://www.apraa.com/EnvironmentalIssues, 2 pages.
Bauer Group, Bauer Kompressoren Group—Bauer Compressors, Sep. 23, 2007 from http://www.bauer-kompressoren.de/en/index.php, 2 pages.
Bossel, Ulf, "Thermodynamic Analysis of Compressed Air Vehicle Propulsion", European Fuel Cell Forum, Oberrohrdorf, Switzerland, Jun. 30, 2005, 13 pages.
Braess, Hans-Hermann, et al., Handbook—HB 207.3:2005—Environmental Management—Part 3: Life Cycle Impact Assessment—Examples of Application of ISO 14042, 2005, 20 pages.
Cavalieri, Sergio, et al., "Parametric vs. Neural Network Models for the Estimation of Production Costs, et al.", Int. J. Production Economics 91 (2004) pp. 165-177.
China Daily, "China ends 'bicycle kingdom' As Embracing Cars", Nov. 11, 2004, 3 pages.
China—Macroeconomic Data and Forecasts, Business Monitor International Ltd., 3rd Quarter 2008, 2 pages.
chinatoday.com, Xu, Xiaoyan, "Ford Autos and the Environment" 2006, 2 pages.
Chow, Namrita "Ford Motor China", Automotive News Europe; Apr. 14, 2008 Supplement, vol. 13, p. 10-10, 3 pages.
Conway-Schempf, Noellette, et al., "2-Life Cycle Assessment—A Synopsis", Carnegie Mellon Univ., Pittsburgh, PA 2001, 16 pages.
Das, Sanchoy K., "21-Product Disassembly and Recycling in the Automotive Industry", New Jersey Institute of Technology, Newark, NJ 2001, 23 pages.
Datamonitor—Ford Motor Company, Company profile, Nov. 19, 2007, 11 pages.
Elaco Pty. Ltd., Advertisement Aug. 31, 2007 from http://www.elaco.com.au/, 1 page.
Engineair Pty. Ltd., "Zero-Pollution", Sep. 5, 2007, 1 page.
Euro NCAP, Belgium "Frontal Impact", Test Procedures Jun. 22, 2007 from http://www.euroncap.com/tests/frontimpact.aspx, 2 pages.
Gelb, Catherine, "Ford's China Ambitions", The China Business Review, Jan.-Feb. 2004, p. 28-31.
ISO 9141—"Road Vehicles—Diagnostic Systems—Requirements for Interchange of Digital Information" Oct. 1, 1989, 15 pages.
ISO 9141-2—"Road Vehicles—Diagnostic Systems—Part 2: CARB requirements for interchange of digital information", Feb. 1, 1994, 20 pages.
ISO 14040:1998—Australian/New Zealand Standard, Environmental Management, et al., Mar. 1998, 18 pages.
ISO 14044—"Environmental management—Life Cycle Assessment—Requirements and Guidelines" Jul. 1, 2006, 52 pages.
ISO 14047—Environmental Management—Life Cycle Assessment—Principles and Framework, SAI Global Ltd., NY, NY (2003), 48 pages.
LIN (Local Interconnect Network) Subbus, News & Events Jun. 29, 2007 from http://www.lin-subbus.org/, 1 page.
Lincoln Institute of Land Policy, Urban Spatial Patterns and Infrastructure in Beijing (Land Lines Article), Author: Yan Huang, Oct. 2004, vol. 16, No. 4, 4 pages.

Lindgren, M., "Cold Roll Forming of a U-Channel Made of High Strength Steel", Journal of Materials Processing Technology, 186 (May 2007) pp. 77-81.
MacCartney, Jane, "Beijing Population at Saturation", The Australian, Aug. 23, 2007, 1 page.
Mouawad, Jad, "The Big Thirst", The New York Times, Apr. 20, 2008, 4 pages.
Natural Gas.org, "Natural Gas and the Environment", 2004, http://www.naturalgas.org/environment/naturalgas.asp, 5 pages.
Ortic AB, "Valkommen till ORTIC", Sep. 15, 2007 from http://www.ortic.se/, 1 page.
Pan Haixiao, "Shanghai from Dense Mono-Center to Organic Poly-Center Urban Expansion", Dept. of Urban Planning, Tongji Univ., Shanghai, China—IGES—http://www.iges.or.jp/en/us/pdf/activity03/BAQ_IGES_Pa.pdf, Dec. 2006, 22 pages.
"The People of China" Energy Information Administration, U.S. Dept. of Energy, Aug. 24, 2007 from http://www.eia.doe.gov/emeu/cabs/china/part1.htm, 8 pages.
PHILL brochure—"Fuel Your Car at Home", Sep. 23, 2007 from http://www.myphill.com/index.htm, 2 pages.
Quella, Ferdinand, Integrating Environmental Aspects into Product Design and Development, The New ISO TR 14062—Part 1:, Design for Environment, Feb. 17, 2003, p. 1-2.
Quella, Ferdinand, et al., Integrating Environmental Aspects into Product Design and Development, The New ISO TR 14062—Part 2:; Design for Environment, Mar. 17, 2003, p. 1-7.
Quickstep Technologies Pty. Ltd., "RST Demo—Resin Spray Transmission (RST)", 2005, 2 pages.
Robert Q. Riley Enterprises, Product Design & Development, Aug. 26, 2007 from http://www.rqriley.com/, 1 page.
Roy, Rajkumar, et al., "Estimating the Cost of a New Technology Intensive Automotive Product: A Case Study Approach", Int. J. Production Economics 97 (2005) pp. 210-226.
Sadagopan, Sriram, et al., "Formability Characterization of a New Generation of High Strength Steels", May 2003, AISI/DOE Technology Roadmap Program, 171 pages.
The Sailing Shark Adventures, "Cylinder Fills and Safety", http://www.thesailingsharkadventures.com/html/cylinder_fills_and_safety.html—Applicant Admitted Prior Art, 3 pages, Dec. 8, 2008.
Schmidt, Wulf-Peter, "Ford of Europe's Product Sustainability Index", 13th CIRP International Conference on Life Cycle Engineering, Proceeds of LCE2006, May 2006, pp. 5-10.
Scotts Performance Products brochure, Aug. 21, 2007, 1 page.
Sonnemann, N., Castells, C., & Schuhmacher, M. (2004) Integrated Life-Cycle and Risk Assessment for Industrial Processes, CRC Press LLC, NY, NY, 37 pages.
Sullivan, John L., "Life Cycle Assessment-15", 2001, 39 pages.
Urban Age, "Shanghai: The Fastest City?" Oct. 18, 2005 from http://www.urban-age.net/03_conferences/conf_shanghai.html, 2 pages.
U.S. Energy Information Administration, Dept. of Energy, "China: An Energy Sector Overview" Report Oct. 28, 1997, 30 pages.
Vehicle Standards Information #26, Vic Roads "Roadworthiness Requirements", (Australian Design Regulations) Jun. 2001, pp. 1-12.
Verrey, J., et al., "Manufacturing Cost Comparison of Thermoplastic and Thermoset RTM for an Automotive Floor Pan", Composites: Part A 37 (2006) pp. 9-22.

* cited by examiner

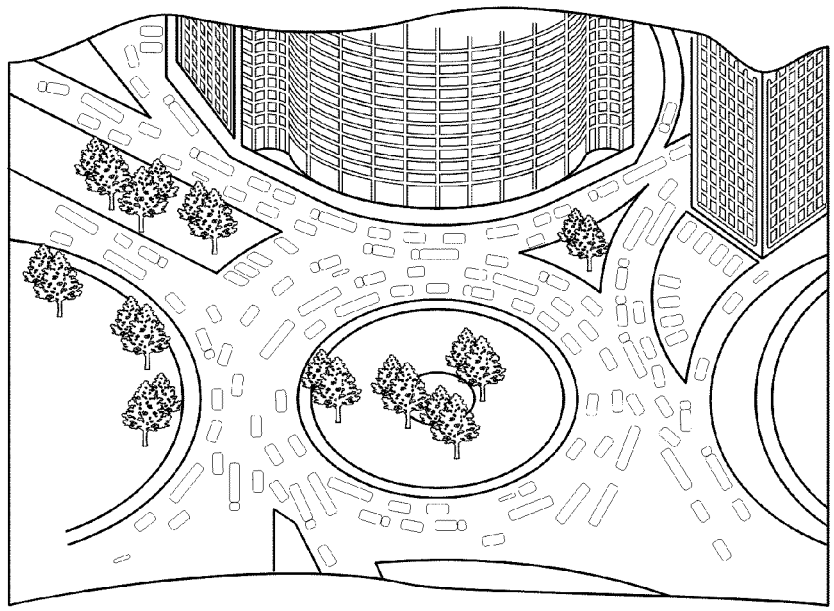

GRID LOCK IN THE
EMERGING METROPOLISES

FIG. 1

| Vehicle Attributes | Not Competive | Standard | Competitive | Class Leader | Imp. |
|---|---|---|---|---|---|
| Performance | ██████████ | | | | 4 |
| Vehicle Handling Performance | █████ | | | | 5 |
| Maneuverability | ▒▒▒▒▒▒▒▒▒▒▒▒▒▒▒▒▒▒▒▒ | | | | 1 |
| Environmentally Friendly | ▒▒▒▒▒▒▒▒▒▒▒▒▒▒▒▒▒▒▒▒ | | | | 1 |
| Cost | ▒▒▒▒▒▒▒▒▒▒▒▒▒▒▒▒ | | | | 2 |
| Ongoing Costs | ███████████████ | | | | 4 |
| Manufacturability | ▒▒▒▒▒▒▒▒▒▒▒▒▒▒▒▒▒▒ | | | | 1 |
| Innovative | ████████████████████ | | | | 2 |
| Lightweight | ▒▒▒▒▒▒▒▒▒▒▒▒▒▒▒▒▒▒▒▒ | | | | 1 |
| Styling | ████████████████████████ | | | | 3 |
| Practicality | ████████████████████████ | | | | 2 |
| Material Innovation | ▒▒▒▒▒▒▒▒▒▒▒▒▒▒▒▒▒▒▒▒▒▒▒▒ | | | | 1 |
| Safety | ████████████████████████ | | | | 3 |
| Customizable | ████████████████████████ | | | | 3 |

VEHICLE ATTRIBUTE RANKING

FIG. 2

| Powertrain | Geometry | Vehicle Performance | Safety | Cost |
|---|---|---|---|---|
| Engine/Type | No of Occupants | Max Speed (km/h) | ABS | RRP (USD$) |
| Engine Capacity (cc) | Doors | Accl 0-100 km/h (sec) | EPS | |
| Power (kW) | Wheels - front | Brakes | Driver Airbag | |
| Torque (Nm) | Wheel - rear | Front | Passenger Airbag | |
| Bore x Stroke | Tires - front | Rear | Alternate Airbags | |
| Compression Ratio | Tires - rear | | Euro NCAP Rating | |
| Engine Position | Length (mm) | | | |
| Drive | Width (mm) | | | |
| Transmission | Height (mm) | | | |
| Fuel Type | Track - front (mm) | | | |
| Fuel Capacity | Track - rear (mm) | | | |
| Fuel Consumption (combined) (1/100km) | Wheelbase (mm) | | | |
| Carbon Emission (g/km) | Turning Circle (m) | | | |
| | Weight (curb) | | | |

SYSTEM DECOMPOSITION METRICS

FIG. 3

FIG. 4 — CONSUMER NEEDS – METRICS MATRIX

| | Metric | 1 Vehicle Top Speed | 2 Vehicle Acceleration | 3 Engine Power | 4 Engine Torque | 5 Weight Distribution | 6 Turning Radius | 7 Wheelbase | 8 Length | 9 Width | 10 Height | 11 Weight | 12 Fuel Consumption | 13 Carbon Emissions | 14 Vehicle Cost | 15 Aerodynamic Efficiency | 16 Styling | 17 No. of Occupants | 18 Storage Space | 19 Safety Standard (EURO NCAP) | 20 ABS | 21 Airbags |
|---|---|---|---|---|---|---|---|---|---|---|---|---|---|---|---|---|---|---|---|---|---|---|
| | Vehicle Attributes/Needs | | | | | | | | | | | | | | | | | | | | | |
| 1 | Performance | • | • | • | • | | | | | | | | | | | | | | | | | |
| 2 | Vehicle Handling Performance | | | | | • | • | • | • | • | • | • | | | | | | | | | • | |
| 3 | Maneuverability | | | | | • | • | • | • | • | • | • | | | | | | | | | | |
| 4 | Environmentally Friendly | | | | | | | | | | | • | • | • | | • | | | | | | |
| 5 | Cost | | | | | | | | | | | | | | • | | | | | | | |
| 6 | Ongoing Costs | | | | | | | | | | | | • | • | • | | | | | | | |
| 7 | Manufacturability | | | | | | | | | | | • | | | • | | | | | | | |
| 8 | Innovative | | | | | | | | | | | | | | • | | | | | | | |
| 9 | Lightweight | | | | | | | | | | | • | | | | | | | | | | |
| 10 | Styling | | | | | | | | | | | | | | | • | • | | | | | |
| 11 | Practicality | | | | | | | | | | | | | | | | | • | • | | | |
| 12 | Material Innovation | | | | | | | | | | | • | | | • | | | | | | | |
| 13 | Safety | | | | | | | | | | | | | | | | | | | • | • | • |
| 14 | Customizable | | | | | | | | | | | | | | | | | | • | | | |

FIG. 5A

| Technical Data | Vehicles | | | | | |
|---|---|---|---|---|---|---|
| | Pneumatic Vehicle | Smart fortwo - 2008 | Tata Nano | Hyundai i10 - 2008 | Toyota Yaris - 2008 | Toyota IQ - 2009 * |
| | | | | | | * Scheduled 2009 release |
| Powertrain | | | | | | |
| Engine/Type | Twin Rotary Compressed Air Motors | 3 cyl inline | 2 cyl inline Bosch | 4 cyl inline | 4 cyl / DOHC / 4v | |
| Engine Capacity (cc) | 2 x 6 x 2 = 532 | 999 | 623 | 1086 | 1299 | 1500 |
| Power (kW) | 78 | 52 | 24 | 49 | 63 | |
| Torque (Nm) | 90 | 92 | 48 | 101 | 121 | |
| Bore x Stroke | N/A | 72 x 81.8 | 73.5 x 73.5 | 67 x 77 | 75 x 73.5 | |
| Compression Ratio | | 11.4:1 | 9.5:1 | 10.1:1 | 10.5:1 | |
| Engine Position | Integrated into Wheel Hub | Rear | Rear | Front | Front | Front |
| Drive | | Front | Rear | Front | Front | Front |
| Transmission | Not Required | Automated manual 5 spd | 4 spd synchromesh | 5 spd man | 5 spd man / 4 spd Auto | Automated manual 5 Speed |
| Fuel Type | Natural Gas | Premium Unleaded (95RON) | Unleaded | Unleaded | Unleaded (91RON) | Unleaded |
| Fuel Capacity | 60 L (Air) / 2.2 L (NG) | 33 | 15 | 35 | 42 | TBA |
| Fuel Consumption (combined) | | | | | | |
| (l/100km) | TBA | 4.7 | 5 | 4.7 | 6.5 | TBA |
| Carbon Emission (g/km) | 6.84 | 112 | 130 | 119 | 141 | 100 |
| Vehicle Performance | | | | | | |
| Max Speed (km/h) | 120 | 145 | 105 | 152 | 175 | TBA |
| Accl 0-100 km/h (sec) | 16 | 13.3 | approx 15-17s | 15.6 | 12.1 | TBA |
| Brakes | | | | | | |
| Front | Discs | Discs | Discs | Disc | Discs | Disc |
| Rear | Regenerative Braking | Drum | Drum | Drum | Drum | Drum |
| Geometry | | | | | | |
| No of Occupants | 3 / 2+2 | 2 | 5 | 5 | 5 | 3+1(child) |
| Doors | 2 | 2 | 4 | 4 | 2 | 3 |
| Wheels - front | 17 x 6.0 | 15 x 5.0 | 12 | 13 x | 14 x 5.0 | 16 |
| Wheel - rear | 17 x 6.0 | 15 x 6.5 | 12 | 13 x | 14 x 5.0 | 16 |
| Tyres - front | 165/35R17 | 175/55R15 | 135x70R12 | 155x80R13 | 175x65R14 | |
| Tyres - rear | 185/35R17 | 195/50R15 | 155x65R12 | 155x80R13 | 175x65R14 | |
| Length (mm) | 3250 | 2695 | 3100 | 3565 | 3750 | 2985 |
| Width (mm) | 1673 | 1559 | 1500 | 1595 | 1695 | 1680 |
| Height (mm) | 1340 | 1542 | 1600 | 1540 | 1530 | 1500 |
| Track - front (mm) | 1500 | 1283 | 1325 | 1400 | 1480 | |
| Track - rear (mm) | N/A | 1385 | 1315 | 1385 | 1470 | |
| Wheelbase (mm) | 2500 | 1867 | 2230 | 2380 | 2460 | 2000 |
| Turning Circle (m) | 0 | 8.75 | NA | 9.5 | 9.4 | |
| Weight-kerb (no driver unladen) | 365 | 730 | 580 | 980 | 1035 | 870 |
| Safety | | | | | | |
| ABS | Std | Std | No | Std | Std | |
| ESP | Std | Std | No | Opt on uppr model | No | |
| Driver Airbag | Std | Std | Opt | Std | Std | |
| Passenger Airbag | Std | Std | Opt | Std | Std | |
| Alternate Airbags | Std | Std | Opt | Opt on uppr model | Opt | |
| Euro NCAP Rating | 4 star proposed | 3 | 4 | | 5 | |
| Cost | | | | | | |
| RRP (USD$) | 7000 | 11590 | 2500 | 8500 | 11350 | 13,000 |
| Regional Release | Asia India China - Worldwide | European - Worldwide | Indian Market - Europe/Australia | Indian Market - exports to Asia Europe & Middle East | Australia/Japan/Europe | Japanese - European Market |

| Technical Data | Mitsubishi I - 2005 | Chevrolet Spark* | Vehicles Chery QQ3 | Maruti 800 Duo | Daihatsu Trevis |
|---|---|---|---|---|---|
| | | *Previously Daewoo Matiz | | | |
| Powertrain | | | | | |
| Engine/Type | 3 cyl Inline DOHC MIVEC 12v Turbo | 3 cyl in line | 3 cyl in line | 3 cyl in line | 3 cyl in line |
| Engine Capacity (cc) | 660 | 795 | 812 | 796 | 989 |
| Power (kW) | 42 | 38 | 38 | (Petrol) 28 | 43 |
| Torque (Nm) | 85 | 69 | 70 | (Petrol) 59 | 91 |
| Bore x Stroke | 65.4 x 65.4 | 68.5 x 72 | 72 x 65.5 | 66.5 x 72 | 71 x 84 |
| Compression Ratio | 8.8:1 | 9.3:1 | 9.5:1 | 8.8:1 | 10.0:1 |
| Engine Position | Mid | Front | Front | Front | Front |
| Drive | Rear | Front | Front | Front | Front |
| Transmission | 4 spd CVT Automatic | 5 Speed Manual | 4 Speed Manual | 4 Speed Manual | 5 speed Manual |
| Fuel Type | Unleaded | Unleaded | Unleaded | Duel Fuel Unleaded Petrol/LPG | Unleaded 95 |
| Fuel Capacity | 35 | 35 | 35 | 28 Petrol/19.2LPG | 36 |
| Fuel Consumption (combined) (l/100km) | 5.2 | 5.2 | 5.6 | 5 | 5.1 |
| Carbon Emission (g/km) | 114 | 137 | Euro III Compliant | 119 | 114 |
| Vehicle Performance | | | | | |
| Max Speed (km/h) | 135 | 145 | 130 | 130 | 160 |
| Accl 0-100 km/h (sec) | 14.9 | 18.2 | NA | 20 | 11.1 |
| Brakes | | | | | |
| Front | Disc 13" | Disc | Disc | Disc | Disc |
| Rear | Drum 8" | Drum | Drum | Drum | Drum |
| Geometry | | | | | |
| No of Occupants | 4 | 5 | 4 | 4 | 4 |
| Doors | 4 | 4 | 4 | 4 | 5 |
| Wheels - front | 15 x 4 | 13 | 13 | 12 | 13 |
| Wheel - rear | 15 x 5 | 13 | 13 | 12 | 13 |
| Tyres - front | 145x65R15 | 155x70R13 | 155x65R13 | 145x70R12 | 145x80R13 |
| Tyres - rear | 175x55R15 | 155x70R13 | 155x65R13 | 145x70R12 | 145x80R13 |
| Length (mm) | 3395 | 3495 | 3550 | 3335 | 3410 |
| Width (mm) | 1475 | 1495 | 1495 | 1440 | 1475 |
| Height (mm) | 1600 | 1518 | 1485 | 1405 | 1500 |
| Track - front (mm) | 1300 | 1315 | 1295 | 1215 | 1320 |
| Track - rear (mm) | 1280 | 1300 | 1260 | 1200 | 1300 |
| Wheelbase (mm) | 2550 | 2345 | 2340 | 2175 | 2375 |
| Turning Circle (m) | 9 | 9.36 | 10 | 8.8 | 8.4 |
| Weight-kerb (no driver unladen) | 900 | 795 | 860 | 683 | 790 |
| Safety | | | | | |
| ABS | Std | Optional | Std | Not Provided | Std |
| ESP | No | No | Std | Not Provided | Std |
| Driver Airbag | Std | No | Std | Not Provided | Std |
| Passenger Airbag | Std | No | Std | Not Provided | Std |
| Alternate Airbags | NA | NA | NA | Not Provided | Not Provided |
| Euro NCAP Rating | 4 | 3 | 0 | 4 | 5 |
| Cost | | | | | |
| RRP (USD$) | 18,000 | 8,695 | 5,000 | 5,200 | 6,715 |
| Regional Release | Japan - Asia - UK | European Africa Asia | Asia | India | Asia Europe |

FIG. 5B

| Metric No. | Need No. | Metrics | Imp. | Unit | Marginal Value | Ideal Value |
|---|---|---|---|---|---|---|
| 1 | 1 | Vehicle Top Speed | 4 | km/h | 100 km/h | >110 km/h |
| 2 | 1 | Vehicle Acceleratin | 4 | s(0-100km/h | <15s | 10-13s |
| 3 | 1 | Engine Power | 4 | kW | >20 | 30 |
| 4 | 1 | Engine Torque | 4 | Nm | >40 | 50 |
| 5 | 2,3 | Weight Distribution (F-R) | 3 | % | 35-65 | 50-50 |
| 6 | 2,3 | Turning Radius | 2 | m | <9 | 8 |
| 7 | 2,3 | Wheelbase | 2 | mm | <2000 | 1860 |
| 8 | 2,3 | Length | 2 | mm | <2700 | 2600 |
| 9 | 2,3 | Width | 2 | mm | <1600 | 1500 |
| 10 | 2,3 | Height | 2 | mm | <1550 | 1400 |
| 11 | 2,3,4,9 | Weight | 2 | kg | <500 | 350-450 |
| 12 | 1,4,9 | Fuel Consumption | 1/2 | l/100km | <4 | 0 |
| 13 | 1,4,9 | Carbon Emmissions | 1/2 | g/km | <120 | 0 |
| 14 | 5,6,7,8,12 | Vehicle Cost | 2 | $USD | <7000 | 5000 |
| 15 | 1,4,10 | Aerodynamic Efficiency | 2/3 | Cd | 0.35 | 0.3 |
| 16 | 10 | Styling | 3 | Subj. (scale 1-5) | 3.5 | 5 |
| 17 | 11 | No. of Occupants | 2 | List | 2 | 3/4 |
| 18 | 13 | Safety Rating (EURO NCAP) | 3 | Star | >3 | 4 |
| 19 | 13,2 | ABS | 3 | Binary | No | Yes |
| 20 | 13 | Airbags | 3 | Binary | Yes | Yes |

VEHICLE LEVEL DESIGN TARGETS

FIG. 6

OVERVIEW OF POWERTRAIN COMPONENTS
AND THEIR PACKAGING LOCATIONS.

REQUIRED POWER AND TORQUE CURVES

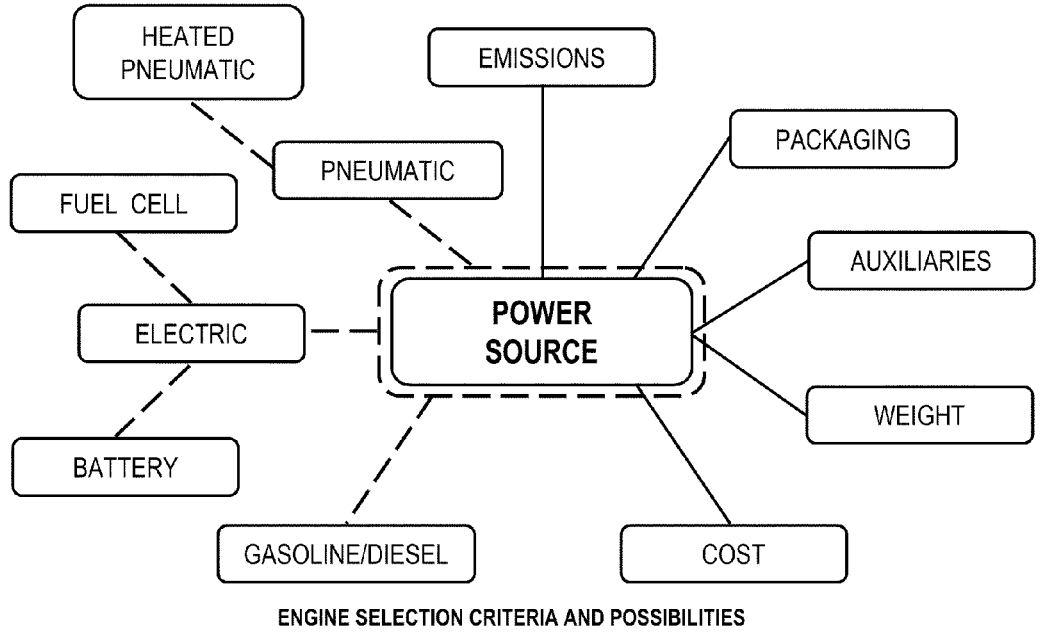
ENGINE SELECTION CRITERIA AND POSSIBILITIES
FIG. 10
| Eliminated System | Approximate Weight Saved |
|---|---|
| Reciprocating Engine (gasoline or diesel) | 85-115kg |
| Gearbox & Differential | 35-45kg |
| Clutch & Drive Shafts | 10-20kg |
| Total= | 130-180kg reduction |
WEIGHT SAVING BY ELIMINATED THE NEED FOR SOME COMMON POWERTRAIN COMPONENTS.
FIG. 11
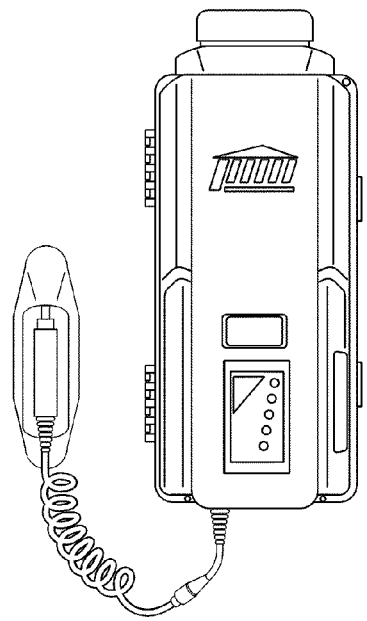
NATURAL GAS HOME FILLING STATION
FIG. 12

| Model no. | Air delivery [l/min] | no. of stages | Consumed Power [kW] | Time to Fill [min] | [hrs] | Electricity used [kwh] | Electricity cost [US $] |
|---|---|---|---|---|---|---|---|
| I 100-3-3 | 85 | 3 | 2.2 | 243.53 | 4.06 | 8.93 | $0.91 |
| I 100-4-3 | 125 | 3 | 3.3 | 165.60 | 2.76 | 9.11 | $0.92 |
| I 120-4-3 | 170 | 3 | 3.7 | 121.76 | 2.03 | 7.51 | $0.76 |
| I 120-5,5-3 | 215 | 3 | 4.7 | 96.28 | 1.06 | 7.54 | $0.76 |
| I 12.14-7,5-5 | 300 | 4 | 6.5 | 69.00 | 1.15 | 7.48 | $0.76 |
| I 15.1-7,5-5 | 340 | 4 | 6.9 | 60.88 | 1.01 | 7.00 | $0.71 |
| I 15.1-11-5 | 420 | 4 | 9.6 | 49.29 | 0.82 | 7.89 | $0.80 |
| I 150-11-5 | 500 | 4 | 10.2 | 41.40 | 0.69 | 7.04 | $0.71 |
| I 180-15-5 | 610 | 4 | 12 | 33.93 | 0.57 | 6.79 | $0.69 |
| I 22.0-22 | 930 | 4 | 20.3* | 22.26 | 0.37 | 7.53 | $0.76 |
| I 23.0-37 | 1480 | 4 | 34* | 13.99 | 0.23 | 7.93 | $0.80 |
| I 28.0-55 | 2500 | 4 | 50.6* | 8.28 | 0.14 | 6.98 | $0.71 |
| I 28.0-75 | 3500 | 4 | 69* | 5.91 | 0.10 | 6.80 | $0.69 |

COMPARISON TABLE SHOWING ELECTRICITY COST AND FILL TIMES FROM 9 DIFFERENT SIZE COMPRESSORS. ALL COMPRESSOR FIGURES AND MODELS TAKEN FROM
http://www.bauer-kompressoren.de/en/index.php
ELECTRICITY COST IS THE MICHIGAN STATE AVERAGE AS OF MARCH 2007

FIG. 13

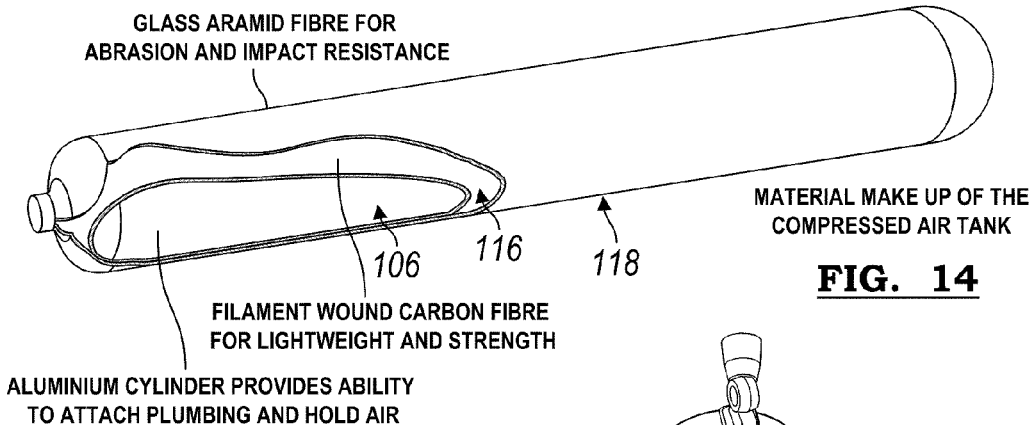

GLASS ARAMID FIBRE FOR ABRASION AND IMPACT RESISTANCE

MATERIAL MAKE UP OF THE COMPRESSED AIR TANK

FILAMENT WOUND CARBON FIBRE FOR LIGHTWEIGHT AND STRENGTH

ALUMINIUM CYLINDER PROVIDES ABILITY TO ATTACH PLUMBING AND HOLD AIR

FIG. 14

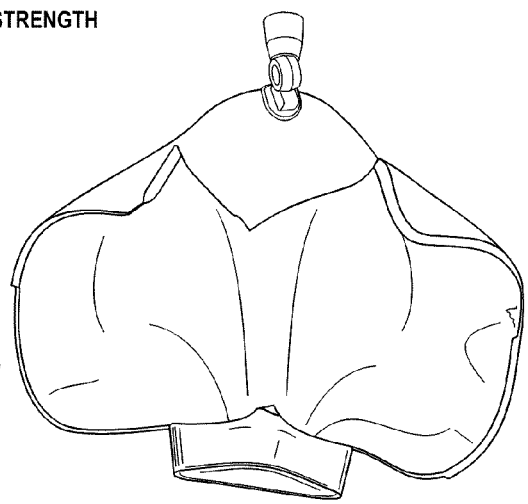

ALUMINUM SCUBA TANK EXPLOSION
http://www.thesailingsharkadventures.com/html/cylinder fills and safety.html.

FIG. 15

| Pollutant | Natural Gas | Oil | Coal |
|---|---|---|---|
| Carbon Dioxide | 117,000 | 164,000 | 208,000 |
| Carbon Monoxide | 40 | 33 | 208 |
| Nitrogen Oxides | 92 | 448 | 457 |
| Sulphur Dioxide | 1 | 1,122 | 2,591 |
| Particulates | 7 | 84 | 2,744 |
| Mercury | 0.000 | 0.007 | 0.016 |

FOSIL FUEL EMISSION LEVELS – POUNDS PER BILLION
BTU OF ENERGY INPUT TAKEN FROM:
http://www.naturalgas.org/environment/naturalgas.asp

FIG. 16

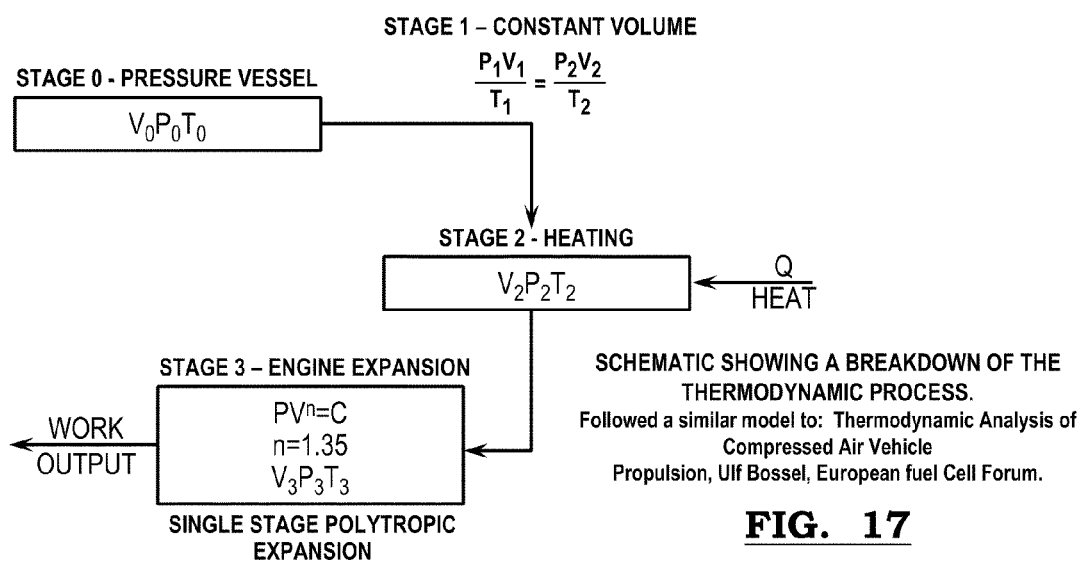

FIG. 17

SCHEMATIC SHOWING A BREAKDOWN OF THE THERMODYNAMIC PROCESS.
Followed a similar model to: Thermodynamic Analysis of Compressed Air Vehicle Propulsion, Ulf Bossel, European fuel Cell Forum.

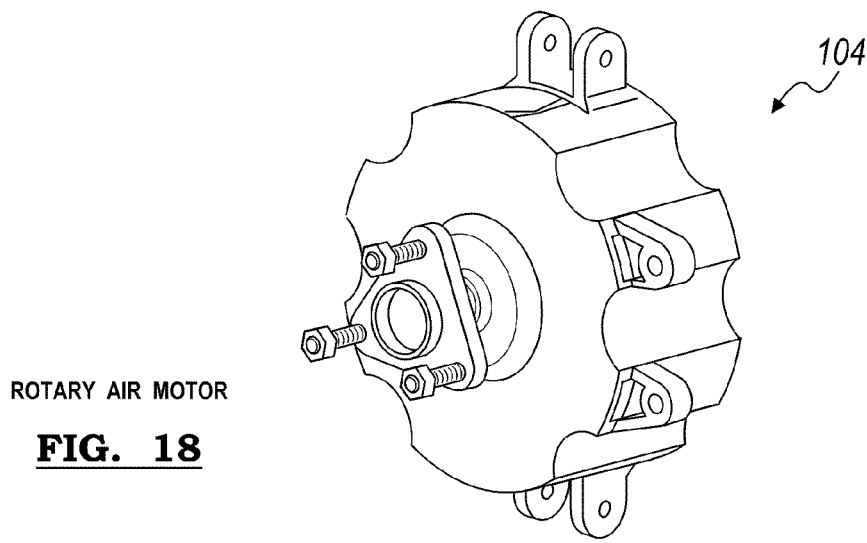

ROTARY AIR MOTOR

FIG. 18

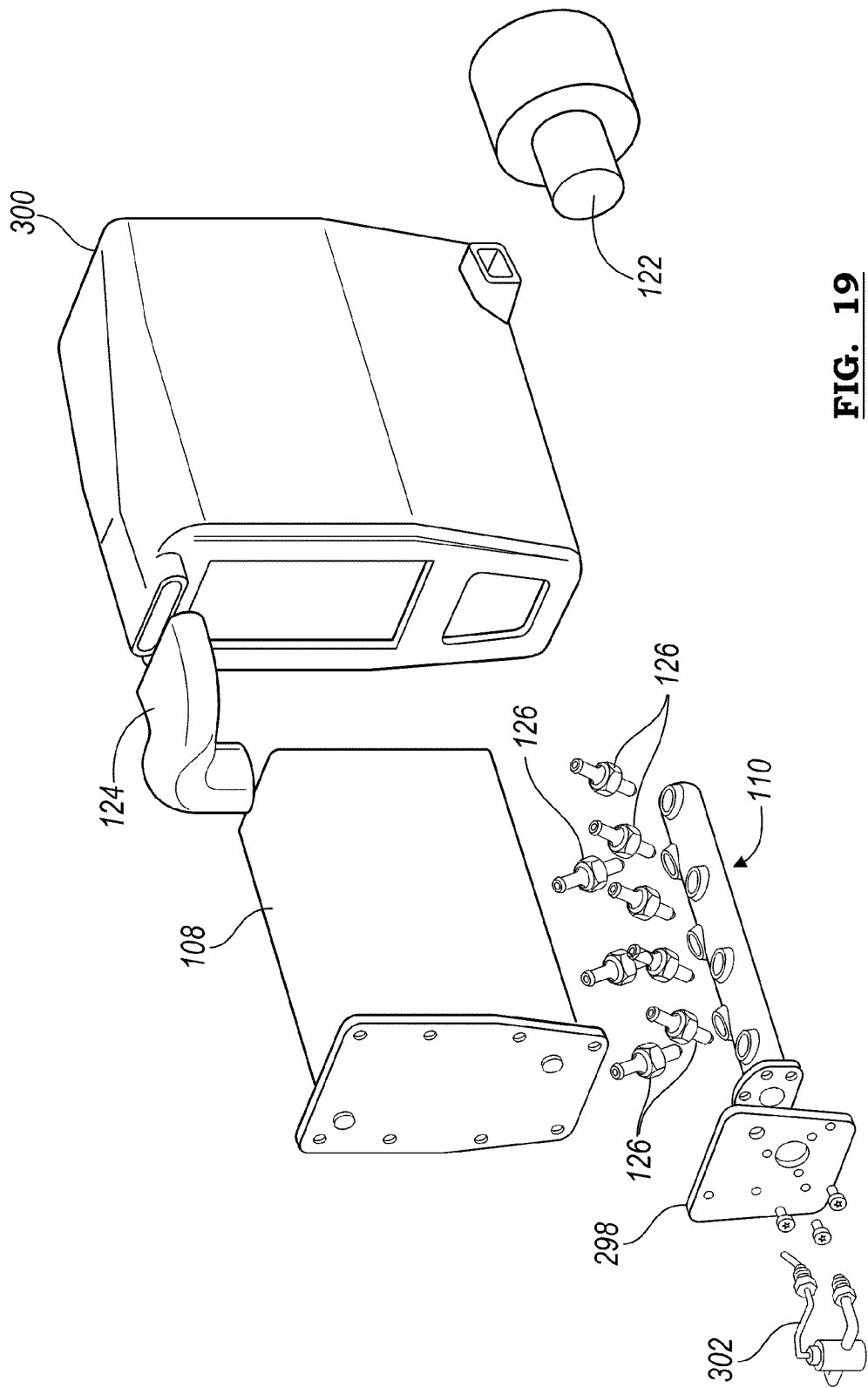

HVAC LAYOUT AND INTEGRATION.

ANOTHER VIEW OF THE
HVAC CONNECTIONS

HVAC BREAKDOWN AND DESCRIPTION

VEHICLE DIMENSIONS

VEHICLE DIMENSIONS

ROLLOVER KINEMATICS FOR THE PNEUMATIC VEHICLE

| Vehicle Type | Rollover Threshold (lateral g-load) |
|---|---|
| Sports Car | 1.25 |
| Luxury Car | 1.25 |
| Compact Car | 1.09 |
| PNEUMATIC VEHICLE | 0.99 |
| Pick-up Truck | 0.93 |
| Passenger Van | 0.81 |
| Medium Truck | 0.59 |
| Heavy Truck | 0.41 |

DIFFERENTIAL STEERING COMBINED WITH THE
TRAILING REAR WHEEL ALLOWS THE PNEUMATIC
VEHICLE TO VIRTUALLY 'TURN ON THE SPOT'

REAR WHEEL SUSPENSION GEOMETRY INDICATING
AN APPROPRIATE REAR TRAIL

1/10TH SCALE REMOTE CONTROL PROTOTYPE
DEVELOPED TO VALIDATE AND TUNE THE
VEHICLES STEERING SYSTEM

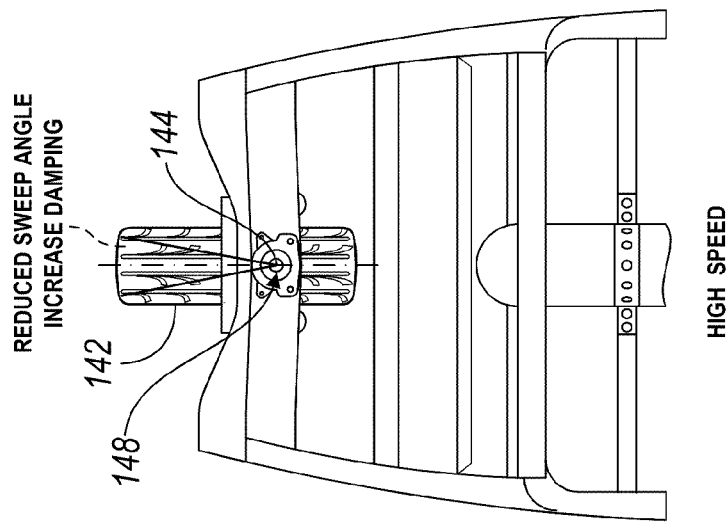
FIG. 32C HIGH SPEED
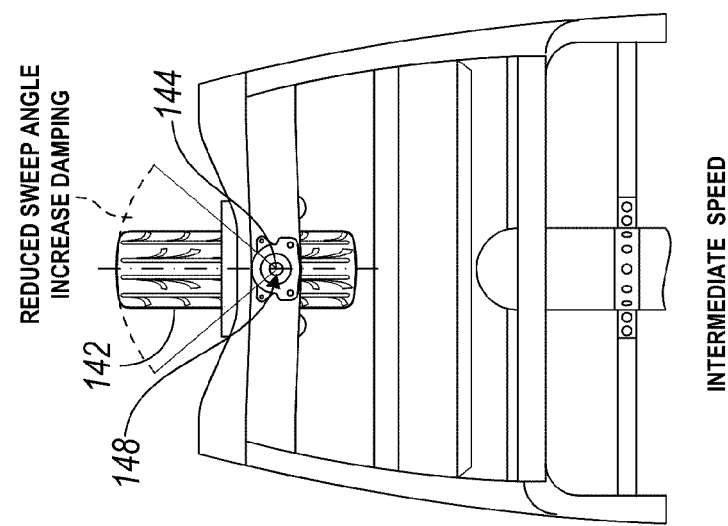
FIG. 32B INTERMEDIATE SPEED
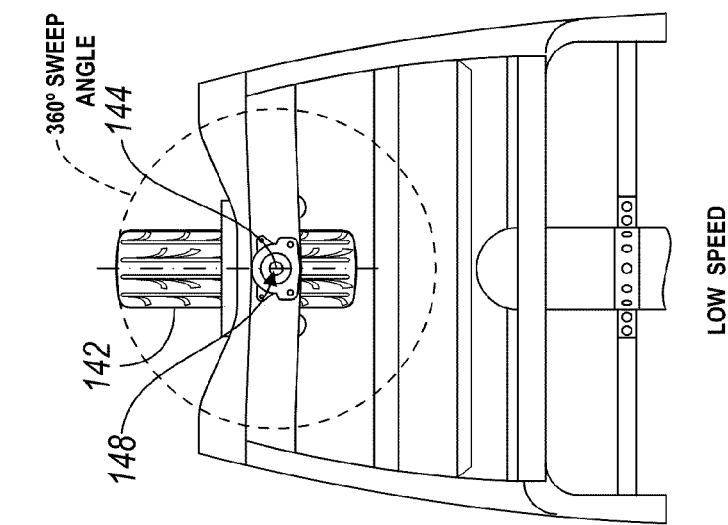
FIG. 32A LOW SPEED EXPLODED VIEW OF THE FRONT OUTBOARD SUSPENSION
ASSEMBLY ILLUSTRATING THE DIRECT DRIVE HUB MOTOR.

EXPLODED VIEW OF THE STAMPED AHSS
LOWER WISHBONE (LEFT) AND CAST ALLOY
UPPER WISHBONE (RIGHT)

REAR SUSPENSION ASSEMBLY

ELECTRIC-HYDRAULIC BRAKING SYSTEM, COMPRISING OF A SINGLE PISTON FLOATING CALIPER ACTIVATED BY AN ELECTRONIC LINEAR ACTUATOR.

SCHEMATIC OF DOUBLE MASTER CYLINDER

| COMPONENT | MATERIAL | YS/UTS | MANUFACTURING METHOD | QTY | WEIGHT PER PART (kg) | TOTAL WEIGHT (kg) |
|---|---|---|---|---|---|---|
| Lower Wishbone | Dual Phase Sheet Steel (700/1000) | 700/1000 | Stamping (Deep Drawing) | 2 | 0.68 | 1.36 |
| Upper Wishbone | Aluminum Alloy | 350/400 | Sand casting/Heat treatment | 2 | 0.25 | 0.5 |
| Front sub-frame | Thermoplastic CBT/Glass fiber composite | - | Resin Transfer Molding | 1 | 12.41 | 12.41 |
| Di-Pietro Rotary Air Motor/Upright | Outsourced Manufacture/Supplier | | | 2 | 8 approx | 16 |
| Wheel hub/Output shaft | Cast Alloy Steel | 410/650 | Casting | 2 | 0.64 | 1.28 |
| Upper Wishbone/Damper Mount | Aluminum Alloy (cast) | 350/400 | Sand casting/Heat treatment | 2 | 0.34 | 0.68 |
| Strut Brace | Carbon Fiber/Epoxy Composite | - | Quickstep Rapid Tube Manufacture | 1 | 0.141 | 0.141 |
| Coilover damper unit | Outsourced Manufacture/Supplier | | | 2 | 2.8 | 5.6 |
| Disc Rotor | Grey Cast Iron | -270 | Casting | 2 | 3.78 | 7.56 |
| Single Piston Brake Caliper | Outsourced Manufacture/Supplier | | | 2 | 0.67 | 1.34 |
| Electro-hydraulic Controller | Outsourced Manufacture/Supplier | | | 1 | 3 approx | 3 |
| Rubber Suspension Bush | Rubber | | Outsourced Manufacture/Supplier | 12 | 0.006 | 0.072 |
| Steel Bush | Cast Alloy Steel | 410/650 | Casting | 6 | 0.02 | 0.12 |
| Wheel Studs | Outsourced Manufacture/Supplier | | | 6 | 0.035 | 0.21 |
| Front Wheel | Aluminum Alloy (cast) | 350/400 | Sand casting/Heat treatment | 2 | 4.87 | 9.74 |
| Tires | Outsourced Manufacture/Supplier | | | 2 | 5 approx | 10 |
| Total | | | | | | 70.013 |

FRONT SUSPENSION ASSEMBLY

FIG. 39

| COMPONENT | MATERIAL | YS/UTS | MANUFACTURING METHOD | QTY | WEIGHT PER PART (kg) | TOTAL WEIGHT (kg) |
|---|---|---|---|---|---|---|
| Fork Crown | Cast Alloy Steel | 410/650 | Casting | 1 | 3.8 | 3.8 |
| Steering Head Stem | Cast Alloy Steel | 411/650 | Machining/Heat Treatment | 1 | 0.83 | 0.83 |
| Upside down telescopic damper | | | Outsourced Manufacture/Supplier | 2 | 2.2 | 4.4 |
| Rear Hub | Aluminum Alloy (cast) | 350/400 | Sand casting/Heat treatment | 1 | 1.5 | 1.5 |
| Rotary Steering Damper | | | Outsourced Manufacture/Supplier | 1 | 2 | 2 |
| Steering Locking Nut | | | Outsourced Manufacture/Supplier | 1 | 0.2 | 0.2 |
| Bearing | | | Outsourced Manufacture/Supplier | 4 | 0.2 | 0.8 |
| Rear Wheel | Aluminum Alloy (cast) | 350/400 | Sand casting/Heat treatment | 1 | 4.7 | 4.7 |
| Tires | | | Outsourced Manufacture/Supplier | 2 | 5 approx | 10 |
| Total | | | | | | 28.23 |

FRONT SUSPENSION ASSEMBLY

FIG. 40

UPPER BODY ASSEMBLY

FIG. 41B

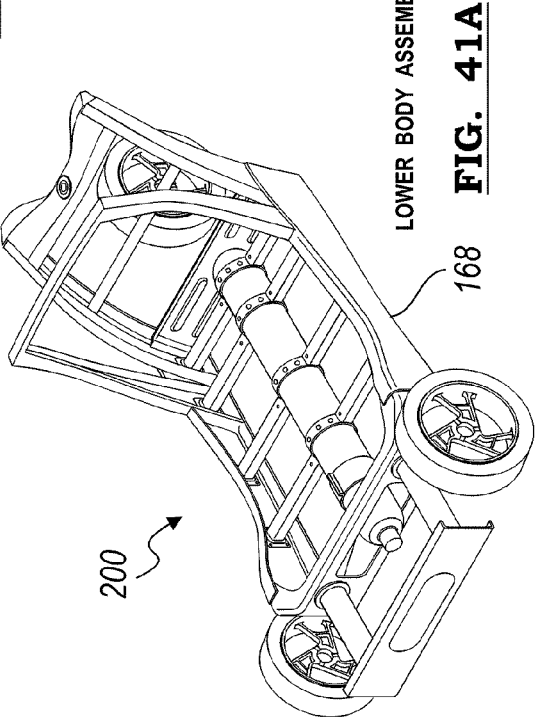

LOWER BODY ASSEMBLY

FIG. 41A

LOWER VEHICLE STRUCTURE EXPLODED VIEW

| COMPONENT | MATERIAL | YS/UTS (Mpa) | MANUFACTURING METHOD | ATTACHMENT METHOD | THICKNESS (mm) | QTY | WEIGHT PER PART (kg) | TOTAL WEIGHT (kg) |
|---|---|---|---|---|---|---|---|---|
| Bumper reinforcement | Martensitic sheet steel | 1250/1500 | 2D roll forming | Spot welding | 1.5 | 1 | 3.66 | 3.66 |
| Crash tube mount | Dual phase sheet steel | 700/1000 | Stamping | Spot welding | 3 | 4 | 0.75 | 3 |
| Crash tube | Carbon fiber/Epoxy Composite | - | Quickstep rapid tube manufacture | Bonded | 3 | 2 | 1.03 | 2.06 |
| Firewall | Dual phase sheet steel | 700/1000 | Stamping | Spot welding | 2 | 1 | 10.2 | 10.2 |
| Rocker | Martensitic sheet steel | 1250/1500 | 3D roll forming | Spot welding/Mechanical fasteners | 1.5 | 2 | 6.18 | 12.36 |
| B-Pillar-LHS | Martensitic sheet steel | 1250/1500 | 3D roll forming | Spot welding | 2 | 1 | 4.4 | 4.4 |
| B-Pillar-RHS | Martensitic sheet steel | 1250/1500 | 3D roll forming | Spot welding | 2 | 1 | 4.4 | 4.4 |
| Rear member-LHS | Martensitic sheet steel | 1250/1500 | 3D roll forming | Spot welding | 1.5 | 1 | 3.45 | 3.45 |
| Rear member-RHS | Martensitic sheet steel | 1250/1500 | 3D roll forming | Spot welding | 1.5 | 1 | 3.45 | 3.45 |
| Rear bulkhead | Dual phase sheet steel | 700/1000 | Stamping | Spot welding | 1 | 1 | 3.2 | 3.2 |
| Rear brace | Martensitic sheet steel | 1250/1500 | 2D roll forming | Spot welding | 1.5 | 1 | 1.65 | 1.65 |
| Roof rail | Martensitic steel (tube) | 1251/1500 | Tube bending | Spot welding | 1 | 1 | 1.57 | 1.57 |
| Rear suspension mount | Aluminum alloy (cast) | 350/400 | Sand casting/Heat treatment | Mechanical fasteners | - | 1 | 7.33 | 7.33 |
| Tank mount | Aluminum alloy (cast) | 350/400 | Sand casting/Heat treatment | Co-cured/Mechanical fasteners | - | 8 | 0.47 | 3.76 |
| Front tank mount-LHS | Aluminum alloy (cast) | 350/400 | Sand casting/Heat treatment | Co-cured/Mechanical fasteners | - | 1 | 0.65 | 0.65 |
| Front tank mount-RHS | Aluminum alloy (cast) | 350/400 | Sand casting/Heat treatment | Co-cured/Mechanical fasteners | - | 1 | 0.65 | 0.65 |
| Front support member & mount-LHS | Aluminum alloy (tube & sheet)-6061 | 275/310 | Cutting & Welding | Mechanical fasteners | 2 | 1 | 0.65 | 0.65 |
| Front support member & mount-RHS | Aluminum alloy (tube & sheet)-6061 | 275/310 | Cutting & Welding | Mechanical fasteners | 2 | 1 | 0.65 | 0.65 |
| Side support member & mount 1 | Aluminum alloy (tube & sheet)-6061 | 275/310 | Cutting & Welding | Mechanical fasteners | 2 | 2 | 0.68 | 1.36 |
| Side support member & mount 2 | Aluminum alloy (tube & sheet)-6061 | 275/310 | Cutting & Welding | Mechanical fasteners | 2 | 2 | 0.66 | 1.32 |
| Side support member & mount 3 | Aluminum alloy (tube & sheet)-6061 | 275/310 | Cutting & Welding | Mechanical fasteners | 2 | 2 | 0.62 | 1.24 |
| Side support member & mount 4 | Aluminum alloy (tube & sheet)-6061 | 275/310 | Cutting & Welding | Mechanical fasteners | 2 | 2 | 0.59 | 1.18 |
| Air Tank | Carbon fiber/Epoxy Composite wrapped over aluminum inner | - | Al: Extruded & welded; Carbon: filament wound | Co-cured | - | 1 | 20 | 20 |
| TOTAL | | | | | | | | 92.2 |

LOWER VEHICLE STRUCTURE

FIG. 43

MATERIALS AND MANUFACTURING PROCESSES USED ON LOWER VEHICLE STRUCTURE

THE FLEXIBLE ROLL FORMING PROCESS

EXAMPLES OF PART SHAPES ACHIEVABLE

EXAMPLES OF THE MACHINERY AND TOOLING
REQUIRED (SOURCE WWW.ORTIC.SE)

AIR TANK ATTACHMENT SYSTEM

SPECIFIC ENERGY ABSORPTION (SEA) VALUES FOR TYPICAL CRASH TUBES

DYNAMIC AXIAL CRUSH TEST OF CFRP TUBES (COURTESY OF A. BRIGHTON)

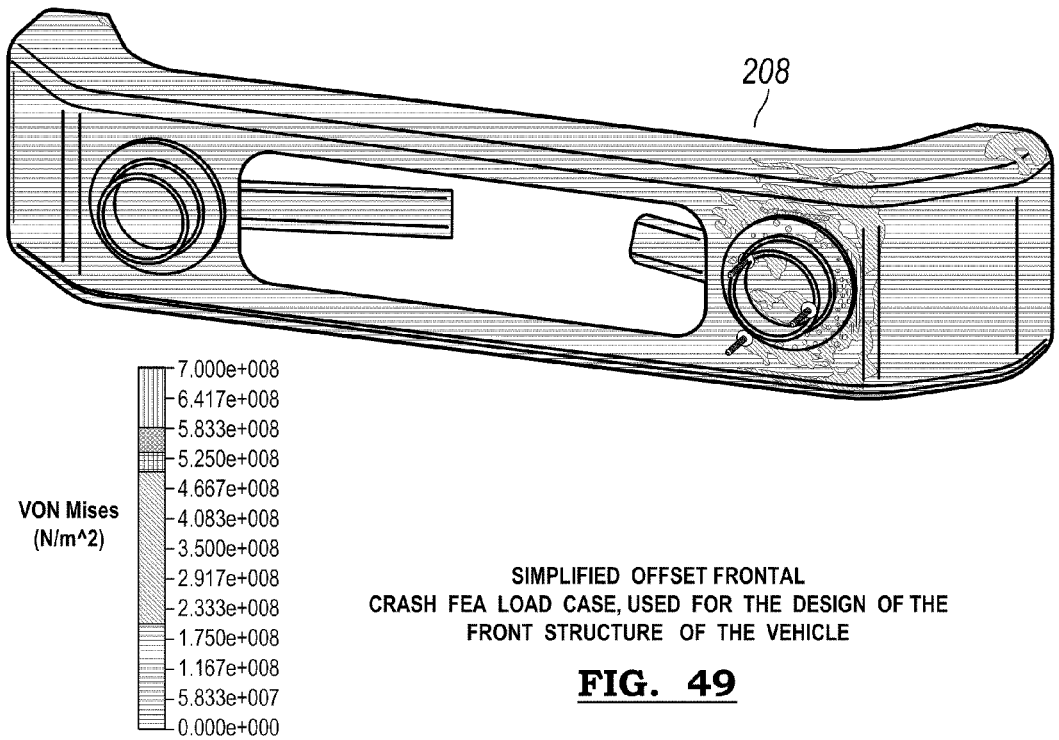
SIMPLIFIED OFFSET FRONTAL
CRASH FEA LOAD CASE, USED FOR THE DESIGN OF THE
FRONT STRUCTURE OF THE VEHICLE
FIG. 49
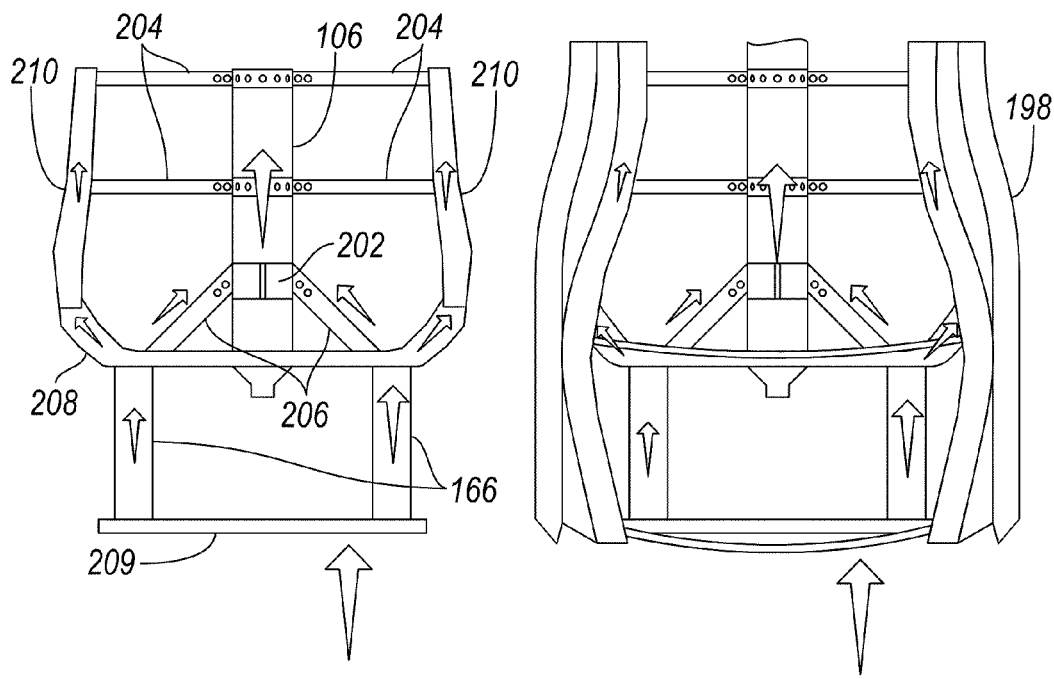
LOAD PATHS INTO LOWER & UPPER VEHICLE STRUCTURES FOR AN OFFSET FRONTAL IMPACT
FIG. 50A  FIG. 50B

METHOD OF CFRP TUBE

COMPARISON OF CURE CYCLE TIMES FOR COMPOSITE LAYERING -VS- AUTOCLAVE PROCESSES

SIDE STRUCTURE

LOAD PATHS FOR A SIDE IMPACT

UPPER VEHICLE BODY
EXPLODED VIEW

MATERIALS & MANUFACTURING PROCESSES
USED ON UPPER VEHICLE BODY

THE RTM PROCESS FOR THERMOSETS

LOAD PATHS IN VEHICLE STRUCTURE

| COMPONENT | MATERIAL | MANUFACTURING METHOD | ATTACHMENT METHOD | THICKNESS (mm) | QTY | WEIGHT PER PART (kg) | TOTAL WEIGHT (kg) |
|---|---|---|---|---|---|---|---|
| Front Structure | Thermoplastic CBT/ Glass fiber composite | Resin Transfer Molding | Mechanical fasteners | 2 | 1 | 12.41 | 12.41 |
| Bonnet | Thermoplastic CBT/ Glass fiber composite | Resin Transfer Molding | Mechanical fasteners | 1.5 | 1 | 2.71 | 2.71 |
| Roof/Windshield | Polycarbonate | Plastic forming | Bonded | 4 | 1 | 14.61 | 14.61 |
| Windows | Polycarbonate | Plastic forming | Mechanical fasteners | 3 | 2 | 1.8 | 3.6 |
| Door Ring Reinforcement Strips | Epoxy/Glass fiber composite | Resin Transfer Molding | Bonded | 5 | 1 | 8.92 | 8.92 |
| Doors | Glass Fibre ELACO Laminate | Resin Transfer Molding | Mechanical fasteners | 3 | 2 | 3.94 | 7.28 |
| Rear Structure | Epoxy/Glass fiber composite | Resin Transfer Molding | Bonded | 2 | 1 | 13.62 | 13.62 |
| TOTAL | | | | | | | 63.2 |

UPPER VEHICLE BODY

FIG. 58

ARTISTIC RENDERS OF THE VEHICLE INTERIOR

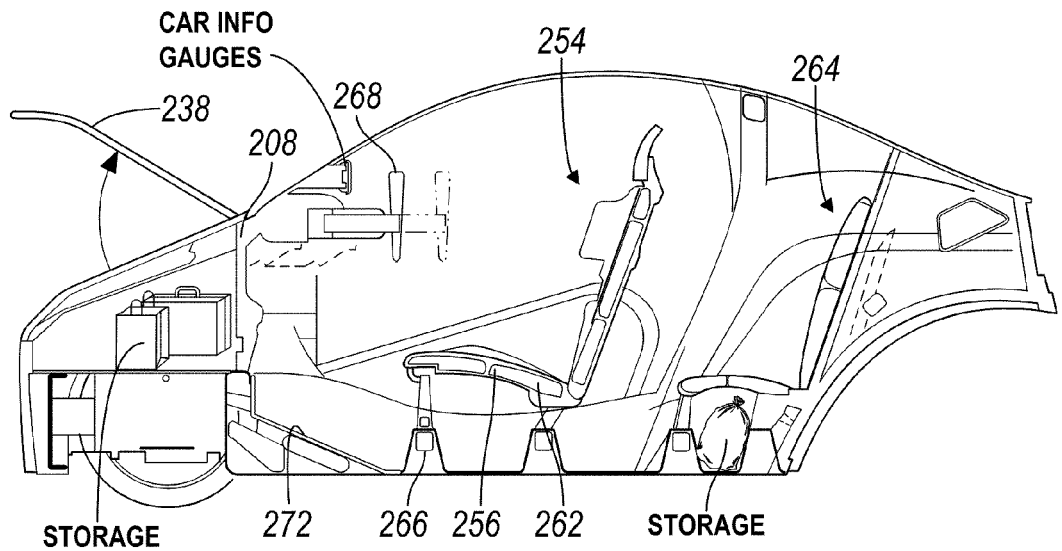
FIG. 60 SECTIONAL VIEW OF VEHICLE INTERIOR.
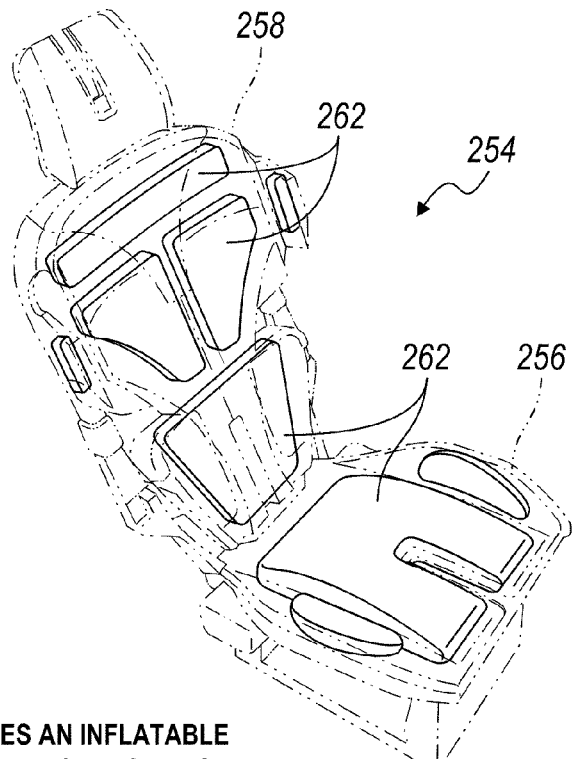
SEAT DESIGN INCORPORATES AN INFLATABLE SILICON BLADDER TO PROVIDE SUPPORT FOR A DIVERSE RANGE OF PASSENGERS.
FIG. 61

REAR BENCH SEAT ALLOWS SEATING FOR A SINGLE ADULT (DEFLATED CENTRAL SECTION) OR FOR TWO CHILDREN (INFLATED CENTRAL SUPPORT).

REMOVABLE INTERIOR FLOOR LINING

THE DRIVE-BY-WIRE FUNCTIONAL
DIAGRAM USING THE LIN PROTOCOL.

THE ICMCCU CONNECTION HIERARCHY

THE DRIVE TRAIN CONTROL UNIT (DTU) CONNECTION DIAGRAM

POWER GENERATION SCHEMATIC

FRONT SUSPENSION SYSTEM.

WHEEL & TIRE

RTM VS. CONVENTIONAL BODY

RTM PROCESS.

| COMPONENTS | PART NO: | MATERIAL | QUANTITY |
|---|---|---|---|
| Front Sub Frame | 005 001 | Glass Fibre Reinforced Epoxy | 1 |
| Floor | 005 008 | Glass Fibre Reinforced Thermoplastic Resin | 1 |
| Wheel Arches | 005 014 | Glass Fibre Reinforced Thermoplastic Resin | 1 |
| Front Access Panel | 005 015 | Glass Fibre Reinforced Thermoplastic Resin | 1 |
| Left Hand Side Door | 005 016 | Glass Fibre Reinforced Thermoplastic Resin | 1 |
| Right Hand Side Door | 005 017 | Glass Fibre Reinforced Thermoplastic Resin | 1 |
| Hood | 005 018 | Glass Fibre Reinforced Thermoplastic Resin | 1 |
| Bumper | 005 019 | Glass Fibre Reinforced Thermoplastic Resin | 1 |
| Left Hand Side Rear Quarter | 005 020 | Glass Fibre Reinforced Epoxy | 1 |
| Right Hand Side Rear Quarter | 005 021 | Glass Fibre Reinforced Epoxy | 1 |
| Door Ring Reinforcement Strip | 005 022 | Glass Fibre Reinforced Epoxy | 1 |
| Front Reinforcement Strip | 005 023 | Glass Fibre Reinforced Thermoplastic Resin | 1 |

PARTS MANUFACTURED USING THE RTM PROCESS

FIG. 76

SCHEMATIC OF THE COMPOSITE LAYER PROCESS

ROLLER FORMING SCHEMATIC

| COMPONENTS | PART NO: | MATERIAL | QUANTITY |
|---|---|---|---|
| Rocker Panels | 005 013 | Martensitic 1500 UTS | 2 |
| Bumper Structure | 006 003 | Martensitic 1500 UTS | 1 |

PARTS MANUFACTURED USING THE ROLL FORMING PROCESS

FIG. 79

| COMPONENTS | PART NO: | MATERIAL | QUANTITY |
|---|---|---|---|
| Fire Wall | 005 002 | DP800 | 1 |
| Burner Mounting Plate | 006 012 | Plain Carbon Steel | 1 |
| Burner Housing | 006 013 | Plain Carbon Steel | 1 |
| Blower | 006 030 | Steel | 1 |

PARTS MANUFACTURED USING A STAMPING PROCESS

FIG. 80

| COMPONENTS | PART NO: | MATERIAL | QUANTITY |
|---|---|---|---|
| Upper Arm | 002 001 | 6061 Alloy | 2 |
| Lower Arm-Outer Bushes | 002 005 | Alloy Steel | 4 |
| A-arm Mount | 002 006 | Cast Aluminium | 2 |
| Hub Mount | 002 014 | Aluminium | 2 |
| Fork Crown | 002 017 | Aluminium 6061 | 1 |
| 17-Mag Wheels | 003 001 | 6061 Alloy | 2 |
| Hub | 003 003 | Alloy Steel | 2 |
| Wheel Stud | 003 004 | Cast Iron | 6 |
| 17-Mag Wheel | 003 005 | 6061 Alloy | 1 |
| Hub | 003 007 | 6061 Alloy | 1 |
| Steering Shaft | 004 001 | Chrome Stainless Steel | 1 |
| Steering Lock Nut | 004 002 | Alloy Steel | 1 |
| Crash Tube Mount | 005 004 | Alloy Steel | 4 |
| Front Tank Mount | 005 006 | Cast Aluminium | 1 |
| Aluminium Mount | 005 007 | Cast Aluminium | 1 |
| Lower Tank Mount | 005 011 | Cast Aluminium | 4 |
| Upper Tank Mount | 005 012 | Cast Aluminium | 4 |
| Di Pietro Engine | 006 004 | Alloy Steel | 2 |
| Burner Mounting Bolt | 006 014 | Cast Iron | 3 |

PARTS MANUFACTURED USING THE CASTING PROCESS

FIG. 81

| COMPONENTS | PART NO: | MATERIAL | QUANTITY |
|---|---|---|---|
| ROOF | 005 024 | POLYCARBONATE | 1 |
| EXHAUST | 006 009 | PLASTIC | 1 |
| SILICON MANIFOLD | 006 017 | PLASTIC | 1 |
| HVAC HOUSING TOP | 006 023 | PLASTIC | 1 |
| HVAC HOUSING BOTTOM | 006 025 | PLASTIC | 1 |
| DIVIDING VALVE | 006 026 | PLASTIC | 1 |
| CABIN AIR DUCTING | 006 027 | PLASTIC | 1 |
| FAN HOUSING | 006 029 | PLASTIC | 1 |

PARTS MANUFACTURED BY THE INJECTION MOLDING PROCESS

PARTS PURCHASED & MANUFACTURED WITH VARIOUS PROCESSES.

FIG. 84

- Parts received by an external elevator
- Parts assembled
- Flatpack lowered by central elevator to floor below

- Base chassis placed together
- Car placed together with parts from floor above
- Complete car membrane lowered to the next floor Customization of vehicle including;
- Color, either randomly selected or personally chosen
- Any extra features or upgrades required by the customer Check Station for vehicle to assess and repair if applicable;
- Any blemishes, scratches etc. in the production process
- Any mechanical and electrical faults

- Service centre for existing car owners
- Upgrade centre for existing car owners Educational and Exhibition levels;
- Exhibition that details the car and how it operates
- Information for potential customers on the benefits of the car on their lives, and the lives of the city
- A comparison of the effects of a current motor vehicle with the car on the environment
- Sales and financing centre

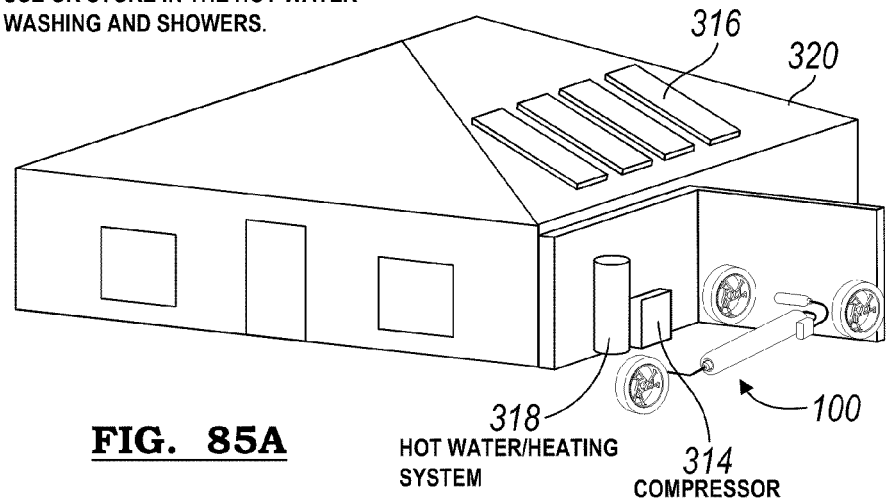

HEAT ENERGY LOST DURING THE COMPRESSION OF AIR TO REFILL THE CAR CAN BE REUSED TO HEAT THE HOUSE OR STORE IN THE HOT WATER SYSTEM FOR WASHING AND SHOWERS.

FIG. 85A

HOT WATER/HEATING SYSTEM — 318
COMPRESSOR — 314

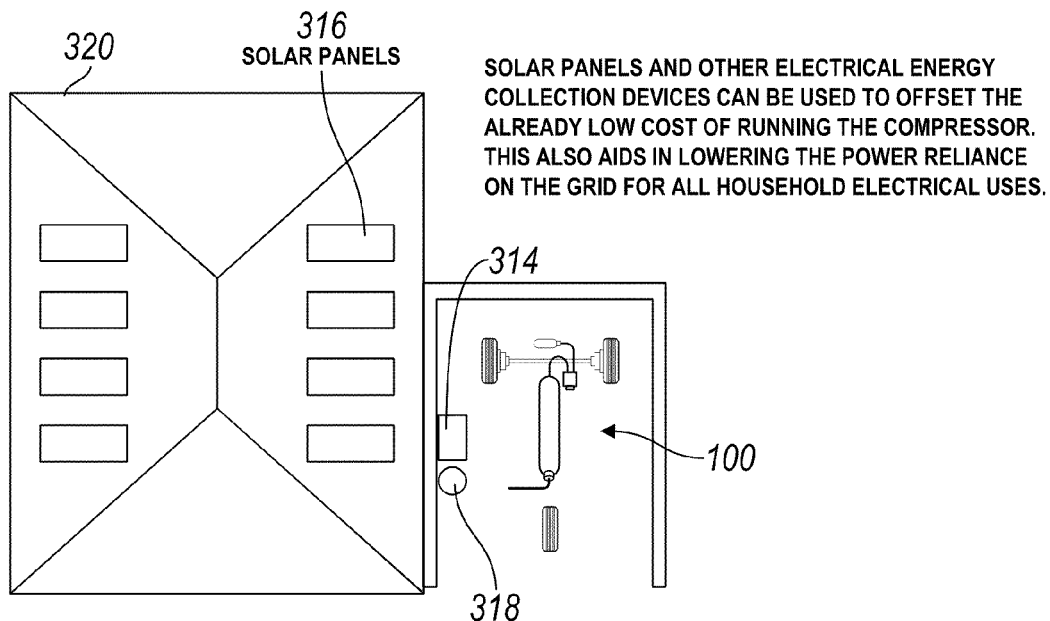

SOLAR PANELS AND OTHER ELECTRICAL ENERGY COLLECTION DEVICES CAN BE USED TO OFFSET THE ALREADY LOW COST OF RUNNING THE COMPRESSOR. THIS ALSO AIDS IN LOWERING THE POWER RELIANCE ON THE GRID FOR ALL HOUSEHOLD ELECTRICAL USES.

A MODEL OF A HOME WITH THE PNEUMATIC VEHICLE AND COMPRESSOR

FIG. 85B

| Estimates of Cradle to Gate Energy & Wastes for the Production of 1000 Pounds of Various Primary Materials | | | | |
|---|---|---|---|---|
| Material | Energy Consumption (Thousand BTU) | Solid Waste (lb) | Waterborne Waste (lb) | Airborne Waste (lb) |
| Aluminum sheet | 86.6 | 2200 | 52 | 12,100 |
| Brass | 18.2 | 2700 | 10 | 2650 |
| Cast iron | 15.5 | 5100 | 8.5 | 2520 |
| Copper wire | 25.4 | 20,900 | 14.5 | 3800 |
| Polyurethane foam | 48.1 | 290 | 26.6 | 4700 |
| Glass | 7.0 | 98 | 2.5 | 1000 |
| HDPE | 36.2 | 83 | 6.6 | 1960 |
| LDPE | 39.7 | 140 | 7.7 | 2500 |
| Lead | 21.8 | 360 | 5.7 | 3050 |
| Natural rubber | 46.6 | 170 | 8.3 | 4200 |
| PET | 34.9 | 145 | 15.4 | 2800 |
| Phenolic | 38.6 | 73 | 13 | 2200 |
| Polycarbonate | 67.9 | 420 | 21 | 6270 |
| Polypropylene | 36.9 | 79 | 6.9 | 2040 |
| PVC | 31.7 | 270 | 7.9 | 3080 |
| Synthetic rubber | 64.6 | 138 | 10 | 4300 |
| Steel | 21.4 | 4600 | 17 | 3550 |
| Zinc | 24.4 | 451 | 7.5 | 3400 |

ESTIMATES OF ENERGY & WASTES PRODUCES BY VARIOUS RAW MATERIALS.
(Source: Sullivan (2001) – Life Cycle Assessment)

FIG. 86

| LCI of the Generic Vehicle (Outflows & Energy Use) | | | | | | |
|---|---|---|---|---|---|---|
| Environmental flow | Unit | Generic Vehicle | Mat'ls production | Mfg. assembly | Fuel use | Maintenace & repair | EOL |
| Outflow | | | | | | | |
| (a) Dust & particulates | g | 55,301 | 27,414 | 8449 | 17,142 | 613,532 | 247 |
| (a) Carbon dioxide ($CO_2$, fossil) | g | 61,326,600 | 4,608,670 | 2,614,900 | 53,34,300 | 39,083 | 143,273 |
| (a) Carbon monoxide (CO) | g | 1,937,590 | 58,778 | 5983 | 1,833,109 | 4415 | 683 |
| (a) Sulfur oxides (Sox as $SO_2$) | g | 137,380 | 31,163 | 15,253 | 86,234 | 2739 | 315 |
| (a) Nitrogen oxides (NOx as $NO_2$) | g | 255,703 | 12,986 | 8429 | 230,744 | 2148 | 806 |
| | g | 258,712 | 6930 | 14,142 | 235,321 | 3828 | 171 |
| (a) Nonmethane hydrocarbons | g | 69,578 | 13,810 | 5662 | 46,134 | 29 | 144 |
| (a) Methane ($CH_4$) | g | 749 | 286 | 11 | 417 | 2.1 | 5.7 |
| (a) Hydrogen chloride (HCl) | g | 117 | 61 | 1.2 | 52 | 63 | 0.71 |
| (a) Hydrogen fluoride (HF) | g | 117 | 51 | 1.2 | 1.1 | 1053 | |
| (a) Lead (Pb) | g | 7996 | 4771 | 1137 | 1018 | 512 | |
| (w) Dissolved solids | g | 76,117 | 1993 | 2516 | 71,038 | 5.1 | |
| (w) Suspended solids | g | 52 | 38 | 9.0 | 2.5 E-08 | 56 | |
| (w) Heavy metals (total) | g | 7899 | 141 | 522 | 7172 | 7.2 | |
| (w) Oils & greases | g | 512 | 122 | 67 | 316 | 0.42 | |
| (w) Other organics | g | 16 | 7.4 | 7.8 | | 12 | |
| (w) Phoslphates (as P) | g | 2435 | 115 | 17 | 2829 | 277 | |
| (w) Ammonia (as N) | kg | 4376 | 2554 | 408 | 812 | 41 | |
| Waste (total) | kg | 430 | 23 | 70 | 8.3 E-05 | | |
| Waste (municipal & Industrial) | | | | | | 16,445 | |
| Energy reminder | MJ | 995,089 | 85,509 | 39,894 | 851,078 | 16,075 | |
| E (HHV) total energy | MJ | 988,881 | 81,677 | 39,088 | 849,894 | 373 | |
| E (HHV) fossil energy | MJ | 6212 | 3833 | 806 | 1184 | 8355 | |
| E (HHV) nonfossil energy | MJ | 957,858 | 67,447 | 37,407 | 843,904 | 8016 | |
| E (HHV) process energy | MJ | 25,964 | 16,667 | 961 | 319 | 75 | |
| E (HHV) feedstock energy | MJ | 11,270 | 1397 | 1527 | 6854 | | |
| E (HHV) transportation energy | | | | | | | |
| 0.015 | | | 17 | 58 | 0.0013 | 7.4 | 0.28 |

LCI OF A MODERN GENERIC VEHICLE (Source: Sullivan (2001) – Life Cycle Assessment)

FIG. 87

| TYPE | | CLASSIFICATION | INDICATOR | CHARACTERIZATION |
|---|---|---|---|---|
| Air | Dust And Particulates | Human Toxicity | Predicted Environmental concentration increase divided by predicted no-effect concentration | Human toxicity Potential for each eutrophication emission |
| Air | (a) Carbon Dioxide (CO2, Fossil) | Global Warming | Increase in infrared radiative force | Global warming potential over 100 years |
| Air | (a) Carbon Monoxide (CO) | Human Toxicity | Predicted Environmental concentration increase divided by predicted no-effect concentration | Human toxicity Potential for each eutrophication emission |
| Air | (a) Sulfur Oxides (Sox as SO2) | Acidification | Deposition increase divided by N/P equivalents in biomass | Nutrification Potential for each eutrophication emission |
| Air | (a) Nitrogen Oxides (Nox AS | Acidification/Nitrification/Photochemical oxidation | Deposition increase divided by N/P equivalents in biomass | Nutrification Potential for each eutrophication emission |
| Air | NO2) | Acidification/Nitrification/Photochemical oxidation | Deposition increase divided by N/P equivalents in biomass | Nutrification Potential for each eutrophication emmission |
| Air | (a) Nonmethane hydrocarbons | Human Toxicity | Predicted Environmental concentration increase divided by predicted no-effect concentration | Human toxicity Potential for each eutrophication emission |
| Air | (a) Methane (CH4) | Human Toxicity/Global Warming | Increase in infrared radiative force | Global warming potential over 100 years |
| Air | (a) Hydrogen chloride (HCl) | Acidification/Human Toxicity | Deposition increase divided by N/P equivalents in biomass | Acidification Potential for each eutrophication emission |
| Air | (a) Hydrogen flouride (HF) | Acidification/Human Toxicity | Deposition increase divided by N/P equivalents in biomass | Acidification Potential for each eutrophication emission |
| Air | (a) Lead (Pb) | Human Toxicity | Predicted Environmental concentration increase divided by predicted no-effect concentration | Human toxicity Potential for each eutrophication emission |
| Water | (w) Dissolved solids | Eco Toxicity | Predicted Environmental concentration increase divided by predicted no-effect concentration | Ecotoxicity Potential for each eutrophication emission |
| Water | (w) Suspended solids | Eco Toxicity | Predicted Environmental concentration increase divided by predicted no-effect concentration | Ecotoxicity Potential for each eutrophication emission |
| Water | (w) Heavy metals (total) | Eco Toxicity | Predicted Environmental concentration increase divided by predicted no-effect concentration | Ecotoxicity Potential for each eutrophication emission |
| Water | (w/s) Oils and greases | Eco Toxicity/Human Toxicity | Predicted Environmental concentration increase divided by predicted no-effect concentration | Ecotoxicity Potential for each eutrophication emission |
| Water/Soil | (w) Other organics | Eco Toxicity/Human Toxicity | Predicted Environmental concentration increase divided by predicted no-effect concentration | Ecotoxicity Potential for each eutrophication emission |
| Water | (w) Phosphates (as P) | Acidification/Nitrification | Deposition increase divided by N/P equivalents in biomass | Nutrification Potential for each eutrophication emission |
| Water | (w) Ammonia (as N) | Acidification/Nitrification | Deposition increase divided by N/P equivalents in biomass | Nutrification Potential for each eutrophication emission |
| Water | Waste (total) | | | |
| Water | Waste (municipal and industrial) | | | |
| Energy | E (HHV) total energy | Resource Depletion | Cumulated energy demands | |
| Energy | E (HHV) fossil energy | Resource Depletion | Cumulated energy demands | |
| Energy | E (HHV) nonfossil energy | Resource Depletion | Cumulated energy demands | |
| Energy | E (HHV) process energy | Resource Depletion | Cumulated energy demands | |

LCI OF PNEUMATIC VEHICLE

FIG. 88

BODY FOR PNEUMATIC VEHICLE

BACKGROUND

1. Field of the Invention

Embodiments of the invention relate to bodies for pneumatic vehicles.

2. Background Art

Henry Ford's Model T Mission Statement: "I will build a car for the great multitude. It will be large enough for the family, but small enough for the individual to run and care for. It will be constructed of the best materials, by the best men to be hired, after the simplest designs that modern engineering can devise. But it will be low in price that no man making a good salary will be unable to own one—and enjoy with his family the blessing of hours of pleasure in God's great open spaces."

According to an Australian government report, a life cycle assessment (LCA) "Is a tool for assessing the environmental impacts associated with a product, process or service throughout its life cycle, from the extraction of raw materials through to the processing, transport, use, reuse, recycling and disposal." LCA is commonly known as cradle to grave as it is from the birth of the product right through to its final stage.

There are a number of benefits that can be realized from completing a life cycle assessment (LCA) on a product. According to the Australian government some of these benefits include:

identifying the most efficient options for increasing the environmental performance of a product, and creating a "greener" product that is more desirable to customers;

identifying places in the company where efficiency improvements can be made;

reducing greenhouse emissions;

comparing alternative choices;

identifying the most relevant steps in the manufacturing process related to a given environmental impact;

providing a tool for decision making.

However, LCA is a "new technology" and hence there are some challenges in conducting an LCA. Some of these challenges include (Australian Government):

Lack of a widely accepted methodology for conducting LCA;

Difficulties of defining the scope and boundaries of the LCA;

Confidentiality issues that restrict the availability of relevant data;

Time taken to complete a full LCA.

There are four stages/steps to conducting an LCA as defined by the ISO 14040 standards, these steps are:

1. Goal and Scope Analysis: These are the specifications of the LCA study; it suggests what questions are going to be answered and identifies who the study is for. It also defines the purpose, barriers and limitations of the study. The final part of the scope defines the data required to fulfill the requirements.

2. Inventory Analysis (IA): The inventory analysis is the step where data is gathered, and data from each material and process are qualified and validated. This step can be very difficult because of concerns over revealing proprietary and/or confidential information.

3. Life Cycle Impact Analysis: According to the ISO 14044 impact analysis is the phase of life cycle analysis aimed at understanding and evaluating the magnitude and significance of the potential environmental impacts for a product system throughout the life of the product.

4. Improvement Analysis: An objective of this phase is to improve the environmental performance of the project or process in question. That is to compare all the data and results to see how they can be used to make improvements in the product or manufacturing.

SUMMARY

In one embodiment, a pneumatic vehicle has a first sub-assembly and a second sub-assembly. The first sub-assembly has a chassis and a air tank supported by the chassis. The second sub-assembly is supported on the chassis; and the second sub-assembly includes part of a vehicle body. The second sub-assembly is bonded to the first sub-assembly using a structural adhesive.

In another embodiment a pneumatic vehicle has a first sub-assembly and a second sub-assembly. The first-subassembly has a chassis, an air tank, and a part of the vehicle body. The first assembly also has a pair of B-pillars extending upright from the chassis and a pair of rear rails extending upright from the chassis. The B-pillars provide support for the vehicle body. The rear rails also provide support for the body C-pillars as well as support for the rear wheel. The second sub-assembly contains a part of the vehicle body, a pair of upright A-pillars to support the vehicle body, and a pair of roof rails to provide support for the roof of the vehicle. The roof rails extend from the A-pillars.

In a further embodiment, a vehicle seat has a seat base and an upright seat back attached to the seat base to form a seating area. The vehicle seat has an inflatable bladder located in the central region of the seating area. The bladder can inflate to provide two bucket seats, and deflates to provide a bench seat. The bladder is in fluid communication with an air tank in the pneumatic vehicle. The vehicle seat also has inflatable inserts covering the seating area which provide cushioning, and the inserts are in fluid communication with the air tank.

BRIEF DESCRIPTION OF THE DRAWINGS

FIG. 1 is an overhead view of a city showing heavy traffic in the emerging metropolises;

FIG. 2 is a table of Vehicle Attribute Ranking;

FIG. 3 is a table of System decomposition metrics;

FIG. 4 is a Consumer needs—metrics matrix;

FIGS. 5a and 5b are a table of Benchmarked competitors' vehicle specifications and the pneumatic vehicle;

FIG. 6 is a table of Vehicle Level Design Targets;

FIG. 10 is a selection process diagram with both the engine selection criteria and engine possibilities;

FIG. 11 is a table of Weight saving by eliminating the need for some common powertrain components;

FIG. 12 is front view of a natural gas home filling station (http://www.myphill.com/index.htm);

FIG. 13 is a Comparison table showing electricity cost and fill times from 9 different size compressors; all compressor figures and models taken from (http://www.bauer-kompressoren.de/en/index.php); electricity cost is the Michigan State average as of March 2007;

FIG. 14 is perspective view of the compressed air tank of the pneumatic vehicle and its materials;

FIG. 15 is a side view of an aluminum scuba tank after explosion (http://www.thesailingsharkadventures.com/html/cylinder_fill s_and_safety.html);

FIG. 16 is a table of Fossil fuel emission levels—pounds per billion Btu of energy input, taken from (http://www.naturalgas.org/environment/naturalgas.asp);

FIG. 17 is a flow diagram illustrating thermodynamic processes for compressed air vehicle propulsion, following a similar model to: *Thermodynamic Analysis of Compressed Air Vehicle Propulsion*, Ulf Bossel, European Fuel Cell Forum;

FIG. 18 is a perspective view of a rotary air motor;

FIG. 19 is an exploded perspective view of a burner assembly for the pneumatic vehicle;

FIGS. 32a, 32b and 32c are a series of top views of the automation of a rotary steering damper, controlling the wheels sweep angle and damping co-efficient as the pneumatic vehicle speeds change;

FIG. 39 is a Parts list for the Front Suspension Assembly;

FIG. 40 is a Parts list for the Rear Suspension Assembly;

FIG. 41 is a perspective view of a lower vehicle body assembly (41a) and a perspective view of an upper vehicle body assembly (41b);

FIG. 43 is a Parts List for the Lower vehicle structure;

FIG. 49 is a perspective view of a simplified offset frontal crash finite element analysis (FEA) load case, used for the design of the front structure of the pneumatic vehicle;

FIG. 50 is top view illustrating load paths into the lower (50a) and upper (50b) pneumatic vehicle structures for an offset frontal impact;

FIG. 58 is a Parts List for the Upper vehicle body;

FIG. 60 is a side sectional view of the pneumatic vehicle interior;

FIG. 61 is perspective view of a seat design illustrating an incorporated inflatable silicon bladder to provide support for a diverse range of passengers;

FIG. 76 is a table of Parts manufactured using the RTM process;

FIG. 79 is a table of Parts manufactured using the Roll Forming Process;

FIG. 80 is a table of Parts manufactured using a Stamping process;

FIG. 81 is a table of Parts manufactured using the Casting Process;

FIG. 84 is schematic view of an assembly, service and sales facility;

FIG. 85 is a perspective view (85*a*) and a top view (85*b*) of a model of a home with the pneumatic vehicle and a compressor;

FIG. 86 is a table of Estimates of energy and wastes produced by various raw materials (Source: Sullivan (2001)—Life Cycle Assessment);

FIG. 87 is a Life Cycle Investment (LCI) of a modern generic vehicle (Source: Sullivan (2001)—Life Cycle Assessment); and FIG. 88 is a LCI of the pneumatic vehicle.

DETAILED DESCRIPTION OF EMBODIMENTS

Figure 7A:
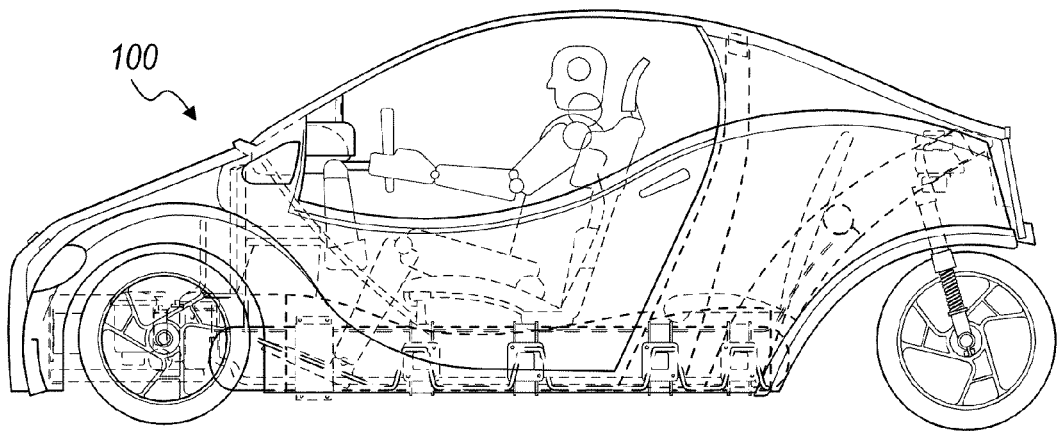
FIG. 7A is a side elevation view of a pneumatic vehicle according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

A vehicle concept was developed that would satisfy the wants and needs of the target market, as well as provide an environmental sustainable car that would respond to the global challenges of climate change.

Our design philosophy was influenced by Henry Ford's original thinking, which was new and different, and embraced simplicity and functionality in design. Henry Ford integrated his knowledge of materials, design and manufacturing to: combine functions of components into single systems; simplify the manufacturing of components and assemblies; and introduce advanced materials to the design. Our philosophy was also extended to adopt a holistic approach to not only the concept vehicle's design and development, but also the urban context in which it operates.

At least one embodiment is a small 3 wheel car, where the two front wheels are driven by hub mounted motors. The wheel hub motors are driven by compressed air supplied from a 60 liter carbon fiber storage tank and complemented when required by compressed natural gas supplied from a 2.2 liter storage tank. The chassis consists of roll formed ultra high strength steel, several stamped parts, and reinforced polymer upper structures to minimize weight and manufacturing costs.

Factors of our innovative and revolutionary design include:

The use of high torque compressed air wheel hub motors to reduce vehicle emissions to zero, depending on the distance option chosen;

The use of the high torque wheel hub motors enables the elimination of the conventional powertrain consisting of a reciprocating internal combustion engine including numerous auxiliary drives, gear box, clutch, copious universal joints, a driveline or transaxles. This represents a significant saving in cost and weight and a reduction in the overall carbon foot print involved in the vehicle's manufacture and over its life cycle.

Differential wheel speeds are used to steer the vehicle via the wheel hub motors which eliminates the need for a conventional rack-and-pinion steering system. This simplifies the steering and suspension system, not to mention weight saving, and the significant savings in the overall cost of the vehicle;

The unique low cost, highly efficient powertrain only uses energy on demand, so that when the vehicle is being driven compressed air is drawn from the storage tank to suit the demands of the operating environment. However, when the vehicle is stationary, for example at traffic lights or is caught in a traffic jam, then no compressed air is drawn from the storage tank.

Utilizing the wheel hub motors and the trailing rear wheel increases the agility and maneuverability of the vehicle in especially in city and urban contexts;

The use of Ultra High Strength Steels in the vehicle chassis and the application of novel manufacturing methods to increase strength that reduces the overall weight and cost;

The carbon emissions created from our vehicle are concentrated at the power generation side through the air compressor filling stations. It is our belief that greater efficiencies can be found through large economies of scale of renewable power generation than implementing small scale renewable power generation on each car. For example, solar cells can only run at maximum efficiency if they are always facing the sun (or solar concentrator), which is not always possible on a vehicle;

A flexible vehicle design with an easily adaptable human-machine interface that will keep the vehicle competitive for at least a decade of advances in software technology;

The simplicity of the design and assembly means that alternative assembly strategies can be adopted including the assembly of the vehicle at Dealers, which was the original business model used by Ford Australia back in the early 1900's when the Model-T was first marketed and sold in Australia and New Zealand.

Introduction

This section provides an overview of the initial design approach and the formulation of our design philosophy—Integrated Simplicity. It outlines the proposed mission statement, our market and consumer selection approach and the development of system level needs and metrics required to ensure the design of embodiments of the invention was successful.

Oct. 1, 2008 is the 100 year anniversary of the launch of the Model-T Ford. This revolutionary car dominated the automotive industry for the next two decades.

In the Asia/Pacific region there is more than half of the world's population (over 3 billion people). This enormous population is just beginning to enjoy a rising standard of living, greater economic freedom and increasing purchasing power. The Asia/Pacific region is where future non-traditional consumers will be found, and typically this will be in the growing metropolises of China and India. For example, Shanghai has over 18 million people, some estimate total population at 25 million, and growing.

Some factors for inclusion in our design included: city driving, flexibility in use, agility, space saving, need for low emissions, easy to park. If embodiments of the invention are to dominate in the 21st Century like the Model-T did in the previous century, then our concept contemplates upgrades both in hardware and software.

Our design objectives were therefore to provide:
A cost effective design;
An innovative design;
High quality passenger protection;
A robust lightweight vehicle;
A step change in the manufacturing and assembly of the vehicle;
A reduction in the environmental impact consistent with global consumer concerns;
Consumer appeal to satisfy a wide and diverse market.

Consumer Needs, Concept Metrics, and Design Targets

Mission statement for Embodiments of the present invention: "We aim to deliver a concept for a vehicle which will revolutionize the way automobiles are manufactured, used and perceived. It should push the boundaries of current automotive thinking, leading the way in vehicle and manufacturing innovations. It should be affordable for all to own and maintain, suiting a great multitude of people from diverse backgrounds. It should be sustainable and environmentally friendly, with its existence prevailing well into the future. This project will involve skills, expertise and knowledge from a broad range of disciplines."

The mission for our vehicle design was to create a revolutionary, simple, practical, and innovatively sustainable vehicle. To complete this mission the consumer needs have to be identified to ensure the vehicle is both a revolutionary car and a popular car.

Consumer Needs

The target market for the concept car is the growing cities of China and India. See FIG. 1. Our market research from surveys and interviews with city drivers in India (Bangalore and Chennai) provided the following anecdotal advice:
Highly populated cities in south Asia have an average driving speed of 16 kmph and therefore it is pointless to buy expensive cars which claim to go 0 to 60 kmph in 5 seconds;
Increasing rates of fuel in south Asian countries are a big concern for drivers;
Instead of purchasing a second hand car customers may like to buy a no frills, functional brand new car.

The persons interviewed ranged from university students and young professionals to family bread winners and home makers. Similar advice was received from colleagues and associates who had grown up in China. We then developed consumer needs from our survey data and our intuition about what the non-traditional consumer may want.

We have targeted the large busy city user within the Asian/Indian region. We believe that there is scope to cross over to the crowded cities of Europe, if the correct quality vehicle can be produced. Our identified consumer needs were as follows:
Cheap to purchase;
Cheap to run/maintain;
Ease of parking, maneuverability in busy cities;
Versatility;
Relative storage capacity;
Stylish design;
Good performance;
Safe.

Technology Push

We believe that new technologies and innovative ideas can be pushed on to the market via the vehicle concept:
New efficient and effective manufacturing ideas;
New material selection;
Vertical integration—assembly process;
Innovative mechanical/vehicle design;
Innovative powertrain choice;

Vehicle Attribute Definition

The classification of vehicle attributes was developed according to the consumer needs and manufacturer descriptors. See FIG. 2.

Concept Metrics

Once the consumer needs are determined, measures or metrics are determined so that the developed concepts can be assessed or ranked against each other and against other competitors.

The system metrics were determined and are shown in FIG. 3. The needs-metrics matrix shown in FIG. 4 ensures all of the consumer needs are covered by the determined metrics.

A benchmarking exercise was undertaken to determine how the competitors' cars compare against the metrics. The compared cars were: Smart car—2008, Tata Nano, Hyundai i10—2008, Toyota Yaris—2008, Toyota IQ—2009, Mitsubishi—2005, Chevrolet Spark, Chery QQ3, Maruti 800 Duo, Daihatsu Trevis. The comparison of the benchmarked vehicle specifications is shown in FIGS. 5a and 5b with the final vehicle specification shown for the vehicle concept car detailed in the first column.

Design Targets

After reviewing the benchmarking results and determining the best-in-class vehicles, design targets shown in FIG. 6 were created such that our concept would be a competitive car.

Vehicle Design

Figure 7B:
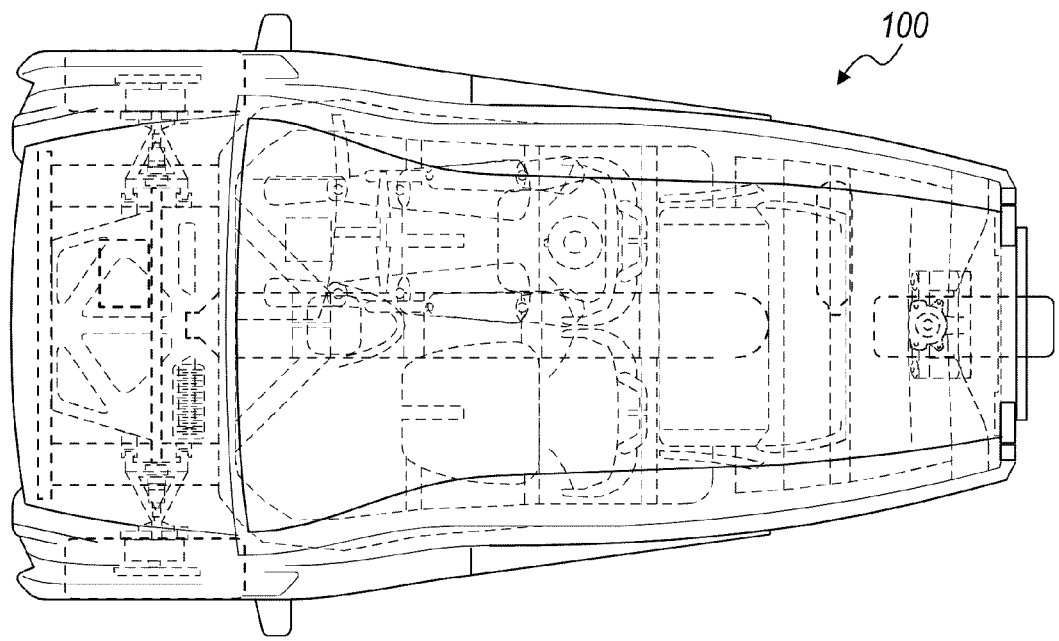
FIG. 7B is a top plan view of the pneumatic vehicle.

A pneumatic vehicle 100 is illustrated in FIGS. 7A and 7B according to an embodiment of the invention. This section reviews the engineering behind the pneumatic vehicle design. The engineering analysis and the detail behind the decisions are discussed. The section begins with a section on a powertrain, which outlines the reasoning behind choosing a compressed air motor, as well as the benefits of using a hub motor. The pneumatic vehicle dynamics section defines the stability of the pneumatic vehicle design. Front and rear suspensions are also reviewed and are followed by the section on the pneumatic vehicle's structure. The structure is defined and the details of some of the manufacturing systems are described. This is followed by sections describing the interior of the car, and the control systems within the pneumatic vehicle 100.

Powertrain

The pneumatic vehicle powertrain 102 is an innovative integrated design that simplifies mainstream current vehicle powertrain designs. This brings many benefits to the pneumatic vehicle 100, namely:

Excellent integration of components;
Simplicity;
Greatly lowered part count;
Reduced area needed for powertrain components;
Reduced maintenance requirements over conventional powertrain options.

Selection of powertrain alternatives was completed with several criteria. As with the rest of the car the design criteria included efficiency, integration, simplicity, cost and weight. Current vehicle powertrain solutions are inefficient, heavy and complex. Components like gearboxes, differentials and reciprocating engines all have significant parasitic and rotational losses that greatly reduce the overall efficiency of the vehicle.

The pneumatic vehicle 100 incorporates two hub motors 104 powered by heated air. This means that complex and expensive components like the gearbox, differentials and drive shafts are no longer required. The fuel storage 106, in this case air, is located down the center of the car 100 and forms a backbone to the chassis and body structure.

Figure 8:
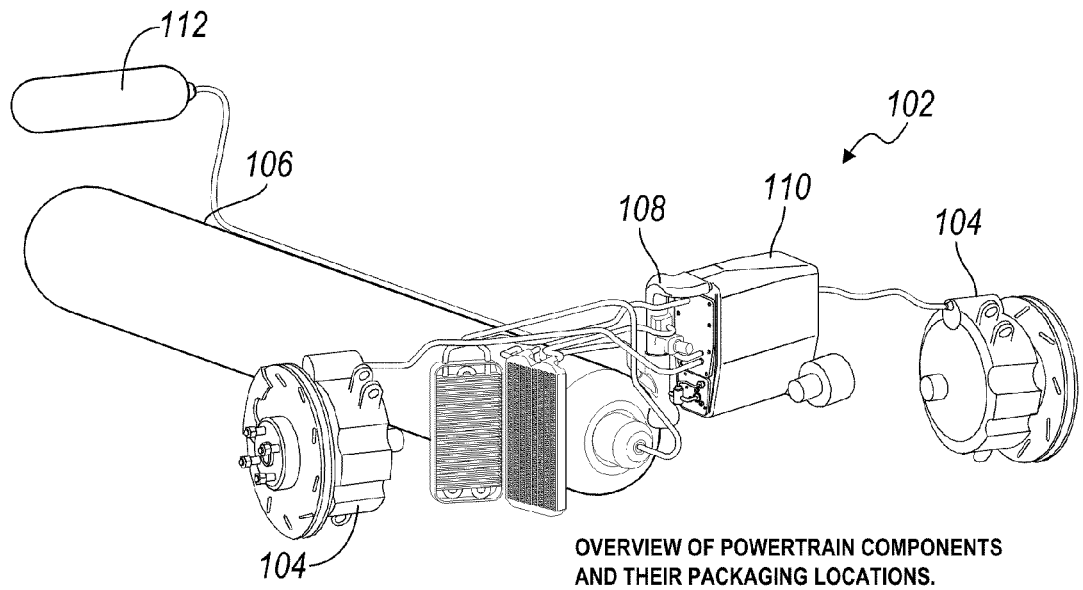
FIG. 8 is a perspective view of powertrain components of the pneumatic vehicle and their packaging location.

In order to get greater efficiency/range out of the air stored in the air cylinder 106, the air can be heated. This is done by passing the air through a heat exchanger 108 heated by a small natural gas burner 110. The burner 110 and heat exchanger 108 are located in the front of the pneumatic vehicle 100 whereas a Compressed Natural Gas (CNG) cylinder 112 is located at the rear of the pneumatic vehicle 100. FIG. 8 shows the powertrain 102 solution for the pneumatic vehicle 100 concept.

Powertrain Targets

The powertrain 102 related targets set for the vehicle 100 concept are as follows:

Excellent Parking/Maneuverability;
Safe;
Environmentally Friendly;
Low Cost (both manufacture and purchase);
Ease of Manufacture;
Cheap to Run/Maintain;
System Integration;
Simplicity;
Vehicle top speed—110 km/h (68 mph);
Vehicle acceleration—0-100 km/h (0-62 mph) in less than 16 seconds;
Range—200 km.

These targets were used to evaluate the feasibility of 4 powertrain options, as shown in the following section.

Figure 9:
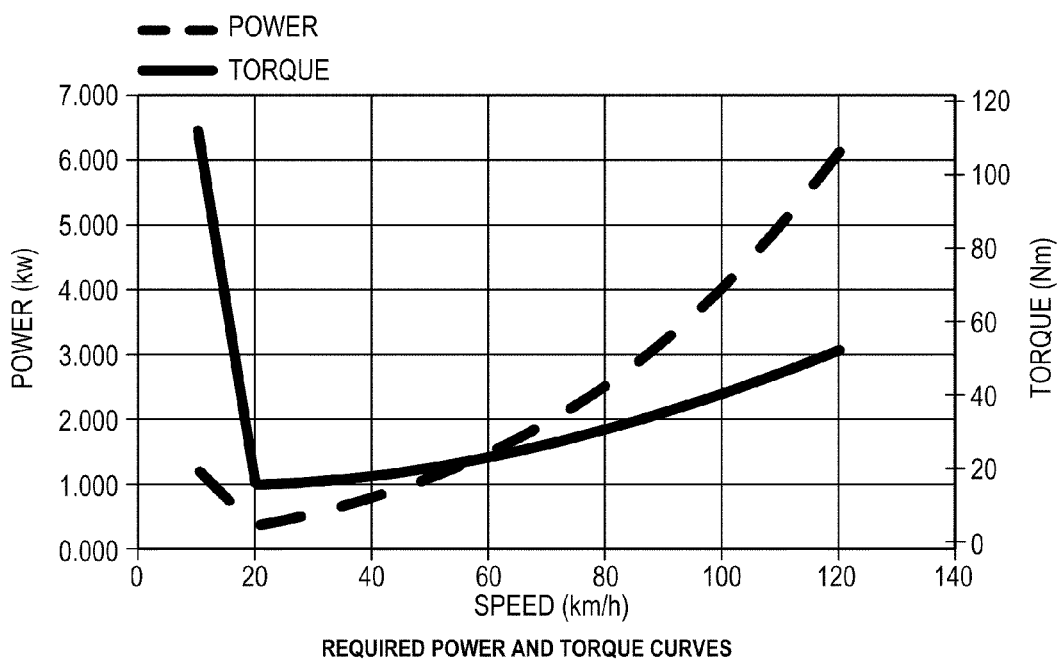
FIG. 9 is a graph illustrating the calculated Power & Torque requirements for the vehicle as a function of vehicle speed.

FIG. 9 shows the calculated torque and power requirements. These figures were calculated using an acceleration of 0-100 km/h of 16 seconds and take into account rolling and aerodynamic resistances.

Engine Concept Selection Criteria

The selection process was guided by a prioritized set of criteria; this is depicted in FIG. 10. The connections on the left show possible alternatives whilst the connections on the right and center show the criteria used to narrow down possible alternatives.

The power source for the car 100 should be environmentally friendly both in its manufacture and in its use by the end user. In addition, the powertrain 102 system should be environmentally friendly at the end of its lifecycle (when it is disassembled).

With today's level of uncertainty about the life of oil based fossil fuels and global warming, it was evident that the pneumatic vehicle 100 should distance itself from inefficient reciprocating engines using oil based derivatives as a fuel source.

From the design criteria it was decided that the pneumatic vehicle 100 would incorporate hub motors 104 into the front wheels 114. More details on the maneuverability of a pneumatic vehicle 100 with hub motors 104 can be found in the Vehicle Dynamics section. Using a hub motor 104 enables significant gains in manufacturing costs, weight and packaging. FIG. 11 shows the possible weight benefits that can come from placing the motors 104 in the hub of the wheels 114. This initiative gave the optimum compromise of the above selection criteria. As for packaging, using a hub motor approach allows for greater flexibility and freedom to place components and systems in unobtrusive places. This means the whole powertrain 102 system can be unobtrusive to both the passenger and storage compartments. The two possibilities for hub motors 104 are either electric or pneumatic.

Comparison of Electric and Pneumatic Hub Motors

The package space for either electric or pneumatic motors 104 will be similar. Both types of engines are of a similar size. The performance of both engines is similar with regard to torque and power curves, with approximately similar efficiencies. The weight of an air engine 104 may be marginally higher than an electric engine due to the high pressures that the engine runs at. Both engines will have zero carbon emissions from the vehicle side (however, both would need some form of recharging, generally this is provided by the grid).

One of the challenges with compressed air hub motors 104 can be the powering the auxiliaries. The common engine auxiliaries (power steering, air conditioning condenser & alternator) can all be replaced by alternate systems to give the same result. The pneumatic vehicle 100 design actually does away with the need for both power steering and an air conditioning condenser. Power steering is inherent due to the design of the pneumatic vehicle 100, which uses the speed difference between the front wheels 114 to turn. So the motors 104 themselves not only provide the forward motion for the car 100 but also all the turning ability of the car 100. As for the air conditioning, the air leaving the regulator of the air cylinder 106 is extremely cold, freezing in fact. This property will be exploited for cooling of the cabin.

The major problem with the electric alternatives is that they generally require costly limited-lifespan batteries, either on their own or coupled to a fuel cell. With a battery electric car, the disposal of the system at the end of its life can cause issues with heavy metals placed into landfill especially in developing countries (places like China & India). In the urban areas of China during 2004, 190,000,000 tonnes of municipal solid waste was produced; this is expected to reach 480,000,000 tonnes by the year 2030. No other country has ever experienced such a rapid increase in waste generation.

Even in countries like America there are some staggering statistics with regard to the recycling of rechargeable batteries. The U.S. EPA notes that in 1995, even though batteries made up less than 1% of municipal solid waste, they accounted for 75% of the cadmium (from Ni-Cad batteries) found in municipal solid waste. In California during the year 2001, 507,259,000 smaller primary (non-rechargeable) and secondary (rechargeable) batteries were sold. Of these only 0.55% was recycled.

Compressed air was therefore chosen as the ideal powertrain 102 for its flexibility, simplicity, available infrastructure and cost effectiveness.

Rotary Compressed Air Motor Design

The biggest initial negative perception of a compressed air powertrain 102 is the size of the compressed air cylinder/tank 106.

There are two main ways to reduce the size of the air tank 106 in a pneumatic vehicle 100, these being:

To increase the tank pressure;
 Use heat to expand the air in the lines to the motors 104.

The tradeoffs with these solutions are:

Increased tank pressure:
 Need for more exotic materials;
 Increased cost;
 Increased complexity;
 Bigger more expensive compressors;
 Increased weight.

Use of heat to expand air:
 Requires a either a fuel source to burn or a material to store heat;
 Produces some carbon emissions;
 Requires a second pressure vessel or tank 112, hence added cost;
 Added complexity.

Looking back at the original criteria for choosing a powertrain source, it was decided to go with a standard pressure and to introduce a flexible burner 110 to the system. The burner 110 is flexible because the burner system can be changed to suit the availability of a fuel source depending on where the car is marketed in the world. This means that the burner 110 could be optimized to run on: bio fuels, solid fuels, decomposition by-product gasses (like methane collected from animal manure or waste degradation), propane, etc. Compressed Natural Gas (CNG) was chosen as the primary burner fuel source. CNG burns cleanly, can produce a large amount of heat energy and is cheap to buy in thousands of locations already. The other major marketing advantage with natural gas is that it is already plumbed into over 52% of all homes across the US. According to the U.S. Censor Bureau, 70% of all new homes in 2003 used natural gas for heating. This allows house occupants to own their own filling station, something that is already readily available. FIG. 12 shows a current model home filling station, already on the market and installed in many homes.

Due to the large volume of the air tank 106, a practical place that it can be situated within the pneumatic vehicle 100 is down the center of the car 100. The tank 106, being a very stiff member, can now be incorporated into the chassis and vehicle structure, as detailed in the Vehicle Body and Structure section. This provides a stiff 'back bone' to the structure of the car 100, as well as being a practical pressure vessel 106.

The pressure in the tank 106 is 5000 psi (345 bar); this was chosen given the range of compressors available. At this pressure there are many options for the physical size of the compressor, the power of the compressor and also recharge time needed. The size of the compressed air tank 106 required is 60 liters (calculations shown later), from this we can look at recharge times and costs. FIG. 13 illustrates the cost versus time to fill the tank 106 from completely empty to full. However, as the time and cost decrease, the capital cost of the compressor increases significantly.

Due to the physical size and pressure of the tank 106 and the significance of keeping weight down, a composite wound aluminum tank 106 is adequate. FIG. 14 depicts different material layers that make up the tank 106.

The aluminum in the cylinder 106 provides the initial airtight cylinder shape to filament wind carbon fiber 116 onto as well as the ability to thread in regulators and other plumbing into the neck of the bottle. The carbon fiber 116 is then wound onto a spinning aluminum section at optimum angles to resolve the forces through the tank 106; this is where the tank 106 gets additional strength. The final layer 118 of the tank 106 comprises of fiberglass and aramid fibers (Kevlar), this provides the toughness and ensures stones and other debris that could possibly be thrown up from the road do not affect the integrity of the carbon strength layer.

Composite air cylinders 106 also provide greater safety in the unlikely event of an accident severe enough to rupture the tank 106. Aluminum and steel cylinders tend to rupture violently releasing all the encapsulated energy at once, FIG. 15 shows the failure of an aluminum scuba tank. In contrast, composite cylinders 106 behave differently, with a tendency to fail along a corkscrew pattern around the tank 106. This is because it is easier for the crack to propagate between windings rather than breaking the winding. This allows for the contained energy to be dissipated over a longer duration with the tank 106 still holding general form. The composite tank 106 reduces the effect of an explosion, as well as the risk of flying shrapnel.

The regulator 120 is of a common range, making it cheap to obtain. The regulator 120 is located in the neck of the cylinder 106 to avoid the possibility that air could leak from the cylinder 106 uncontrollably, or that the regulator 120 could be damaged during a collision. This is a common failure that occurs with both medical and dive cylinders if dropped. The regulator 120 also incorporates a pressure relief valve and solenoid. This avoids any chance that the cylinder 106 could be over filled causing damage or failure of the pressure vessel 106.

Emissions (Burner)

Natural gas is one of the cleanest fossil fuels, due mostly to its simple molecular composition. The major emissions from the combustion of natural gas are carbon dioxide and water vapor. Compared to the combustion of oil, natural gas emissions have considerably lower levels of nitrogen oxides and sulphur dioxides and almost no particulate matter. FIG. 16 shows the great reduction in the major greenhouse gasses that natural gas offers over the combustion of oil or coal.

When burning natural gas in a typical combustion engine, there are significant environmental gains that can be made. The U.S. Environmental Protection Agency reported that in a direct comparison to gasoline, possible reductions in emissions are:

90 to 97 percent reduction in carbon monoxide;
 Carbon dioxide reductions of 25 percent;
 Reductions in nitrogen oxide emissions of 35 to 60 percent;
 Potential reductions in non-methane hydrocarbon emissions of 50 to 75 percent;
 Fewer toxic carcinogenic pollutants;
 Little to no particulate matter produced;
 No evaporative emissions.

(Source: http://www.eere.energy.gov/afdc/pdfs/epa_cng-.pdf).

If wanted or needed, the pneumatic vehicle 100 can operate without the burner 110 operating, effectively creating a zero emissions pneumatic vehicle 100.

Analytical Thermodynamic Calculations.

The tank size can be calculated using the following defined values:

| | |
|---|---|
| Tank Pressure (air), P0 | 34.474 MPa |
| Tank Pressure (CNG) | 20.684 MPa |
| Line Pressure | 0.655 MPa |
| Ambient Temperature, T0 | 20° C. |
| Temperature drop through regulator, T1 | −20° C. (a) |
| Temperature increase in burner, T3 | 400° C. |
| Volume of air for one cycle of motor, V3 | 255 cc |
| Polytropic expansion efficiency of motor, η | 0.85 (b) |
| Polytropic expansion coefficient, n | 1.35 |
| Runtime for 200 km range, t | 2452567 s (c) |
| Motor rpm | 472.58 rpm (d) |
| Natural gas burner efficiency | 0.85 (a) |
| Vehicle weight (fully laden) | 530 kg |

Where the reference letters above indicate;
(a) Assumed value
(b) Known value
(c) Accelerating from standstill to 50 km/h and maintaining till 200 km overall distance is covered.
(d) Whilst running a 185/35 R17 tire.

Using the equations and theories stated in FIG. 17 the following results are calculated:

The capacity of the compressed air tank 106 is 59.65 L;

The amount of heat energy is 184.3 J per revolution, which gives a total of 20,905,259 J for 200 km distance;

The capacity of the compressed natural gas tank 112 is 2.19 L;

The distance that can be traveled out of a 60L capacity compressed air tank 106 using no natural gas or burner 110 is approx 71 km;

Carbon emissions for the same 200 km journey are 6.84 g/km.

The Rotary Air Motor

The rotary air motor 104 of FIG. 18 is based on a rotary piston. It uses a simple cylindrical rotary piston which rolls, with minimal friction, inside the cylindrical stator. The space between stator and rotor is divided into a series of expansion chambers, where the air is injected. This drives the piston in a rotary motion over a thin cushion of air. Timing and duration of the air inlet and exhaust is governed by a slotted timer which is mounted on the output shaft and rotates with the same speed as the motor 104. Variation of performance parameters of the motor 104 is easily achieved by varying the time during which the air is allowed to enter the chamber. Motor speed and torque are simply controlled by throttling the amount or pressure of air into the motor 104. The rotary air motor 104 gives instant torque at zero RPM and can be precisely controlled to give soft start and acceleration control. Their small size, lightweight and compactness aids in the integration of all components in the car. Not only do they serve as device to create motion, but as suspension components, with one located in each front wheel 114.

The Burner

The burner 110 consists of a simple proven design, similar to that found in many other applications. FIG. 19 shows the exploded view of the complete burner assembly 110.

The burner 110, like the rest of the car 100, was designed to be simple with minimal maintenance requirements, low part count and reliable. A small draft blower fan 122 moves the hot air through the system and this ensures that all fumes are pushed through the exhaust 124 to the rear of the car 100. The inherent design of burner jets 126 is similar to a common venturi burner, in that there is no need for forced air induction to maintain a flame.

Figure 20:
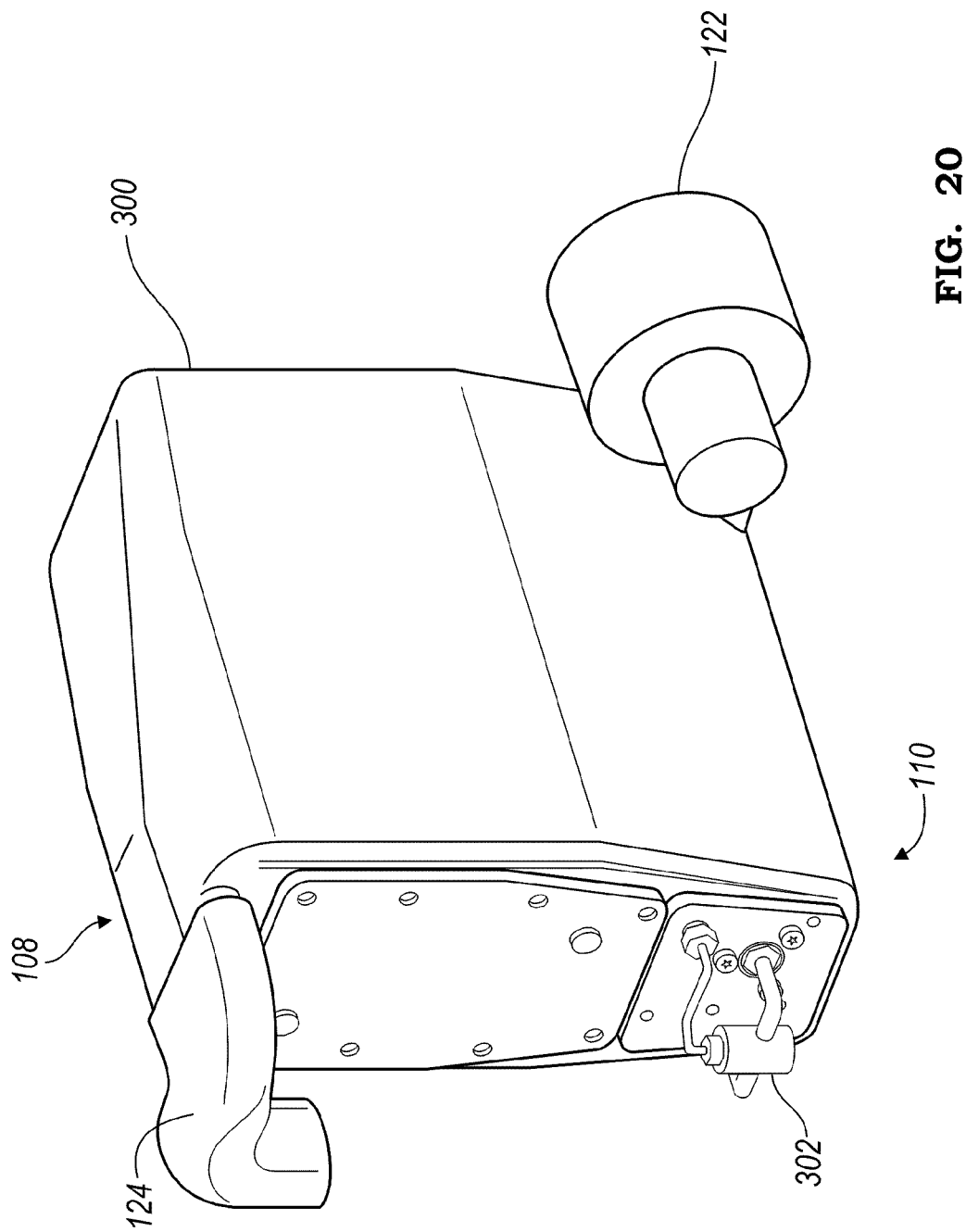
FIG. 20 is a perspective view of the burner assembly with the housing.

As far as controls go, the burner 110 will self ignite when required and switch off when not required, like at traffic lights and when in traffic congestion. The burner 110 ignites once the pneumatic vehicle 100 has been moving above a particular speed for a predetermined duration. The burner flame will be a small and steady spread over seven jets 126 to provide nice even heating to the heat exchanger 108. FIG. 20 shows the burner assembly 110 with the housing removed.

As mentioned earlier in the report, the burner 110 is not required for the pneumatic vehicle 100 to operate in large cities where it may mean that no emissions from vehicles are allowed. For this the pneumatic vehicle 100 can turn off its burner 110 and travel a reasonable distance without emitting a single emission from the pneumatic vehicle 100.

Figure 21B:
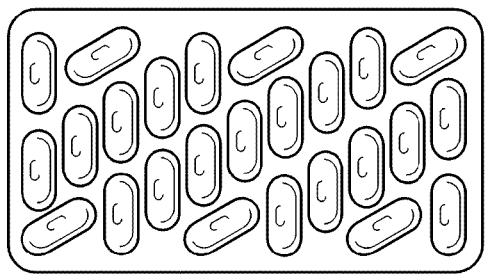
FIGS. 21a and 21b are side views of a counterflow heat exchanger design.
Figure 21A:
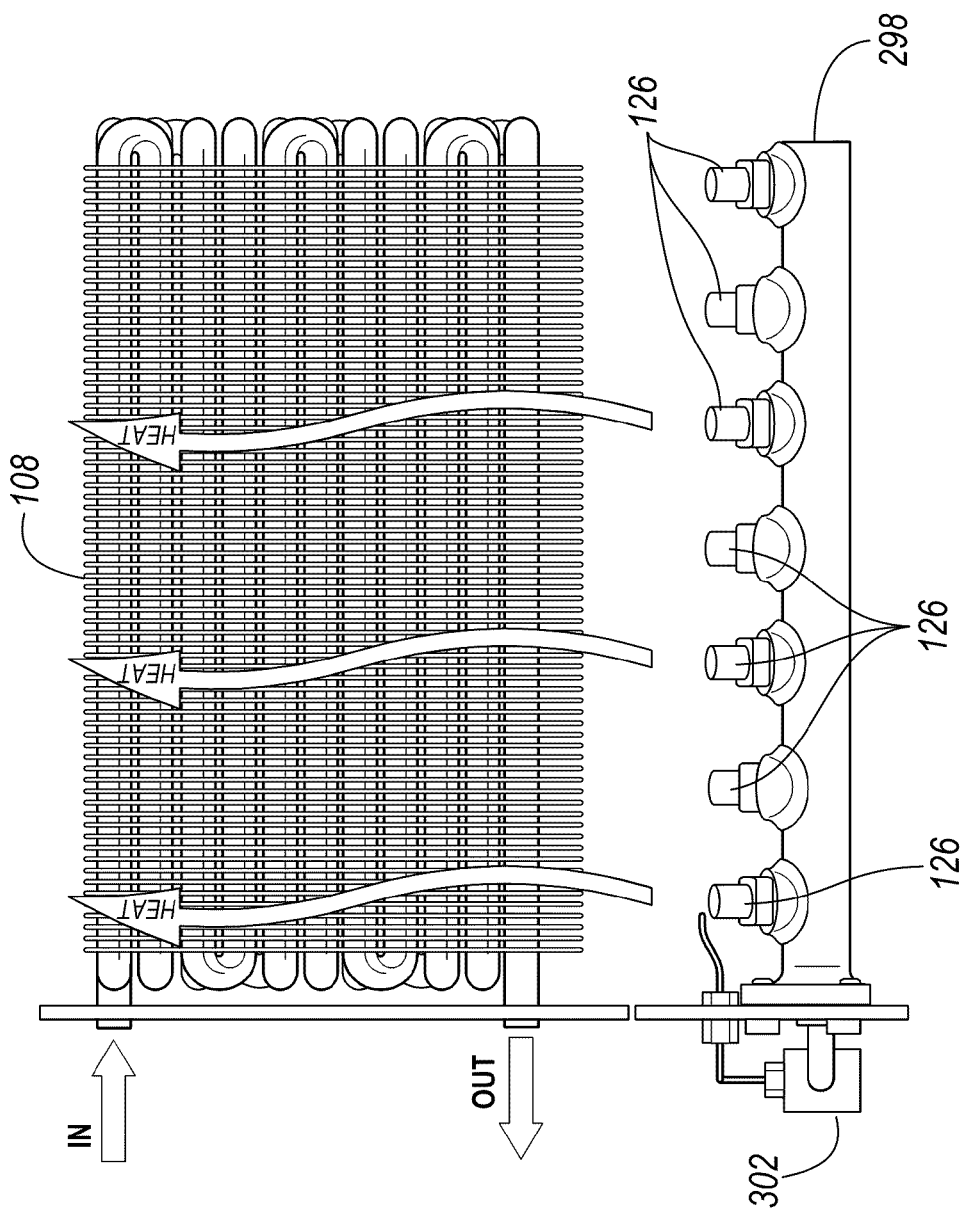

The heat exchanger 108 is a counter flow design heat exchanger 108 making it efficient and compact. The flow diagram is shown in FIG. 21a.

HVAC System

Figure 22:
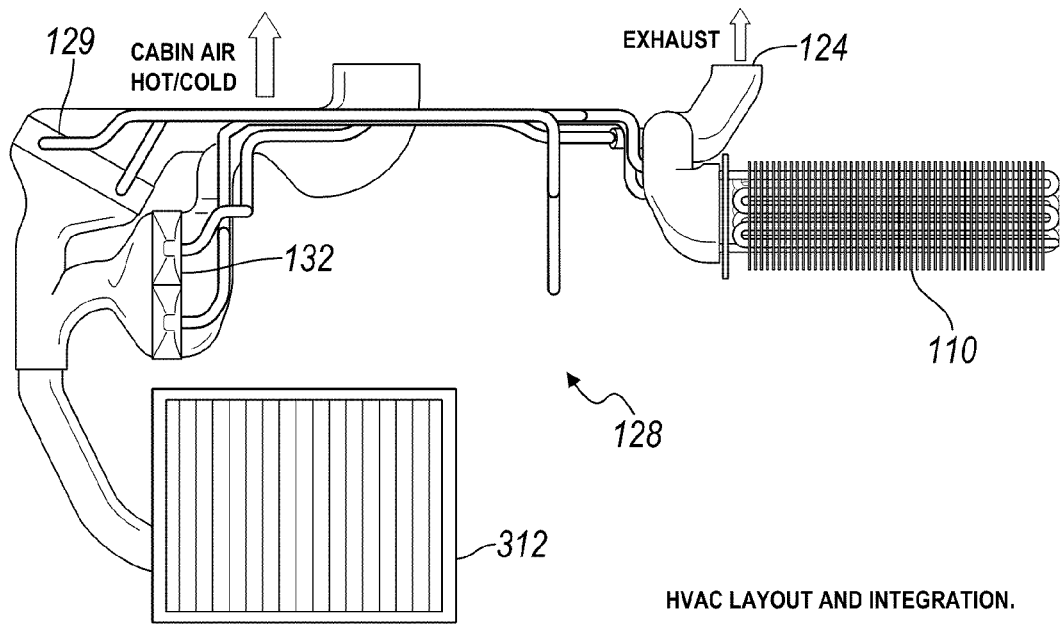
FIG. 22 is a plan view of a heating, ventilating and air-conditioning (HVAC) layout and integration with the counterflow heat exchanger.

A Heating, Ventilating and Air-Conditioning (HVAC) System 128 for the pneumatic vehicle 100 is not a typical Heating, Ventilating and Air Conditioning system, because there is no true air conditioning in the pneumatic vehicle 100. The cooling is a result of the pressure change from the cylinder 106 to the burner 110. The cold air is conveyed through a heat exchanger 129 for cooling air to the cabin. Such a large pressure drop produces very cold temperatures. FIG. 22 shows the relationship and integration with the burner system 110.

Figure 23:
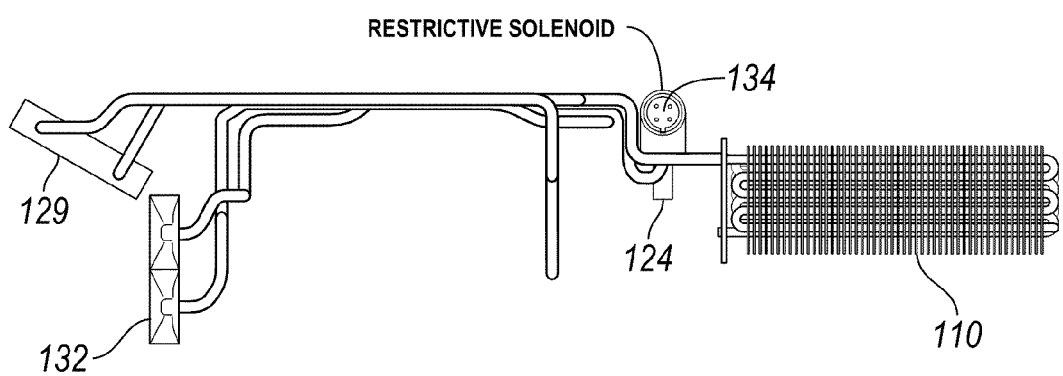
FIG. 23 is another plan view of the HVAC system and integration with the counterflow heat exchanger.
Figure 24:
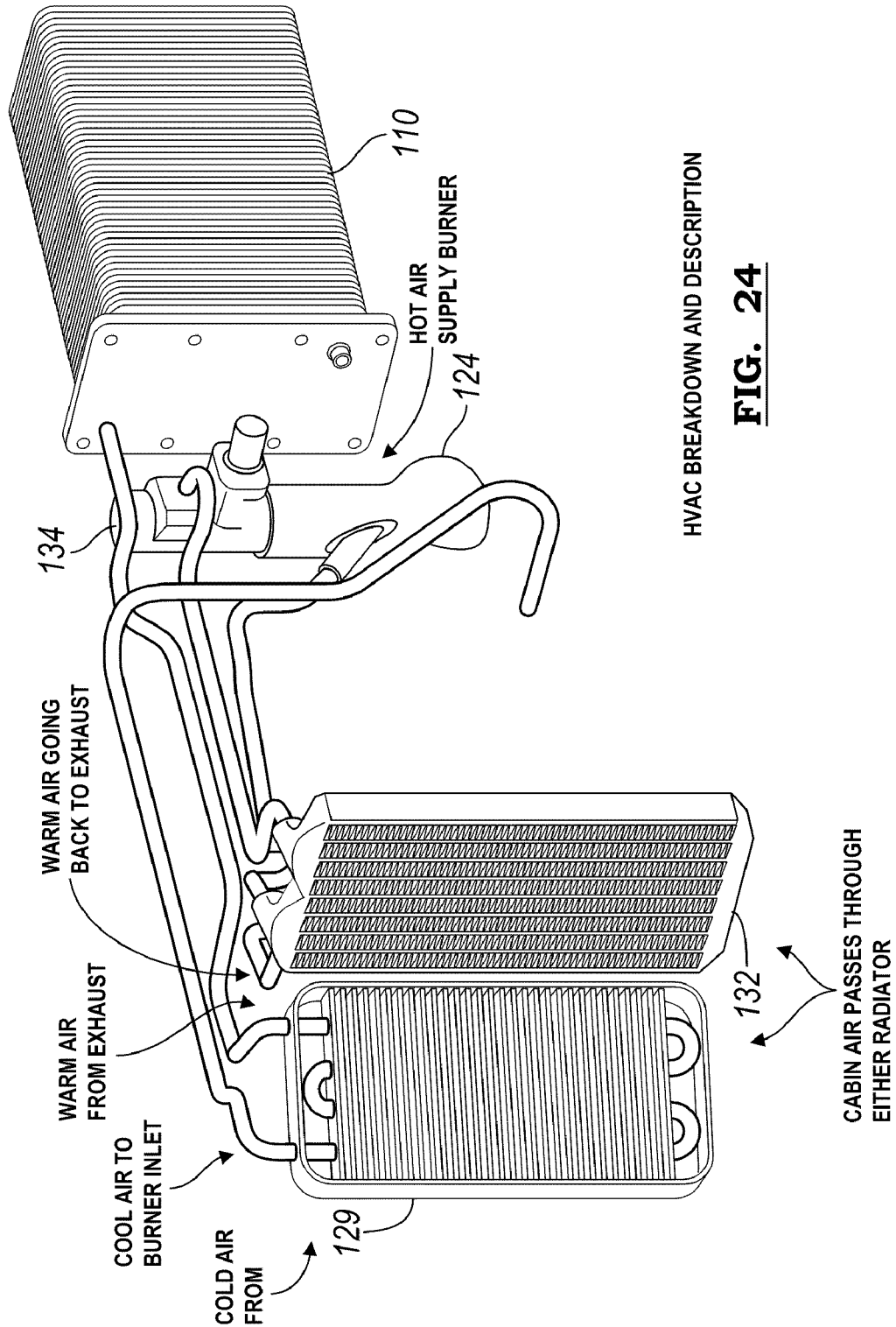
FIG. 24 is a perspective view of the HVAC system and integration with the counterflow heat exchanger.

A heating system 130 of the HVAC system 128 involves a waste heat recovery radiator 132 to capture any remaining heat left in the exhaust system 124. This is done by re-routing a majority of the exhaust system 124 with a restrictive solenoid valve 134 also shown in FIG. 23. A description of the parts is shown in FIG. 24. An HVAC fan 136 blows air through either radiator 132 depending on user inputs to a car control unit (CCU), at the same time the restrictive solenoid 134 will only engage when heating is selected.

The Packaging

Figure 25A:
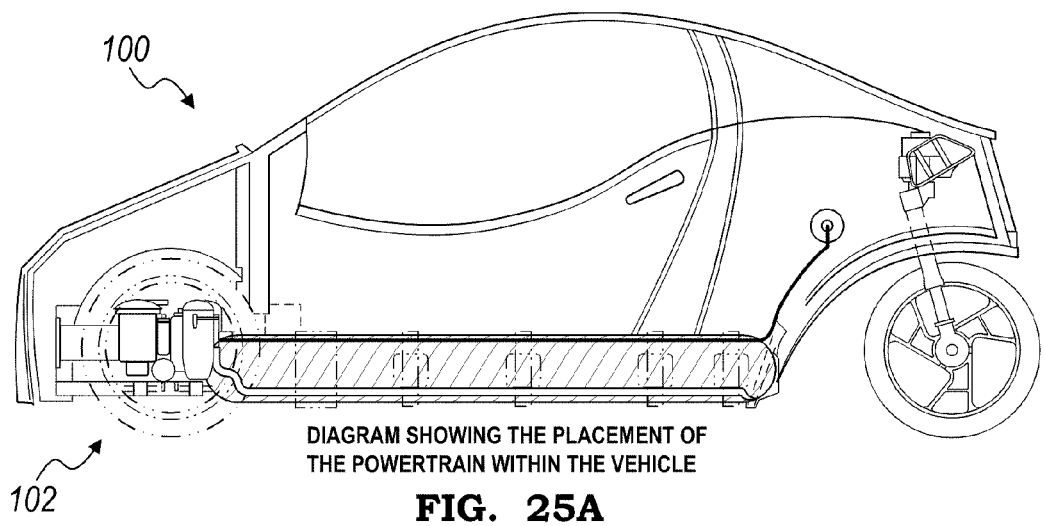
FIG. 25 is a side sectional view (25a) and a perspective view (25b) of the pneumatic vehicle illustrating the placement of the powertrain within the vehicle.
Figure 25B:
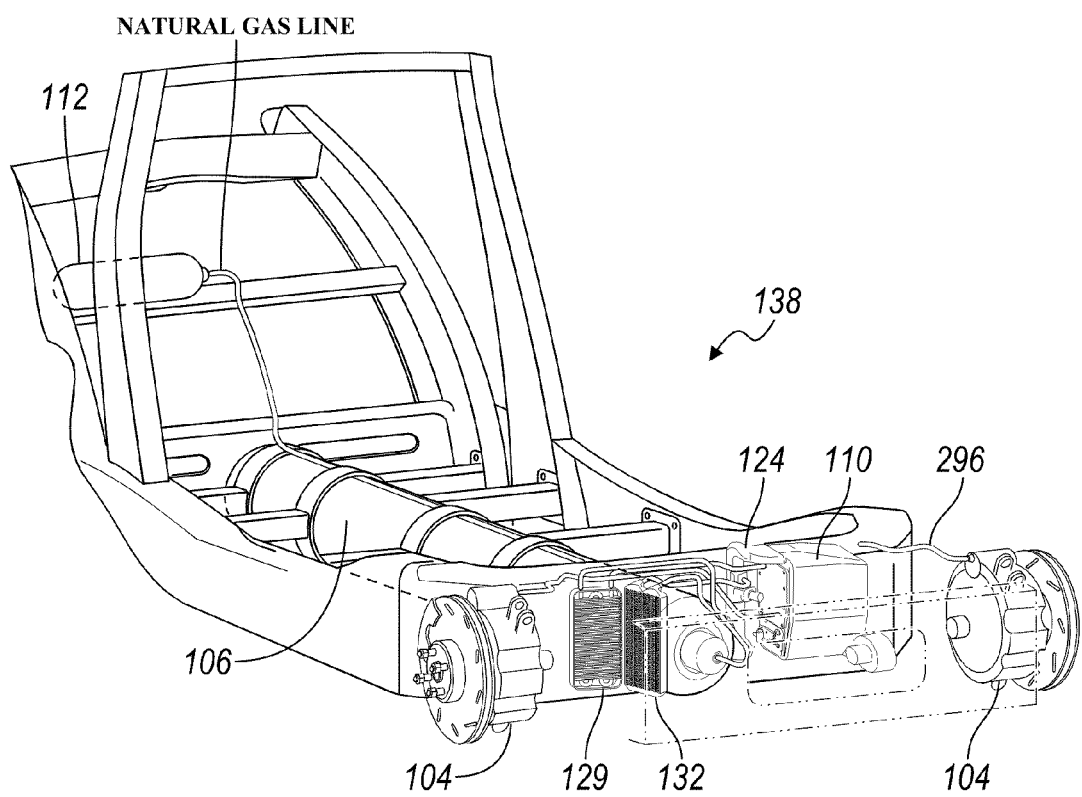

The packaging of the powertrain 102 within the pneumatic vehicle 100 is integrated neatly into the structure's floor 138. This results in minimal intrusion into both the passenger compartment and also the storage compartments. FIG. 25 shows the placement of the powertrain 102 system within the pneumatic vehicle 100.

Vehicle Dynamics

Simplicity, integration and lightweight are the functional design targets of the vehicle dynamics system of the pneumatic vehicle 100. By ensuring components serve multiple purposes, through design integration, which has aided in reducing cost and weight, resulting in a simple but effective solution. The desires for a small, nimble and agile vehicle 100, well suited to bustling cities of today and the future, has prompted the decision for a three-wheel pneumatic vehicle platform 100. Integrating the two direct drive hub motors 104 allows for the implementation of a simple speed differential steering system 140. By simply and precisely controlling the speed of each wheel's hub motor 104 allows the pneumatic vehicle 100 to steer; this combined with a trailing single rear wheel 142 allows the pneumatic vehicle 100 to turn on the spot, making it easy to navigate through congested city streets and into tight parking spaces with ease. At higher speeds, to ensure the pneumatic vehicle 100 is stable, the rear wheel 142 is actively damped by a rotary steering damper 144. The entire vehicle dynamics system is precisely controlled by a Car Control Unit (CCU), which makes the tuning the handling characteristics extremely flexible.

Vehicle Platform

Three wheel vehicles are currently becoming more popular throughout the world and are quite prominent in many Asian based countries. Often termed a tri-car or cycle-car due to its commonalities between a car and a motorcycle, three wheel vehicles have the scope to be extremely lightweight, fuel efficient and yet very versatile for many urban or city residents. The three wheel platform inherently lends itself to the design philosophy of simplicity and total integration, whilst allowing for excellent maneuverability, through its steering system 140, which utilizes the two rotary air motors 104 as its steering device 140. However, careful approach to the design must occur in order to cater to the three wheeler's inherent dynamic characteristics. Poorly engineered three-wheel vehicles can have problems with roll-over stability; whereas a well designed three wheel vehicle 100 can have a roll-over stability and superior steering response to that of traditional four wheel. This occurs due to the reduced Yaw moment, which aids in the agility of the pneumatic vehicle 100.

Vehicle Footprint

Given the desire for a small and nimble vehicle, the selection of the wheelbase, track and overall vehicle dimensions are factors. A small overall size achieves two of the design targets, lightweight and high maneuverability, whilst also complementing a reduced overall vehicle cost. Benchmarking against competitor vehicles in the micro/small car category provided an initial overall sizing, however, refinement of the pneumatic vehicle's 100 sizing specification was revised throughout the design to ensure suitable packaging, roll-over stability and appropriate weight distributions were achieved.

Figure 26A:
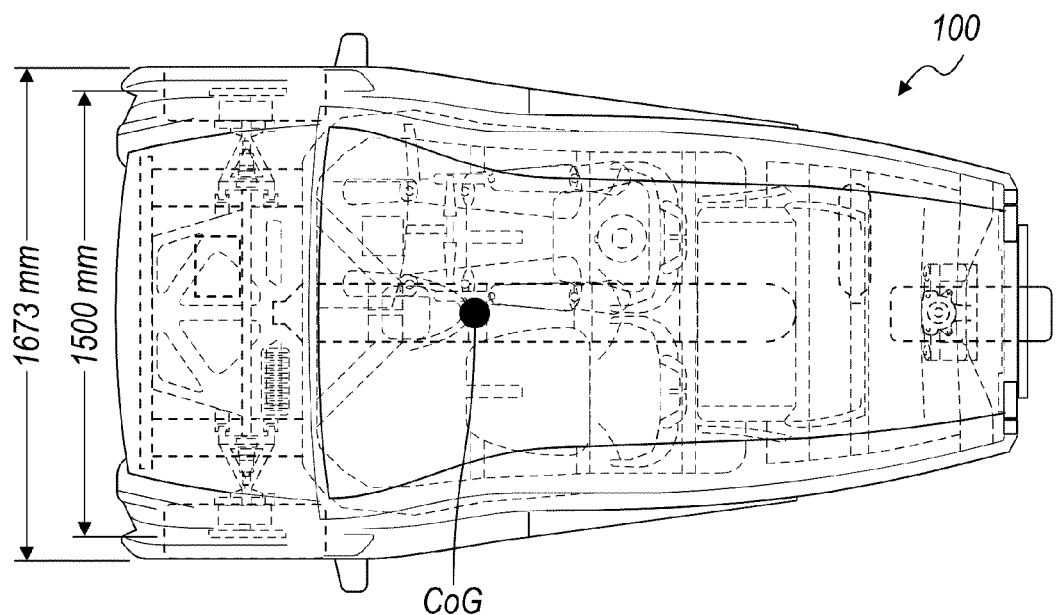
FIG. 26 is a top view (26a) and side view (26b) of the pneumatic vehicle illustrating vehicle dimensions and a center of gravity.
Figure 26B:
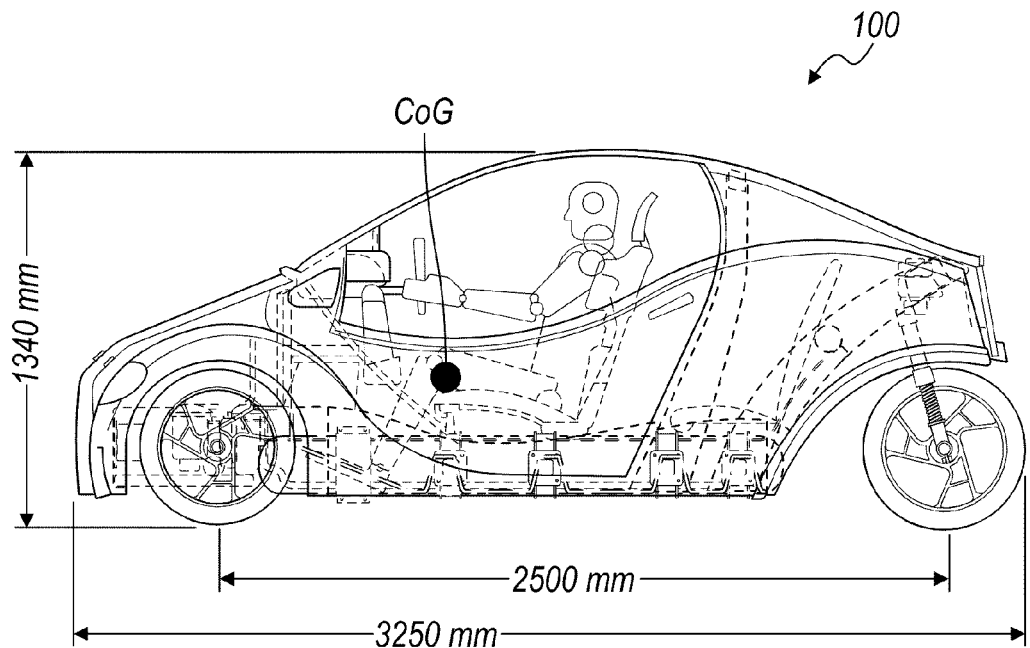

FIGS. 26*a* and 26*b* show the overall pneumatic vehicle 100 size, wheelbase and track. The sphere indicates the location of the center of gravity (CoG) for a fully laden pneumatic vehicle 100 (with two 90th percentile male front occupants) as determined from a CAD modeling package.

Roll-Over Stability

A design factor of the three wheel pneumatic vehicle platform 100 is its stability in roll-over. A simple approach has been taken to model the pneumatic vehicle's margin of safety against rollover, by constructing a base cone using the CoG and its location within the pneumatic vehicle envelopes wheelbase and track. By projecting the maximum turn force resultant allows the assessment of the rollover threshold as indicated by FIG. 27.

Model details and assumptions:
Total vehicle mass (laden)=541 kg
Front Track=1500 mm
Wheelbase=2500 mm
CoG location (x=−29.80, y=510.24, z=−854.37)

Figures 27, 28:
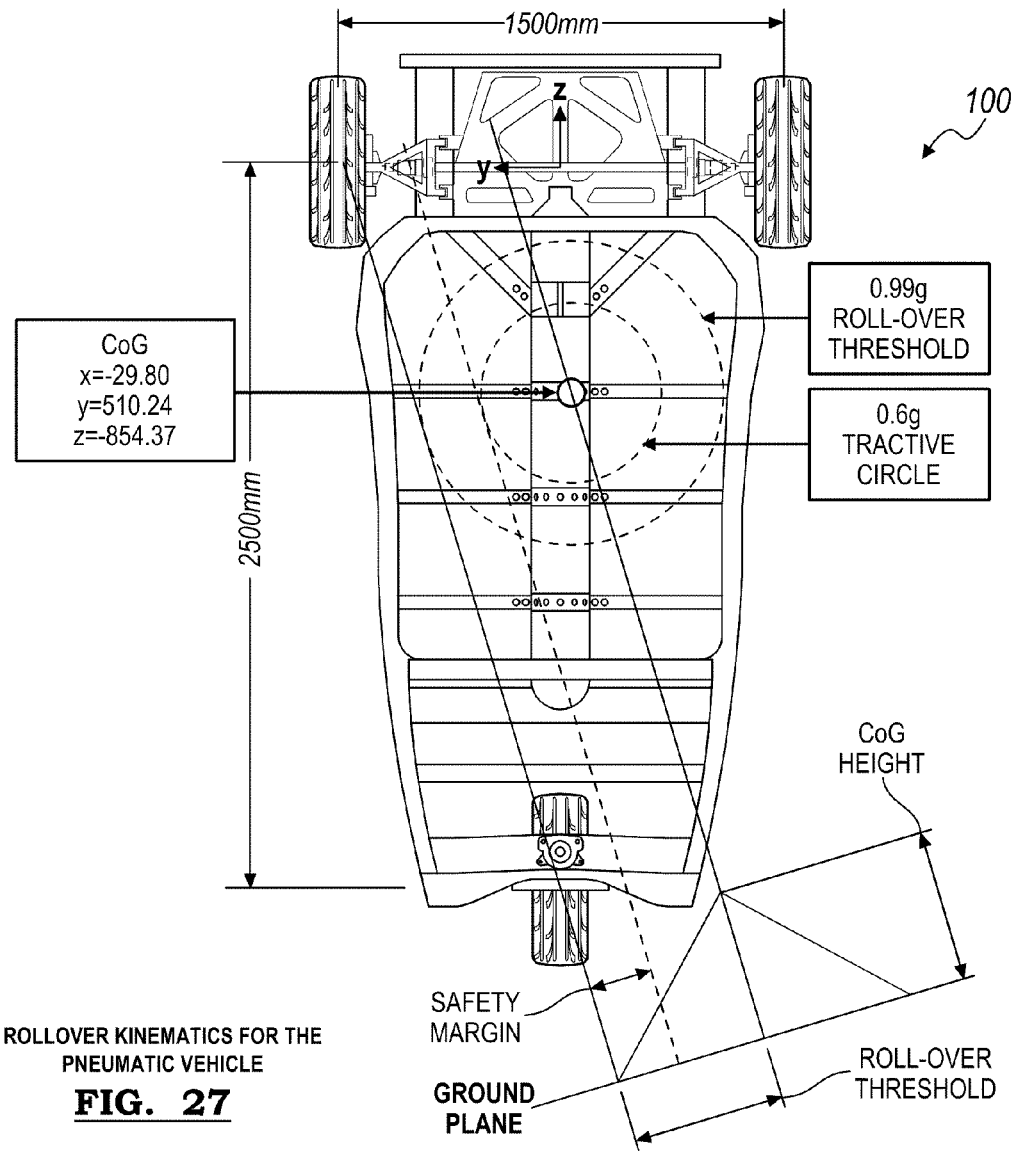
FIG. 27 is a top view of a vehicle chassis illustrating rollover kinematics and threshold for the pneumatic vehicle.
FIG. 28 is a table of a Comparison of Rollover threshold for the pneumatic vehicle and other typical vehicle types (www.rqriley.com)

FIG. 27 illustrates a rollover threshold of 0.99 g for the pneumatic vehicle 100. Assuming a tractive circle of 0.6 g, which is indicative of grip levels for a small passenger vehicle, allows for a 39% safety margin. This means the pneumatic vehicle's tires will slip, before the rollover threshold is reached, ensuring vehicle stability. FIG. 28 displays some comparative rollover thresholds for other four wheel vehicle types, indicating the pneumatic vehicle 100 exhibits suitable stability.

Steering Dynamics

Figure 29:
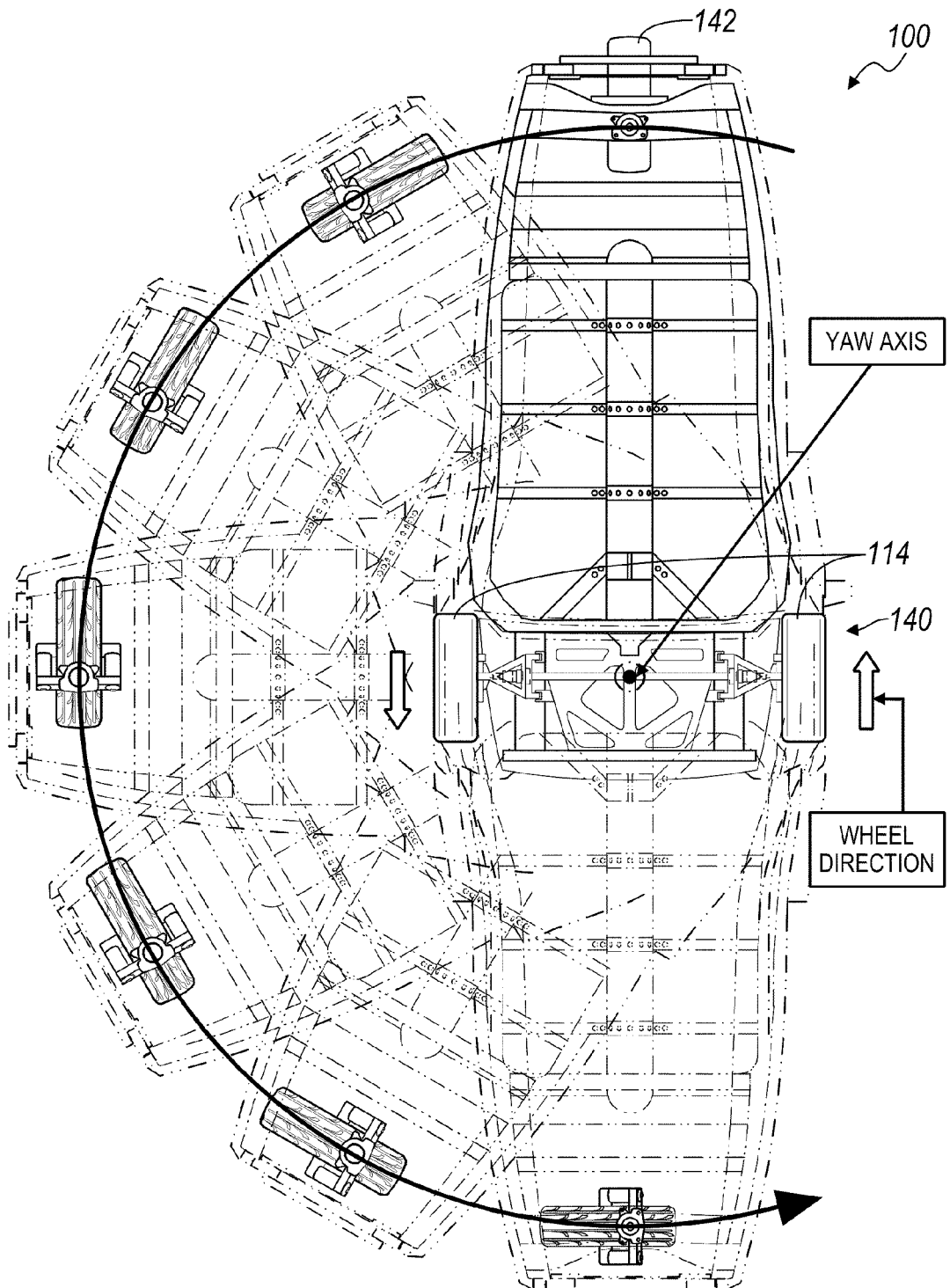
FIG. 29 is a top view of the pneumatic vehicle illustrating the capabilities of differential steering combined with a trailing rear wheel to allow the pneumatic vehicle to virtually 'turn on the spot'.

The pneumatic vehicle 100 exhibits excellent agility through its front differential steering system 140 combined with its single rear trailing wheel 142, allowing it to 'turn on the spot' as illustrated in FIG. 29. Differential steering is employed on many small robots and tracked vehicles, it is often called skid-steering, as it will 'skid' the tires to allow the vehicle to turn. However, with the pneumatic vehicle 100 three wheel platform, combined with the single trailing rear wheel 142, no wheels 114 are required to skid, helping ensure tire longevity. This is due to the Yaw axis existing between the front wheels 114, unlike that of tracked vehicles. For high speed stability, the active rotary steering damper 144 helps stabilize the oscillations and reduce the sweep angle of the rear wheel 142, providing smooth high-speed cornering.

Front Differential Steering

The integration of the two rotary air motors 104 as direct drive mechanisms for the front wheels 114, allows the implementation of a differential steering system 140 with ease. Controlling the air pressure and flow rates to each wheel motor 104, via independent pressure regulator valves (PRV), accelerates or decelerates the appropriate wheel 114 as required, prompting the pneumatic vehicle 100 to steer. This combined with individual wheel speed sensors, which form a feedback loop to the CCU, allow for precise control of steering maneuvers. Due to the entire drive-by-wire system, should the activation of braking be required to help steer the pneumatic vehicle 100, this can be activated.

Single Trailing Rear Wheel

Figure 30:
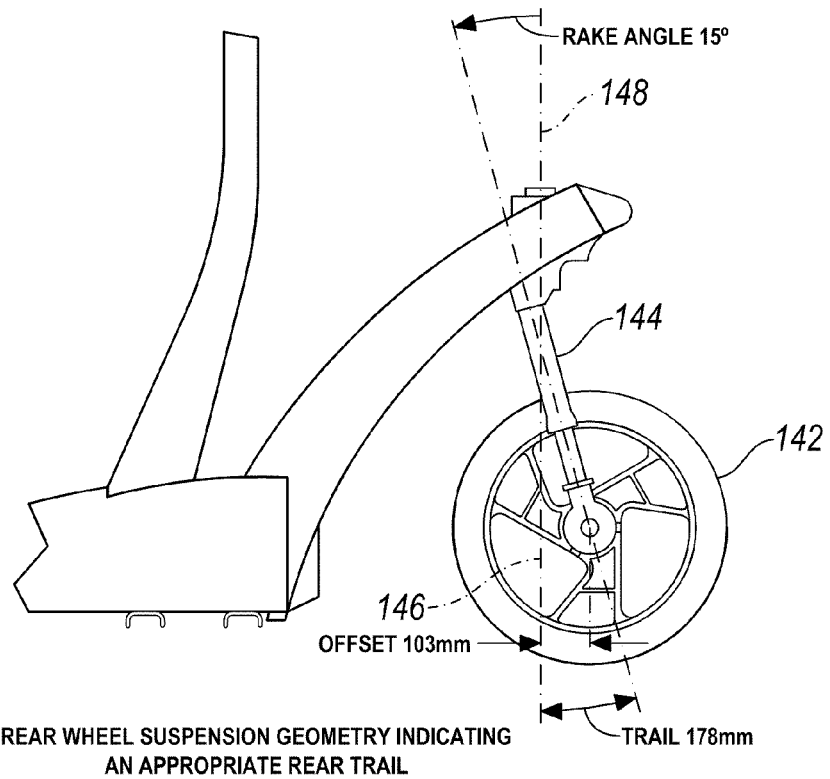
FIG. 30 is a side view of the rear wheel suspension geometry indicating an appropriate rear trail.

The single trailing rear wheel 142 provides the pneumatic vehicle 100 with its nimbleness at low speeds, as it will simply trail due to the geometrical offset 146 between the steering axis 148 and the wheel center axis as indicated in FIG. 30. This caster trail allows the rear wheel 142 to suitably follow the driving path created by the front wheels 114. Too little trail causes instability at high speeds and too large trail reduces the ability of the wheel 142 to change direction quickly, reducing agility at low speeds. Too large a trail also encroaches on the rear packaging space of the pneumatic vehicle 100, as the rear wheel 142 should have suitable space to rotate a full 360° about its steering axis 148, especially when engaging the pneumatic vehicle 100 into reverse.

Figure 31A:
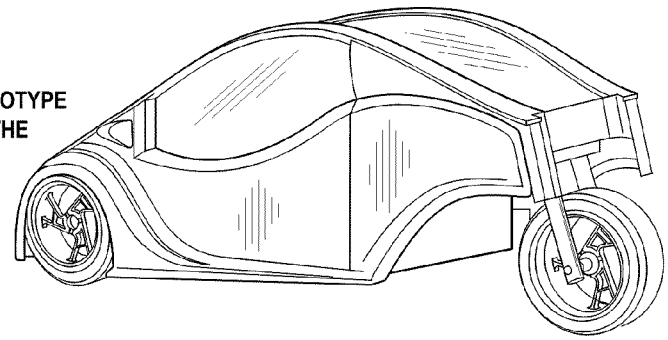
FIGS. 31a and 31b are perspective views of a 1/10th scale remote control prototype developed to validate and tune the pneumatic vehicle's steering system.
Figure 31B:
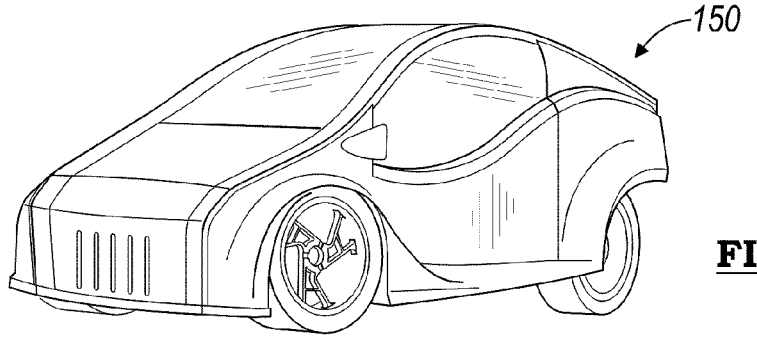

To determine the required rear wheel trail and to validate the pneumatic vehicle steering dynamics, a 1/10 th scale remote controlled prototype 150 was manufactured as shown in FIGS. 31*a* and 31*b*. This allowed the trial of a number of rear wheel trail configurations, to determine the point at which the pneumatic vehicle 100 became stable, yet nimble. A qualitative approach was adopted, whereby the success of different rear trail combinations was gauged by the compromise between stability at high speeds and agility of the pneumatic vehicle 100 at lower speeds. The final chosen geometry is represented in FIG. 30. Further refinement and tuning of the rear suspension geometry could be performed via simulation or a full-scale prototype to ensure optimum handling performance.

Rotary Steering Damper

To provide steering stability and control, a rotary steering damper 144 has been integrated into the rear suspension system. The rotary steering damper 144 operates using the same principles as a conventional linear damper, however, rather than damping vertical movements, it stabilizes the horizontal movements and oscillations of the wheel 142. This is to ensure that at high speeds the pneumatic vehicle 100 maintains its stability and does not erratically spin, due it trailing rear wheel 142. The technology has been employed on the front handlebars of many motorcycles for the very same reason and has proven results as shown by a known Motorcycle brand, Scotts (www.scottsperformance.com).

To allow the pneumatic vehicle 100 to turn-on-spot at low speeds, the activation of the rotary steering damping effect is non-existent, as this will allow the rear wheel 142 to oscillate a full 360° as required. However, as pneumatic vehicle speed increases, the damping effect and a reduction of the wheel's sweep angle occurs, as shown in, FIGS. 32*a*, 32*b* and 32*c*.

Utilizing the drive-by-wire system and current magnetic rheological damping technology this is automated and controlled via the central car computer (CCU).

Front Suspension System

Figure 33A:
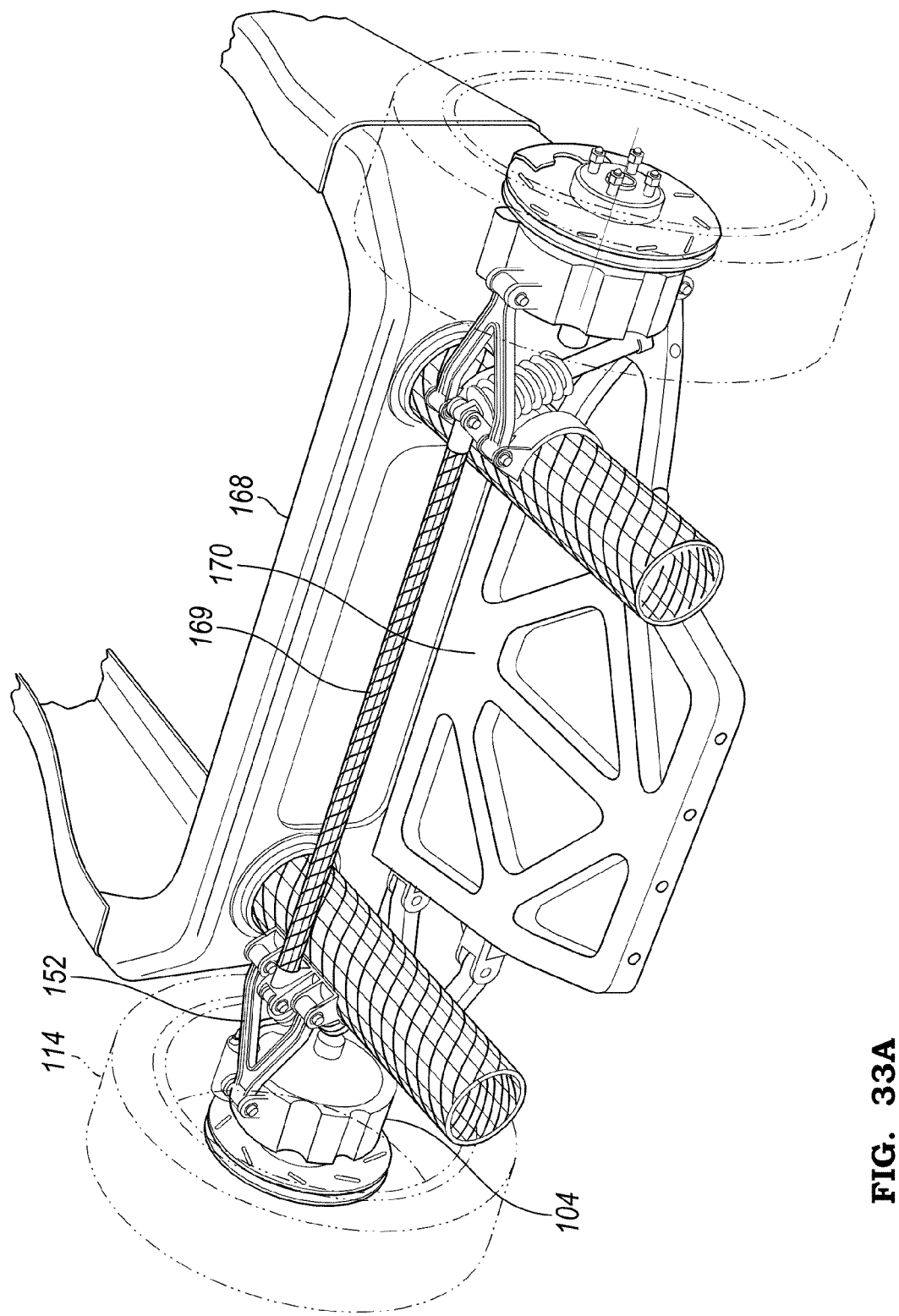
FIG. 33a and FIG. 33b are perspective views of a symmetrical double wishbone suspension system integrating the rotary air motors as the upright.
Figure 33B:
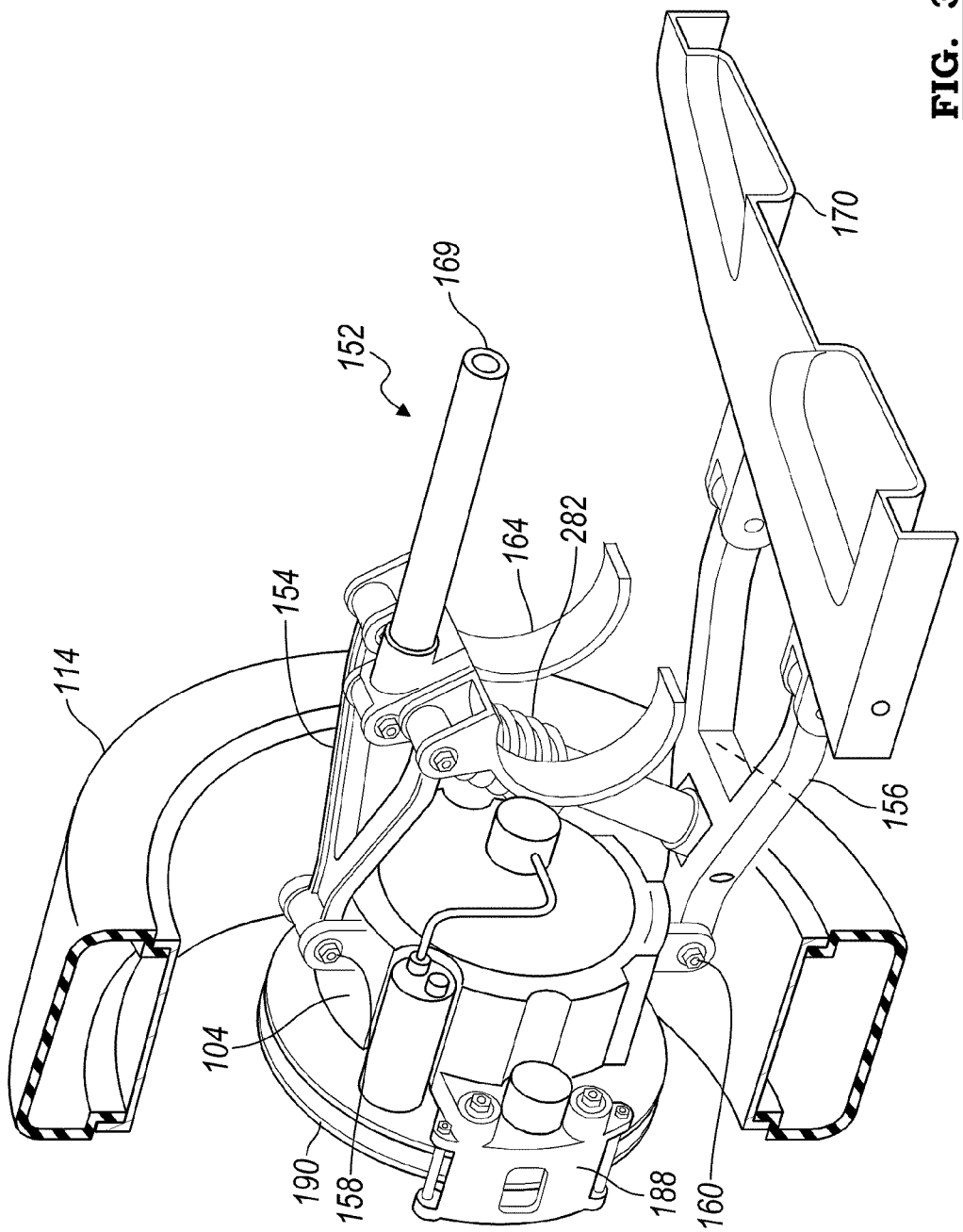

Several front suspension types were considered, including McPherson strut, torsion beam and a transverse leaf spring, however, the differential steering system 140 eliminates the need for any toe change for the front wheels 114, which allowed the integration of a simple symmetrical double wishbone front suspension 152. The double wishbone system 152 allowed for excellent packaging, whilst ensuring the weight target was met and aided in contributing to the final low CoG. FIGS. 33a and 33b shows the front double wishbone suspension system 152, which integrates the rotary air motor 104 as the suspension upright.

Integrated Upright/Rotary Air Motor

Figure 34:
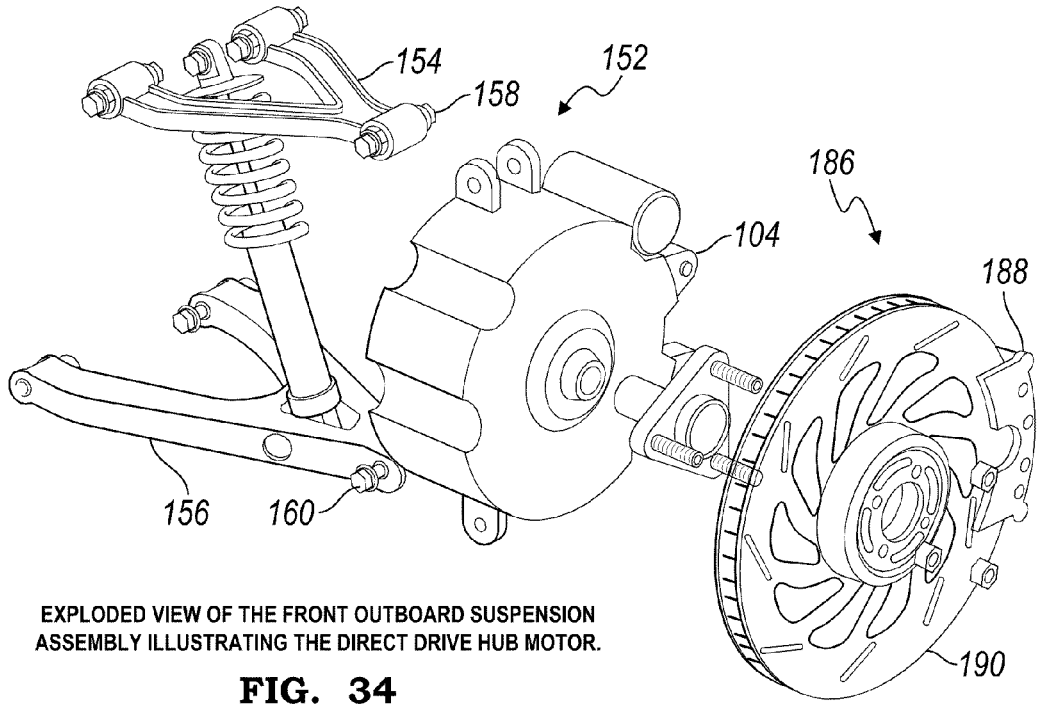
FIG. 34 is an exploded perspective view of a front outboard suspension assembly illustrating the direct drive hub motor.

The applications of a direct drive hub motor 104 allows for simple packaging and integration as the suspension upright as shown in FIGS. 33a and 33b. This simple suspension assembly 152 eliminates the need for many complex bearings and ball joints, all of which add to the pneumatic vehicle's cost and weight. The wheel hub and output drive shaft are also integrated as the one component 104 as illustrated in FIG. 34 according to at least one embodiment, which is beneficial to the pneumatic vehicle's unique steering system 140.

Lower and Upper Wishbone Design

Both upper and lower wishbones 154, 156 are symmetrical about their outboard pin joint 158, 160, this eliminates the need for left and right hand versions aiding in reducing vehicle part count and in turn tooling costs. The elimination of traditional ball joints to allow for toe changes, allows for a simple common bush to be substituted into the inboard and outboard suspension hard points for damping of noise and vibration.

Figure 35:
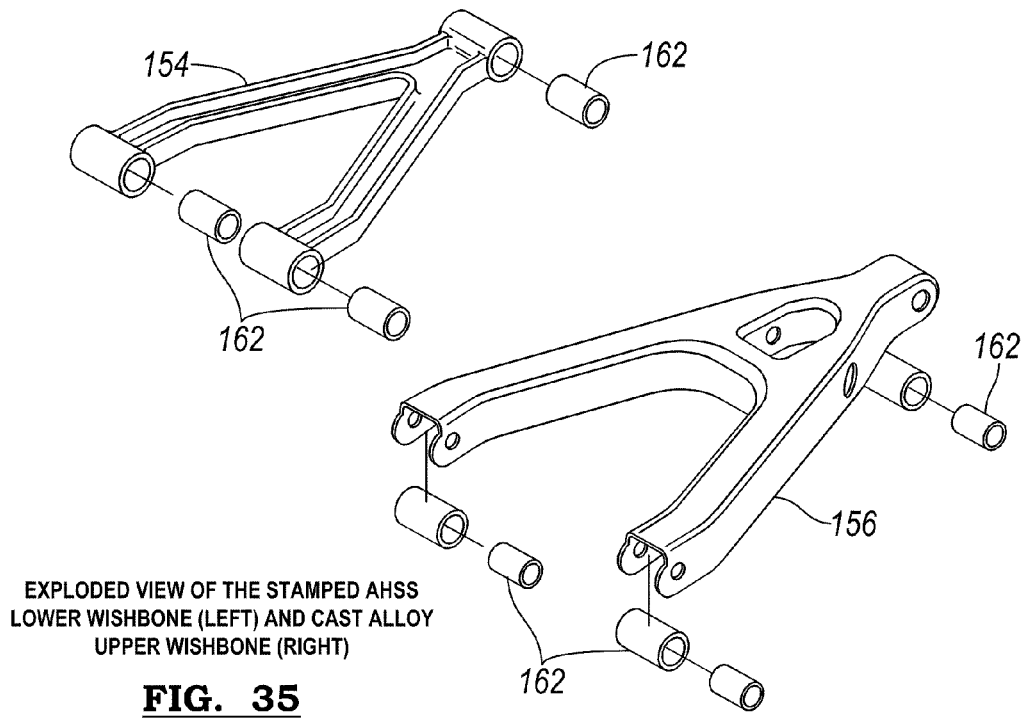
FIG. 35 is an exploded perspective view of a stamped AHSS lower wishbone and a cast alloy upper wishbone.

The simple form geometry of the lower wishbone 156 allows for the proposed stamping of an AHSS (Dual Phase 800 MPa grade steel), which has a higher strength to weight ratio, than conventional HSLA (high strength low alloy) materials. This provides suitable structural integrity as it carries a larger load than the upper wishbone 154, due to the damper mounting position. FIG. 35 shows the lower stamped wishbone assembly 156 with its simple bushing 162 arrangement. The upper wishbone 154 carries a lesser load than that of the lower wishbone 156 and is therefore cast from an Aluminum Alloy, which aids in reducing vehicle mass.

Upper Wishbone and Damper Mounting

The upper wishbone 154 and damper mount 164 are cast from an aluminum alloy and adhesively bonded to carbon fiber crash tubes 166 of a chassis 168 of the pneumatic vehicle 100. A carbon fiber strut brace 169 is connected to the damper mounts 164 for additional stability. Once again both left and right hand version are identical, which aids in the pneumatic vehicle's simplicity and are displayed in FIGS. 33a and 33b.

Front Suspension Sub-Frame

Modularity of the pneumatic vehicle 100 is enhanced through the implementation of a front lower sub frame 170, which attaches and detaches easily to the pneumatic vehicle's chassis 168 through a series of mechanical fasteners. This permits the assembly of the front suspension 152 independently to the pneumatic vehicle's chassis 168. The sub frame 170 also serves as the front mounting floor for the powertrain 102 assembly which is concealed by the structure's floor, once again attributing to the design philosophy of total integration.

The front suspension sub-frame 170 is manufactured from a lightweight glass fiber reinforced thermoset plastic (GFRP). This material setup allows for accurate fiber management to be achieved, whereby the fibers are orientated in the direction of the load paths. Utilizing a RTM process outlined in the vehicle body and structure section permits a flexible, low cost manufacturing process. Finite element (FE) analysis to optimize the materials thickness and glass fiber layer direction can be employed.

Rear Suspension System

Figure 36A:
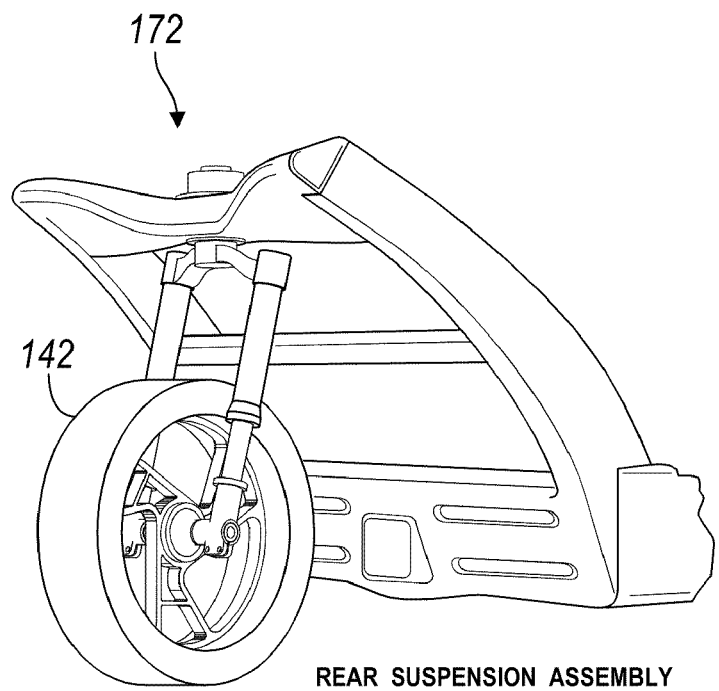
FIG.36, are an exploded perspective view of the rear suspension and wheel (36b), a perspective view of the rear suspension assembly on the pneumatic vehicle (36a), and a fragmentary perspective view of a rear suspension assembly (36c)
Figure 36B:
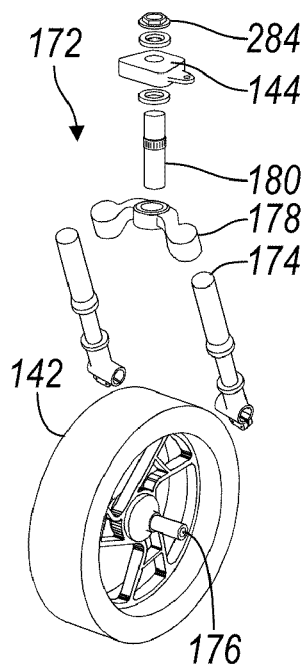
Figure 36C:
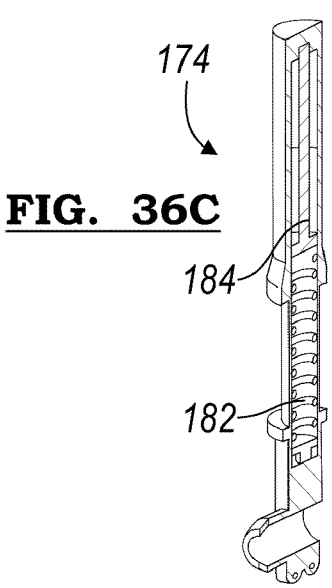

A rear suspension 172 takes on a similar appearance to that of a motorcycle, due to the single rear wheel 142 which is mated to the structure by a pair of upside down telescopic shock absorbers 174. The rear suspension system 172 comprises of a small number of components, a wheel hub 176, telescopic forks 174, a fork crown 178, a steerer tube 180 and rotary steering damper 144, as illustrated in FIGS. 36a, 36b, and 36c. The rear suspension system 172 can also be independently assembled, and then attached to the pneumatic vehicle's structure via the steerer tube 180, promoting a modular design.

Upside Down Telescopic Forks

A pair of upside down (USD) telescopic forks 174 accommodate for the rear suspension 172 travel. An upside down fork 174 differs from that of a traditional telescopic fork in that it is inverted, with its tubes located at the bottom and the bodies at the top. This achieves a reduced un-sprung mass and also has improved load carrying abilities to a traditional fork of the same mass, helping reduce the mass of the rear suspension assembly 172. Both telescopic forks 174 are identical, housing both a coil spring 182 and damper 184 (FIG. 36c); as opposed to other applications where one side houses a spring and the other houses the damper.

Braking System

Figure 37A:
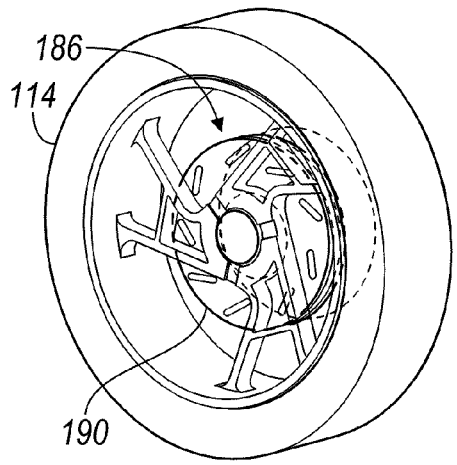
FIG. 37 is a perspective view illustrating an electro-hydraulic braking system (37a), having a single piston floating caliper j37b) activated by an electronic linear actuator (37c)
Figure 37B:
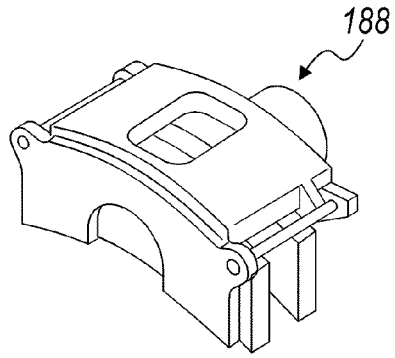
Figure 37C:
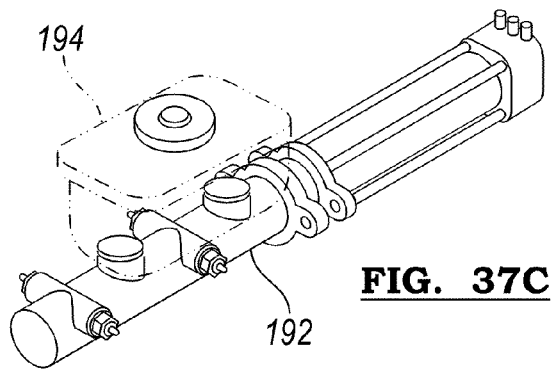

An electro-hydraulic braking (EHB) system 186 is illustrated in FIGS. 37a, 37b and 37c, and is employed on the pneumatic vehicle 100 and comprises of a pair of single hydraulic floating piston calipers 188 attached at two disk rotors 190. When braking is required, an electronically controlled linear actuator 192 applies the appropriate pressure on a brake master cylinder 194, which may be located on a firewall of the chassis 168, all of which is controlled by the CCU, depending on how hard the braking apparatus is pushed or pulled. Through integrated software development an antilock braking system ABS can easily be employed, by controlling the pulse width modulation of the electronic linear actuator 192.

Figure 38:
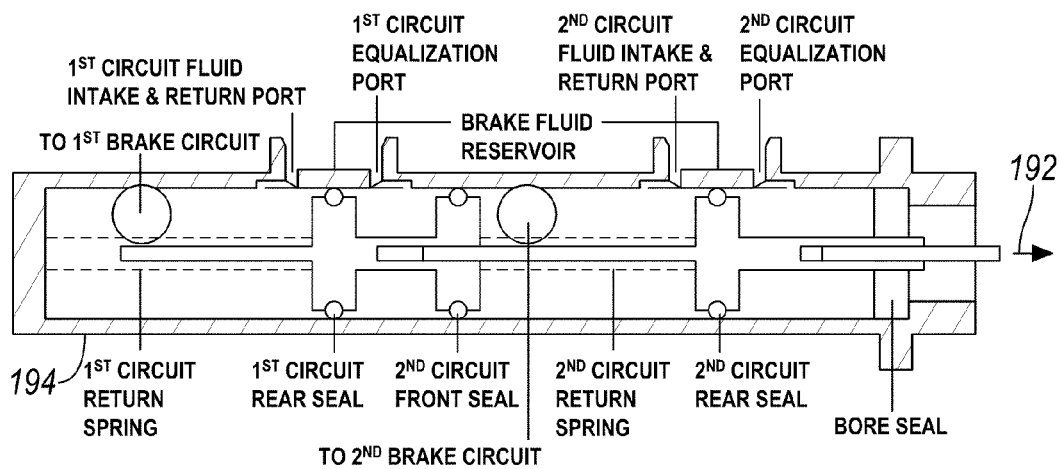
FIG. 38 is a schematic view of a Double Circuit Master Cylinder.

For braking safety, a double circuit master cylinder 194 has been implemented. This ensures that if a brake line fails, the secondary circuit provides a small amount of braking ability, to bring the car 100 to a stop safely as illustrated in FIG. 38.

To ensure the pneumatic vehicle 100 conforms to Australian Design Regulations (ADR), which states the vehicle must come to a stand still from 35 km/h in 11 m, the required braking force was determined and appropriate sizing of master cylinder 194 and caliper piston 188 determined.

Rear wheel braking is supplied via a regenerative braking rear hub 196, which slows the rear wheel 142 by converting the kinetic energy into an electrical current, which re-charges the battery source of the pneumatic vehicle 100 (as outlined in the electronics/human machine interface section). Due to the pneumatic vehicle's CoG existing quite close to the front wheels 114, only a small proportion of rear braking ensures that the pneumatic vehicle 100 retains steering stability under braking. Should further investigation show that a rear friction brake is desired, this can simply be added and connected to the existing EHB system 186.

Braking System Calculations

To ensure the pneumatic vehicle 100 conforms to Australian Design Regulations and the pneumatic vehicle brakes to stand-still from 35 km/h in 11 m, the required deceleration of the pneumatic vehicle 100 is, assuming a tire coefficient of friction, μ, of 0.6:

$$s = \frac{1}{2}a\left[U^2 + \frac{a^2t^2}{4} - Uat\right]$$

where s=11 m;
a=9.81 (g)×0.6=5.886 m.s$^{-2}$;
U=35 km/h=9.72 m/s;
Braking Force Required, $F_B$, =ma=500 (kg)×5.886 (m.s$^{-2}$)=2943 N, meaning approx 1500N of braking force for each front brake.

To find the pressure needed in the hydraulic brake line, $p_1$, this equation is used;

$$F_B = 2(p_1 - p_0)A_{wc}\eta_c BF\left(\frac{r}{R}\right)$$

Where Braking force, $F_B$=3000 N;
Push out pressure, $p_0$=50,000 N;
Braking factor, BF=$2\mu_L$=0.9 (coefficient of friction is 0.45);
Radius of disk, r=130 mm;
Radius of wheel, R=280 mm;
Wheel cylinder area, $A_{wc}$=7.187×10$^{-4}$ m$^2$, multiplied by 2 for both brakes;
Wheel cylinder efficiency, $\eta_c$=0.8 (assumption);
Therefore $p_1$=3.17×10$^6$ N/m$^2$.

This means that the linear electric actuator 192 that acts on the master cylinder 194 needs to produce approximately 460 psi to bring the car 100 to a stop. If the diameter of the master cylinder 194 is 20 mm, then the force the actuator 192 will produce is 1000 N, or 225 lbs, which is suitable for the braking force required.

Mass Comparison

Through the implementation of advanced materials, manufacturing processes and integrated design, a significant weight reduction of the pneumatic vehicle's suspension systems 152, 172 has been achieved, with the entire front, rear suspension 152, 172 and braking assembly 186 totaling, 98.243 kg. This also includes the rotary compressed air motors 104 which are part of the powertrain 102 system.

A recent consortium of auto-makers embarked on the development of an Ultra-light Steel Auto Body (ULSAB) Advanced Vehicle Concept (AVC) which achieved a large overall vehicle weight saving from traditional vehicles, and had a suspension and braking assembly mass of 182.05 kg. The pneumatic vehicle suspension system 152, 172 of the depicted embodiment achieved a weight saving of approx 54% from a leading lightweight design.

FIG. 39 provides a parts list for the front suspension assembly 152; and FIG. 40 provides a parts list for the rear suspension assembly 172.

Vehicle Design—Vehicle Dynamics

Innovative integration of two independently controlled direct drive hub motors 104, a three wheel pneumatic vehicle platform and a unique steering system 140, revolutionizes the dynamics of current vehicles. The small footprint and agile steering system 140 of the pneumatic vehicle 100 allows the pneumatic vehicle 100 to turn-on-spot, making navigation through congested cities a breeze. Employing a symmetrical double wishbone front suspension system 152 promotes simplicity, aiding in reducing weight and the pneumatic vehicle's cost. All of which contribute to the design philosophy of lightweight, practical, innovative and simplistic.

See Tables A1 and A2 for parts lists of the Front Suspension Assembly 152 and the Rear Suspension Assembly 172.

Vehicle Body & Structure

The pneumatic vehicle 100 and body structure were designed with careful consideration of several attributes to ensure that our performance and design targets were met. These attributes were:

Occupant safety
Manufacturability
Cost
Weight
Structural rigidity
Modularity
Packaging
Sustainability Our design philosophy of "integrated simplicity" continued strongly into the pneumatic vehicle body and structure, such that the design factors of each of the above design attributes could be met. The use of new and/or non-traditional materials and manufacturing processes were enablers for the successful design.

The Concept

The design of the pneumatic vehicle body and structure concept is focused around distinct upper and lower vehicle assemblies 198, 200 (FIGS. 41a and 41b). The lower assembly 200 can be considered essentially as a rolling chassis 168, providing a large portion of the pneumatic vehicle's strength, stiffness and energy absorption capabilities, whilst the lightweight upper assembly 198 forms most of the exterior components of the pneumatic vehicle 100.

There are significant advantages associated with this two-assembly concept, as compared to the current monocoque approach. Firstly, the fact that the structural members are independent of the "stylized" exterior components allows the use of much simpler and more structurally efficient components, thus providing large weight savings. The simpler shapes also allow the employment of lower cost manufacturing processes and higher strength materials. These combining factors result in a significant reduction in the overall cost and weight of the pneumatic vehicle 100, whilst still maintaining excellent structural performance.

Another advantage of the separate rolling chassis 168 is the degree of modularity and flexibility of exterior shape that it provides. Most of the exterior panels can be changed with very low new tooling costs, and without affecting the structural integrity of the pneumatic vehicle 100, thus allowing the pneumatic vehicle 100 manufacturer to quickly respond to consumer demand. There are similar benefits in terms of repairability, where exterior panels can be easily replaced, in the case of a minor vehicle accident. These attributes are primarily enabled by the use of fiber reinforced plastic for the exterior, manufactured using the Resin Transfer Molding (RTM) process. This allows an extremely lightweight design, with low tooling and manufacture costs.

The lower vehicle structure 200 and upper vehicle body 198 will be discussed in further detail, with particular reference to the engineering design and how each of the attributes of occupant safety, manufacturability, cost, weight, structural rigidity, modularity and packaging were addressed.

The Lower Vehicle Structure

Figure 42:
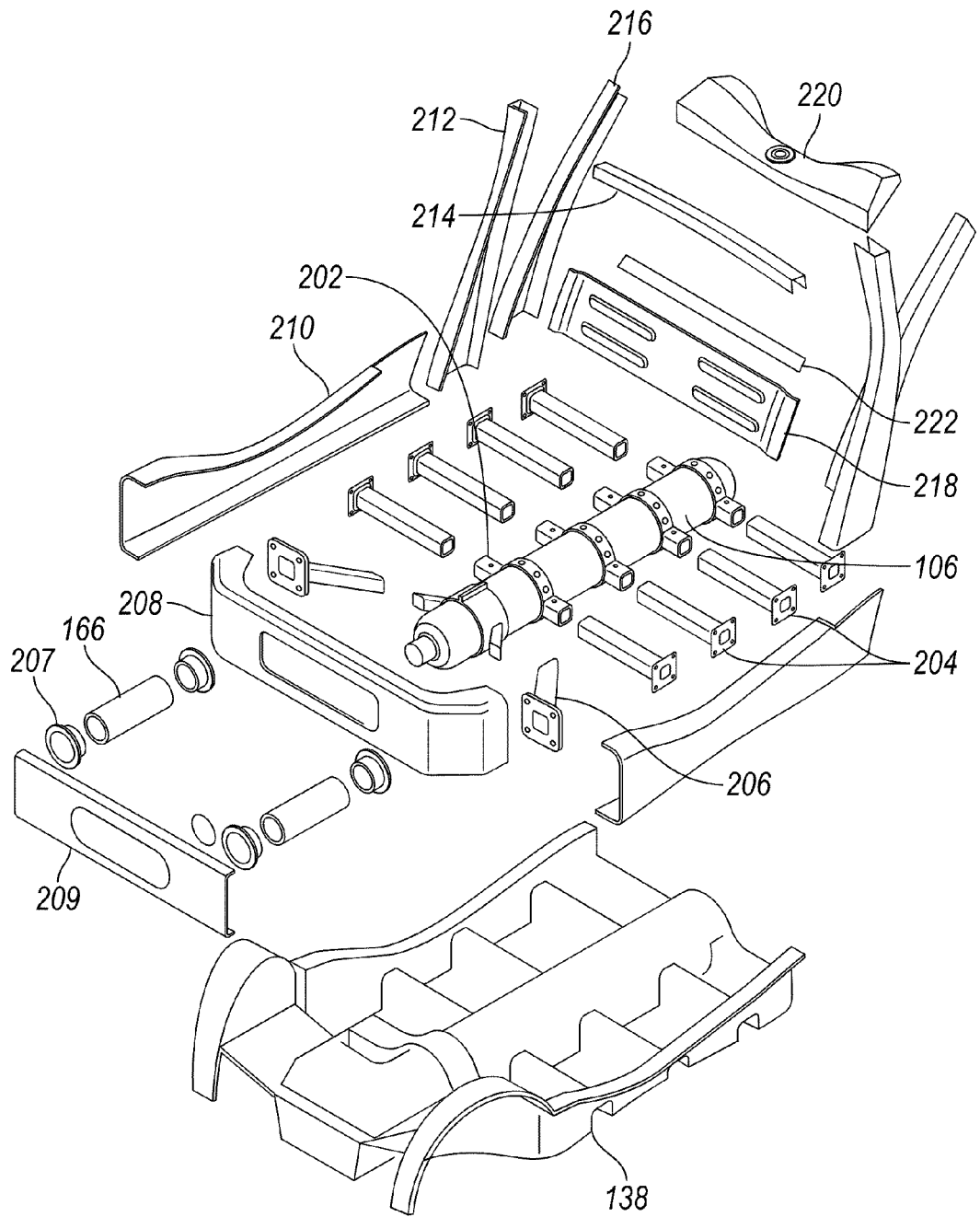
FIG. 42 is an exploded perspective view of the lower pneumatic vehicle structure.

The lower vehicle structure 200 has been designed with manufacturability, stiffness and crashworthiness as primary considerations, whilst ensuring that cost and weight were kept to a minimum through an efficient engineering design. The lower structure 200 consists of several components, as illustrated in FIG. 42, and weighs a total of 92 kg. This section will describe the features of the main components in more detail. Refer to FIG. 43 for the parts list pertaining to the lower structure 200.

Materials and Manufacturing Processes

In order to achieve significant reductions in cost and weight over traditional automotive body-in-white concepts, the lower vehicle structure 200 extensively utilizes ultra high strength steels (UHSS), combined with selective use of carbon fiber reinforced plastic (CFRP) and aluminum alloy structures. The material and manufacturing processes employed in the lower structure 200 are summarized in FIG. 44.

As previously stated, the main components of the lower structure 200 consist of very simple shapes, due to the fact that these components are not controlled by the often complex styling of an automotive exterior body. These simple shapes permit the use of low cost manufacturing process and very high strength materials.

Traditionally, automotive structural components are manufactured using the stamping process, which requires the sheet steel to have significant amount of ductility, thus limiting the strength of the material. By using simpler shaped components, which have constant or near-constant sections throughout their length, the roll forming process can be adopted. Roll forming requires significantly less ductility; therefore much higher strength grades can be employed.

The automotive industry has been using roll forming for many years in order to manufacture long straight sections, due the large cost advantages. Recent advances in roll forming technology have now made it possible to manufacture curved sections or sections with varying profiles—such processes are commonly referred to as 3D or flexible roll forming. Therefore, the flexible roll forming process offers the ability to produce more complex shapes, very efficiently and at high production rates.

Figure 45A:
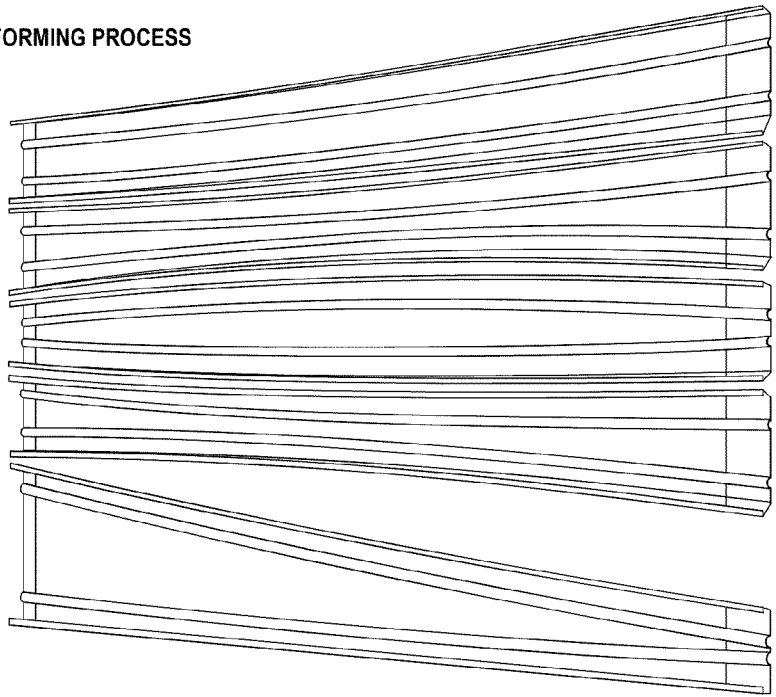
FIG. 45 is a top view of examples of part shapes achievable using a flexible roll forming process (a) and a perspective view an example of the machinery and tooling required for the roll forming process (b) (www.ortic.se)
Figure 45B:
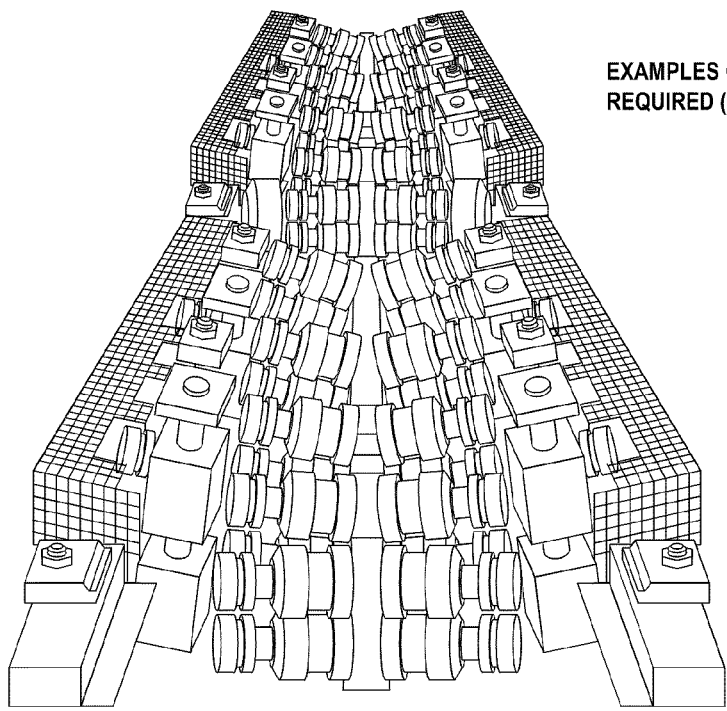

Examples of the shapes achievable, and the machinery/tooling system required for the flexible roll forming process are shown in FIG. 45. In addition to the cost saving per part, FIG. 45 highlights that roll forming also presents significant reduction in tooling costs, as the large and expensive dies associated with sheet metal stamping are not required.

Figure 44:
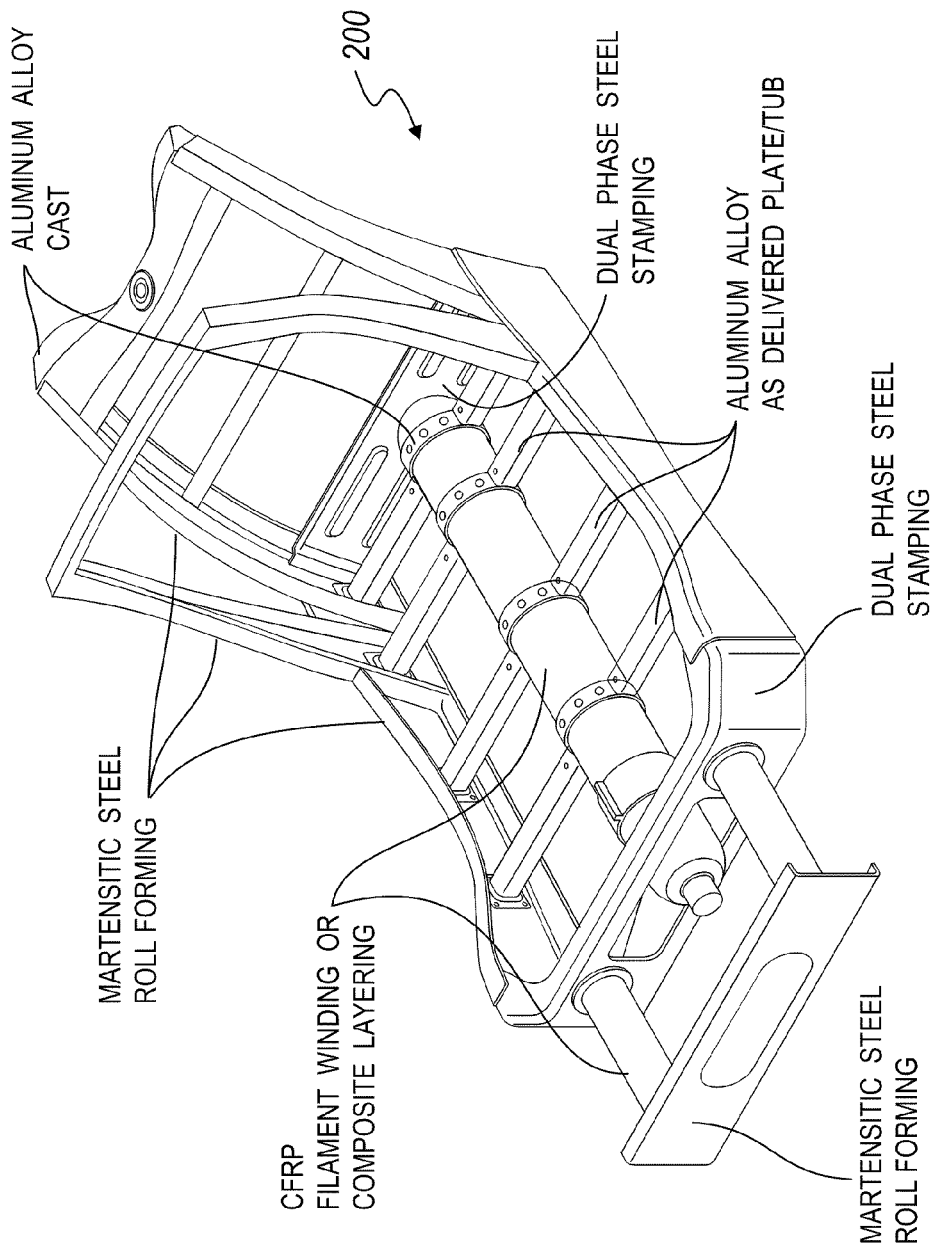
FIG. 44 is a perspective view of the lower pneumatic vehicle structure and the materials and manufacturing processes used therefore.

As shown in FIG. 44, the lower structure 200 also consists of two key stampings, made from high strength dual phase (DP) steel, which help to tie in some of the roll formed components. These stamped components also consist of simple geometries, thus permitting the use of an ultra high strength DP700 material grade.

Each of the stamped and roll formed components are not visible from the exterior of the pneumatic vehicle 100. Therefore, since a Class A surface finish is not required, hot rolled grades of steel can be utilized; thus further reducing the costs over conventional cold rolled sheets.

Air Tank as a Structural Member

Due to the inherent stiffness of a cylindrical pressure vessel, the pneumatic vehicle's air tank 106 has been employed as a structural member. The air tank's carbon fiber reinforced plastic (CFRP) structure 116 provides excellent strength and stiffness, and therefore forms the "backbone" of the pneumatic vehicle 100. This dual-purpose use of what is essentially a fuel tank 106, as a structural member, highlights the value of our core design philosophy—to achieve an integrated and simple design.

Figure 46:
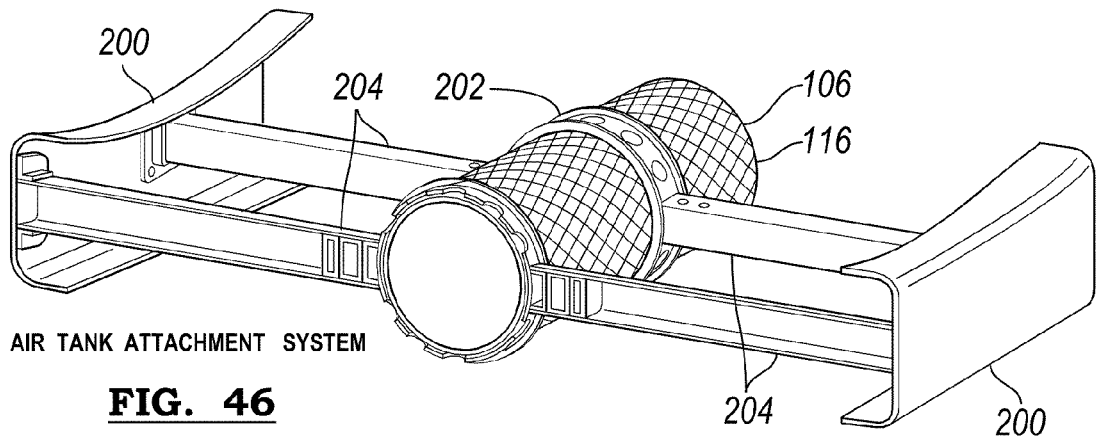
FIG. 46 is a fragmentary perspective view of an air tank attachment system for the pneumatic vehicle.

In order to take full advantage of the high stiffness of the cylindrical pressure vessel, the air tank 106 is attached to the rest of the structure at several locations. The method of attachment of the air tank 106, shown in FIG. 46, has been designed to ensure that each mount uses common parts, thus significantly reducing both tooling and individual part costs.

The air tank 106 is manufactured through a filament winding process, with cast aluminum the mounting "rings" 202 (shown in FIG. 46) attached to the tank 106 via a single co-curing process, thus eliminating additional assembly process. (Note that the details of the air tank 106, and the manufacturing process, are described in more detail in the Powertrain section).

High strength extruded aluminum tubes 204 connect the air tank 106 to the pneumatic vehicle structure 200, with mechanical fasteners used at each of the joints in order to permit easy removal of the tank 106 if necessary. The aluminum members 204 have been sized and positioned strategically in order to transmit crash loads to the pneumatic vehicle 100, whilst also providing high strength attachment points for the cabin seating.

Front Crash Structure

Crashworthiness and crash energy management were factors for the design of the pneumatic vehicle structure. The elimination of the typical automotive engine from the front of the pneumatic vehicle 100 provides a large degree of freedom with the design of the front crash structure, and therefore allows for much simpler and uncompromised design.

As such, carbon fiber reinforced plastic (CFRP) tubes 166 were chosen to provide the primary means of energy absorption in the case of a frontal impact. There are several reasons for the ability of composite tubular specimens to form excellent crash structures, including:

- the near-ideal cylindrical shape provide excellent structural efficiency;
- the high strength and stiffness to weight ratios provide suitable mounting locations for front suspension components;
- outstanding specific energy absorption values mean that less mass of material is required in order to absorb the impact energy.

Figure 47:
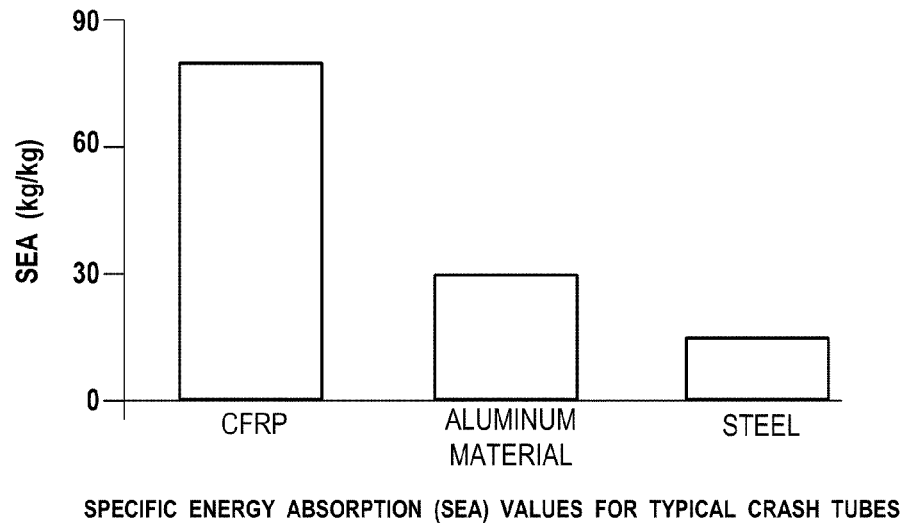
FIG. 47 is a graph illustrating specific energy absorption (SEA) values for typical crash tube materials.

Dynamic crush tests have revealed that the specific energy absorption (SEA) of carbon fiber tubes is as much as 5 and 2.5 times the SEA of equivalent steel and aluminum tubes respectively (see FIG. 47).

Figure 48:
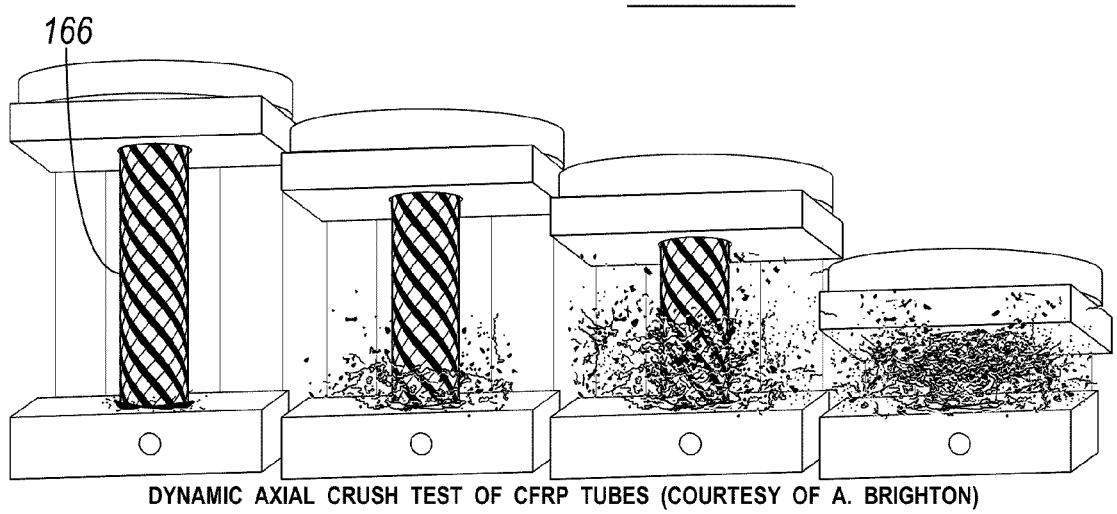
FIG. 48 is a series of side view photographs illustrating a dynamic axial crush test of carbon-fiber reinforced plastic (CFRP) tubes.

These high values of SEA are achieved partly due to the deformation mode that occurs during the crush event. When the CFRP tube is crushed at high speeds (typical of frontal automotive crash events), a large amount of energy is absorbed due to the way that the tube deforms and fractures into extremely small fragments. As shown by the photos at several instances during a dynamic axial crush test (FIG. 48), this deformation mode is very stable; thus providing a progressive crush and an almost constant crushing force. This approximately constant crushing force, combined with the simple cylindrical shape, allows the size of the crash tubes 166 and the design of the surrounding pneumatic vehicle 100 structure to be designed quite simply and efficiently.

The front crash structure in the pneumatic vehicle 100 has been designed with primary consideration of the well-known standard European New Car Assessment Program (Euro NCAP) offset frontal crash test. Finite Element Analysis (FEA) techniques were used as a tool to design and optimize the front structure. By calculating the energy absorption required for the given vehicle speed and mass, with the knowledge that the crushing force transmitted from the CFRP tubes 166 is approximately constant, a simple load case for the frontal crash test could be approximated (see FIG. 49).

The FEA techniques ensured that the front structure successfully managed the crash energy, provided good load paths for the forces to be transferred to the rest of the pneumatic vehicle structure, and thus minimized the intrusion into the cabin during the crash event.

The designed load paths for an offset frontal impact, into the lower and upper structures 200, 198, are shown in FIG. 50. It is evident that there are multiple load paths into the pneumatic vehicle structure, ensuring that the crash loads are effectively distributed. In particular, front support members 206 (which connect a firewall 208 of the chassis 168 to the tank 106) have been designed to transmit the loads into the extremely strong and stiff air tank 106. Additionally, the crash tubes 166 are each mounted to the firewall 208 by a crash tube mount 207. Further, a bumper reinforcement 209 is mounted to the crash tubes 166 by another pair of crash tube mounts 207.

Figure 51A:
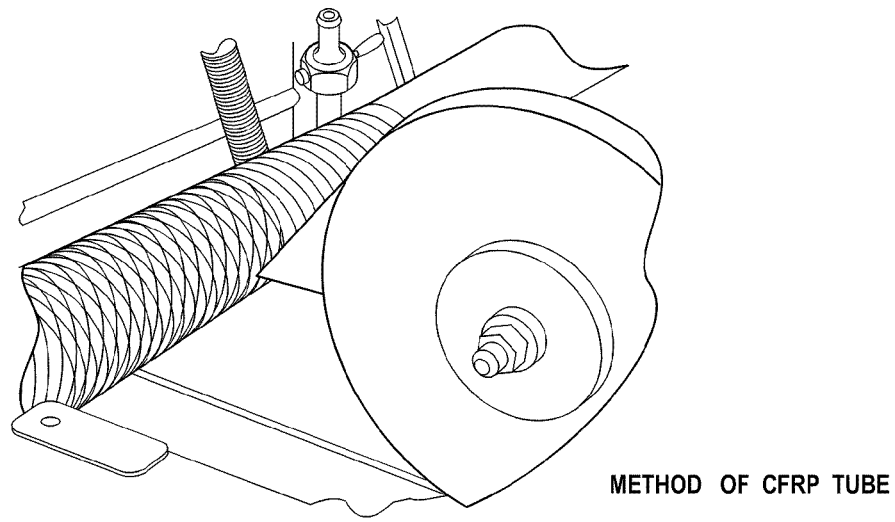
FIG. 51 is a perspective image of (a) method of CFRP tube manufacture, and a graph illustrating (b) comparison of cure cycle times for composite layering vs. autoclave processes.
Figure 51B:
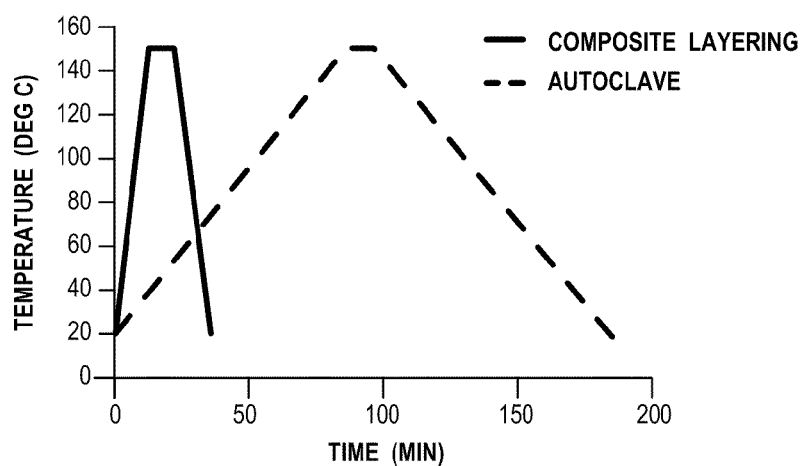

The use of CFRP materials in automotive crash structures has been limited primarily by high costs. The cost of the CFRP crash tubes 166 have been significantly reduced through the development of a novel method of manufacture, which utilizes the composite layering process. The composite layering process is disclosed in U.S. Pat. Nos. 6,149,844, which issued on Nov. 21, 2000 to Graham; and 7,306,692 B2, which issued on Dec. 11, 2007 to Graham; and International Patent Application Publication Numbers WO2002/058916; WO2006/099671; WO2007/003011; and WO2007/022593; the disclosures of which are incorporated by reference herein and referred to as the composite layering process. This allows rapid manufacture, minimal tooling and equipment costs, and dramatically reduced the cure cycle times, as compared to conventional manufacturing methods, as shown in FIG. 51.

Side Structure

Figure 52A:
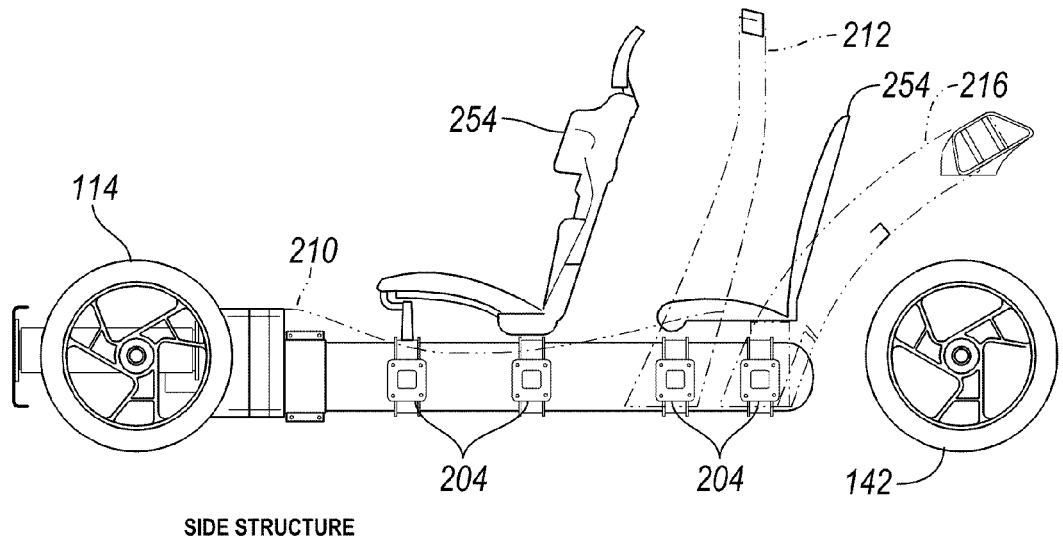
FIG. 52 is a side sectional view (52a) and a perspective view (52b) of the pneumatic vehicle lower assembly illustrating the load paths for a side impact.

The side structure of the pneumatic vehicle 100 is designed to be very stiff, in order to prevent intrusion into the cabin in the event of a side impact. UHSS roll formed rocker components 210, which are designed to be much wider than traditional automotive rockers, perform a major role in distributing the loads. The high strength extruded aluminum tubes 204, which are positioned at strategic locations, connect the rocker 210 to the air tank 106, as shown FIGS. 52a and 52b. These aluminum members 204 also coincide with a joint between a b-pillar 212 (which supports a roof cross-member 214) and the rocker 210, and at the joint between a rear rail 216 and the rocker 210, ensuring the structural integrity of these components during a side impact. As part of the integrated and simple design, the aluminum members 204 also provide high strength anchorage points for the cabin seating and seat belts. Additionally, the aluminum tubular members 204 can be produced at low cost due to the fact that these can be almost used in the as-delivered condition, with very little extra manufacturing processes required.

Figure 52B:
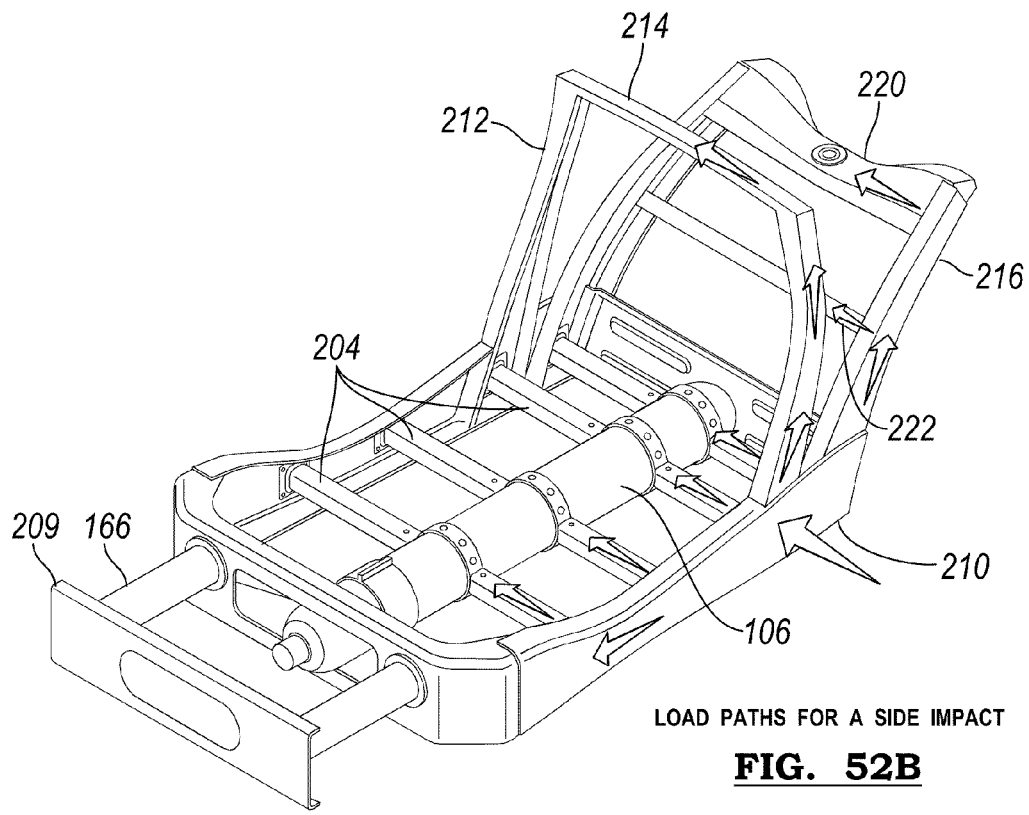

It is evident from FIG. 52b that the aluminum members 204, b-pillar 212 and rear rail 216 all provide multiple load paths for the side impact loads to be distributed. These, combined with door and side intrusion protection system described further on, can provide excellent occupant protection and crashworthiness.

Rear Structure

A rear bulkhead 218 is connected to a rear end of the rocker panels 210 and provides access for refilling the air tank 106. The rear rails 216 support a rear suspension mount 220 for being supported upon the rear suspension 172. A rear cross-member 222 may also be provided on the rear rails 216 for additional transverse support.

The Upper Vehicle Body

Figure 53:
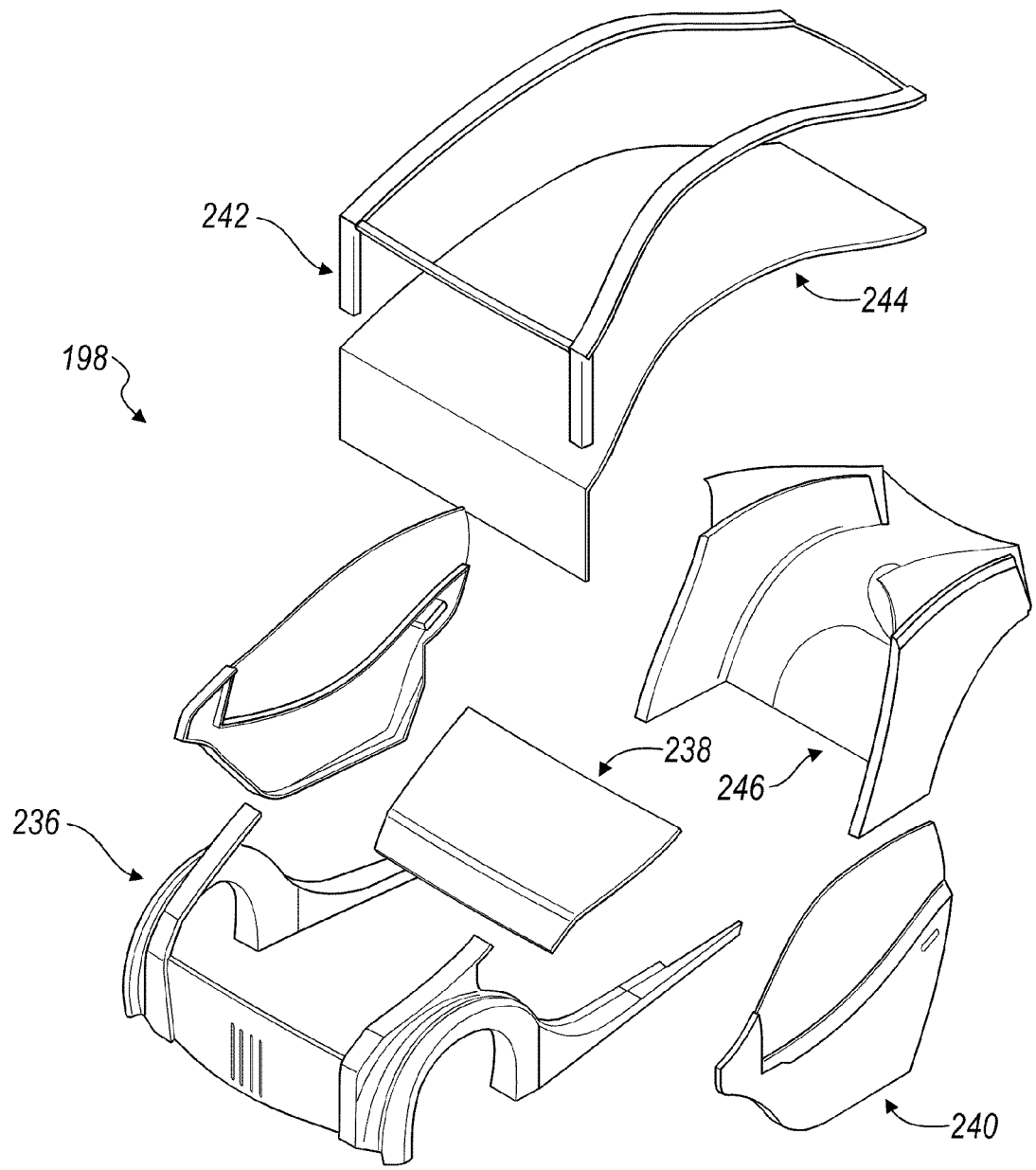
FIG. 53 is an exploded perspective view of the upper vehicle body.

The upper vehicle body 198 primarily consists of external "skin" panels which have been designed with manufacturability, recyclability and strength to weight as the primary considerations. Even though they are considered as skins, many of these components have a structural purpose. The upper body 198 consists of 7 components as illustrated in FIG. 53, and weighs a total of 63 kg.

Materials and Manufacturing Processes

Figure 54:
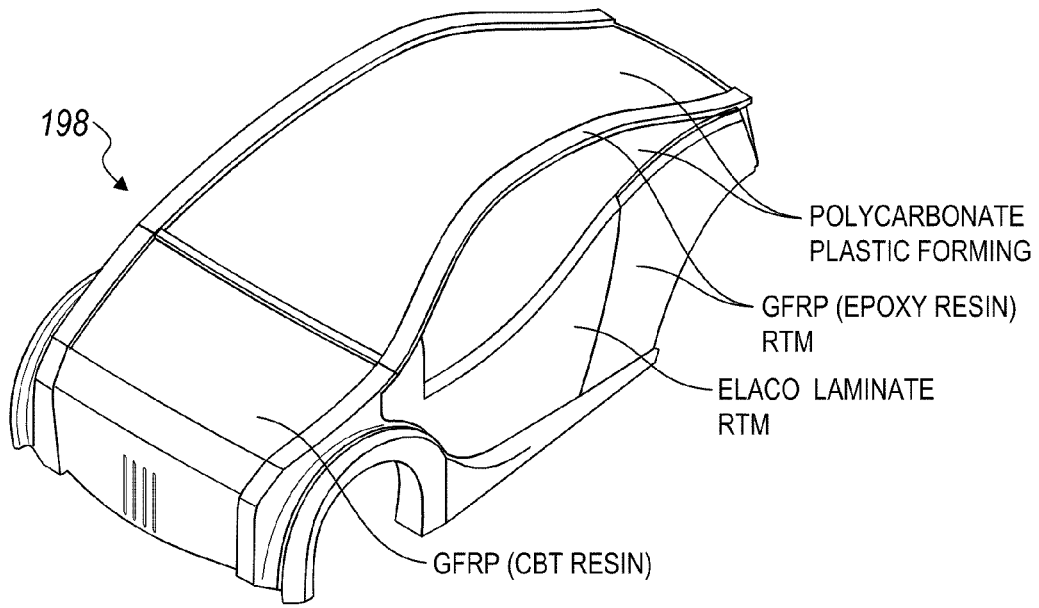
FIG. 54 is a perspective view of the upper vehicle body illustrating materials and manufacturing processes used.

As mentioned previously in order to achieve significant reductions in cost and weight over traditional body-in-white concepts, the upper vehicle body 198 extensively uses polymer composites manufactured primarily from the Resin Transfer Molding (RTM) process. Combining these materials and manufacturing techniques corresponds to a reduced part count and ease of assembly. The materials and manufacturing processes employed are summarized in FIG. 54. For extra information on these materials refer to the individual component descriptions below.

The Resin Transfer Molding (RTM) Process

Figure 55:
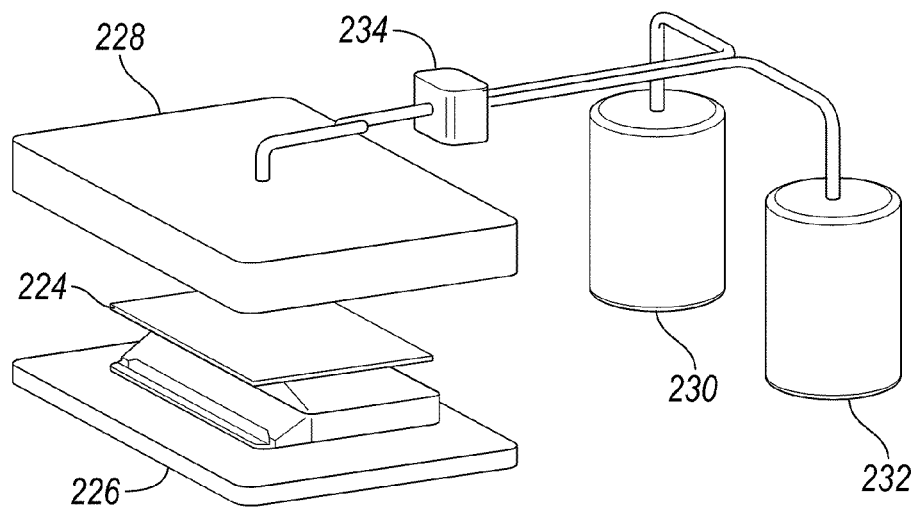
FIG. 55 is a perspective view of a resin transfer molding (RTM) process for thermosets.

The RTM process will be used to manufacture majority of the large polymer composite components found on the pneumatic vehicle 100 concept. The decision to use this process was based on its efficiency, low cost and ability to be used with thermoplastics. These aspects of course were compared to other techniques when fabricating parts on a mass scale. The system works by inserting a dry fiber preform 224 between a core 226 and cavity 228 die set. The dies 226, 228 are closed, thus applying pressure on the part 224. Resin 230 and hardener 232 flow through the lines, whereby they combine in a mixing head 234. This premixed solution is then infused through the fiber 224 and, once cured, the dies 226, 228 are opened and the part 224 is released. The components involved in the RTM process are illustrated in FIG. 55. The RTM system can be simplified when used in conjunction with the thermoplastic CBT system. Being a thermoplastic it will start off in pellet form where it will need to be heated before it can be infused.

In order to aid in the curing of these parts, we propose the composite layer process be used in conjunction with RTM. This will be achieved via specially designed metal dies which contain fluid channels to allow for the heat transfer fluid to transfer energy to the composite component within. This of course can occur whilst the crash tubes 166 are being manufactured, in order to take advantage of the one manufacturing process. Depending on the efficiency of the dies, the composite layer process has the ability to reach heat up and cool down rates of 10° C./min. With these parameters and a rapid cure epoxy, the composite layer process has proven to cure parts in less than 20 minutes.

Another advantage of the RTM process is its ability to reduce the number of steps on the workshop floor. The painting process for example is eliminated since a gel coat or surface film can be used to give a good finish and color to the components illustrated above. These treatments are lined within the cavity die before fiber infusion is conducted. Additionally RTM can produce near perfect shapes, meaning less trimming steps are required, not to mention reducing overall scrap.

Fender and Bumper including Hood

A fender/bumper structure 236 including a hood 238 can be considered as non structural members. As a result they are manufactured from a glass fiber reinforced thermoplastic (GFRP). Some fiber is used to add some additional stiffness to compensate for the thermoplastic's low modulus. The same material system will also be used for the interior floor 138. The thermoplastic in question is a CBT resin (cyclic form of polybutylene terephthalate), developed by the Cyclic™ Group. The choice behind this system primarily involved its ability to be used in conjunction with the RTM process. Utilizing one process for majority of the upper vehicle body 198 meant the manufacturing techniques could be minimized. Furthermore the CBT system offers fast polymerization times so that these components can be processed very quickly. They are also fully recyclable.

Using the RTM technique also has its advantages. The RTM process is able to manufacture complex shapes, and integration of parts can be achieved. For example the fenders and front bumper can be manufactured as one part 236, resulting in a minimal part count. In order to remain consistent with this simplicity, the front structure 236 will not be permanently attached to the lower structure 200, using adhesives. Rather it will be located and attached by mechanical fasteners. This approach simplifies the assembly and ease of removal if circumstances require.

Door and Side Intrusion Protection

In order to continue with our design philosophy of integration, doors 240 have been designed as structural members. This has been achieved by using a new technology, which comprises an innovative, cost effective and lightweight hybrid composite laminate. These laminates comprise glass fibers with a high strength metal core, effectively a sandwich structure.

This system has been produced by the ELACO™ group. Their laminates have proven to show qualities such as high impact strength and high energy absorbing capabilities while still maintaining a low density, when compared with material such as steel. According to ELACO™, their laminates are excellent for occupant protection when used in conjunction with automotive doors. Less is more in this case, where large bulky side intrusion members are not necessary.

A-Pillar and Roof Rail

Figure 56:
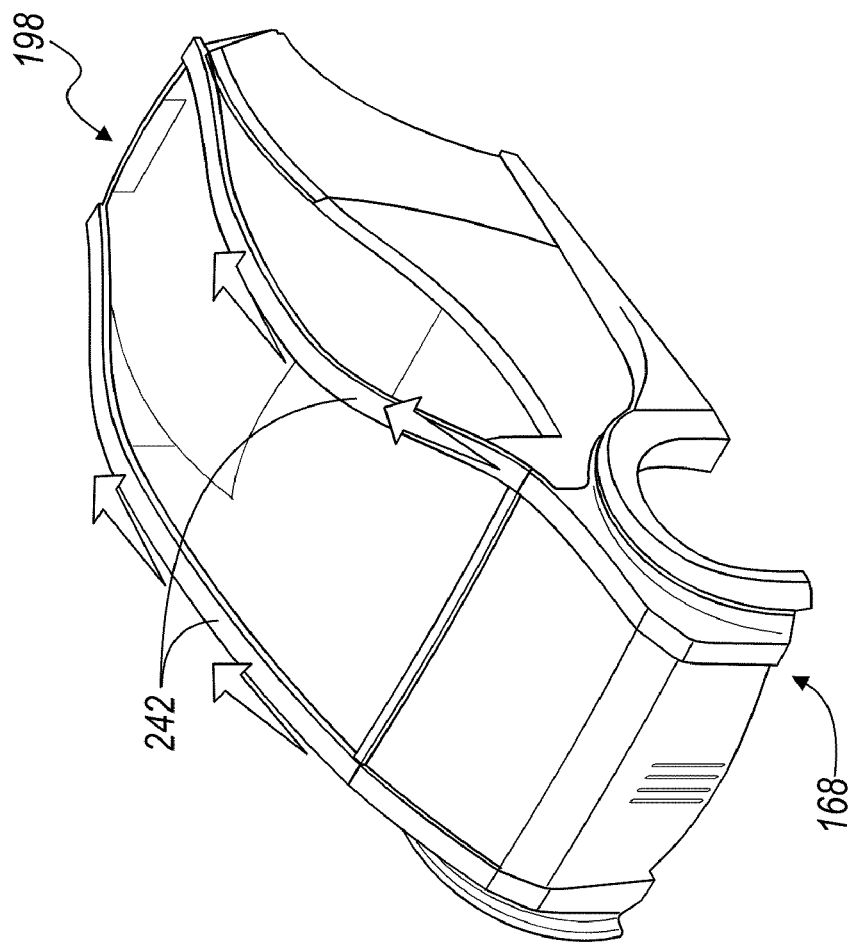
FIG. 56 is a side view and a perspective view illustrating load paths in the vehicle structure.

As the name suggests this A-pillar and roof rail structure 242 serves two purposes in this concept, one as occupant protection in the event of roll over and two as paths for the loads generated in a front or rear end crash situation. In order to provide strength and stiffness, these rails 242 are manufactured from a glass fiber reinforced thermoset plastic (GFRP). This material setup allows for accurate fiber management to be achieved, whereby the fibers are orientated in the direction of the load paths. FIG. 56 illustrates the load paths transferred through the A-Pillar and roof rail member 242 when used in conjunction with the front crash structure 168 and rear suspension members 172.

An epoxy system has been used since these offer a higher strength and stiffness when compared to thermoplastics. In order to keep the assembly processes down, the roof rails 242 will be bonded to the lower structure 200 using the use of adhesives.

Roof and Windshield

The roof 244, unlike conventional cars, also acts as the windshield, and is made from an abrasion resistant polycarbonate. This material was primarily chosen as it is able to reduce overall weight. Additionally these new age polycarbonates offer UV degradation protection, excellent impact strength and are recyclable. Unlike glass, polycarbonate is tough, as it is a thermoplastic, and will not shatter in the event of roll over. Polycarbonate can be purchased as sheet, and heated and formed into shape.

Rear Quarters and Back Panel

As with the front structure 236, the rear structure 246 can also be considered a complex shape made simple by integrating many conventional panels into one. Unlike the front structure 236 however, the rear 246 has been designed with further structural integrity, where it is manufactured from a glass fiber reinforced thermoset plastic. Being structural it serves a number of purposes. In the event of a rear crash situation, the rear wheel structure 172 may have a tendency to try and protrude the divide 246 between itself and the rear seated occupants. Therefore making this divide 246 a structural member lessens the likelihood of intrusion. In addition considering that this member 246 is bonded to the lower structure 200, it adds strength and torsional rigidity to the rear of the pneumatic vehicle 100. It also aids in distributing the loads acting through the members 216, 220 it is bonded to. Modularity is greatly improved by the fact that this rear component 246 fits over the rear structure 216, 220 as one component. This enables future models to be designed easily using the one platform; for example a utility or roadster model can be easily produced by changing this and only a few other components.

Summary of Material Use and Manufacturing Processes

Figure 57A:
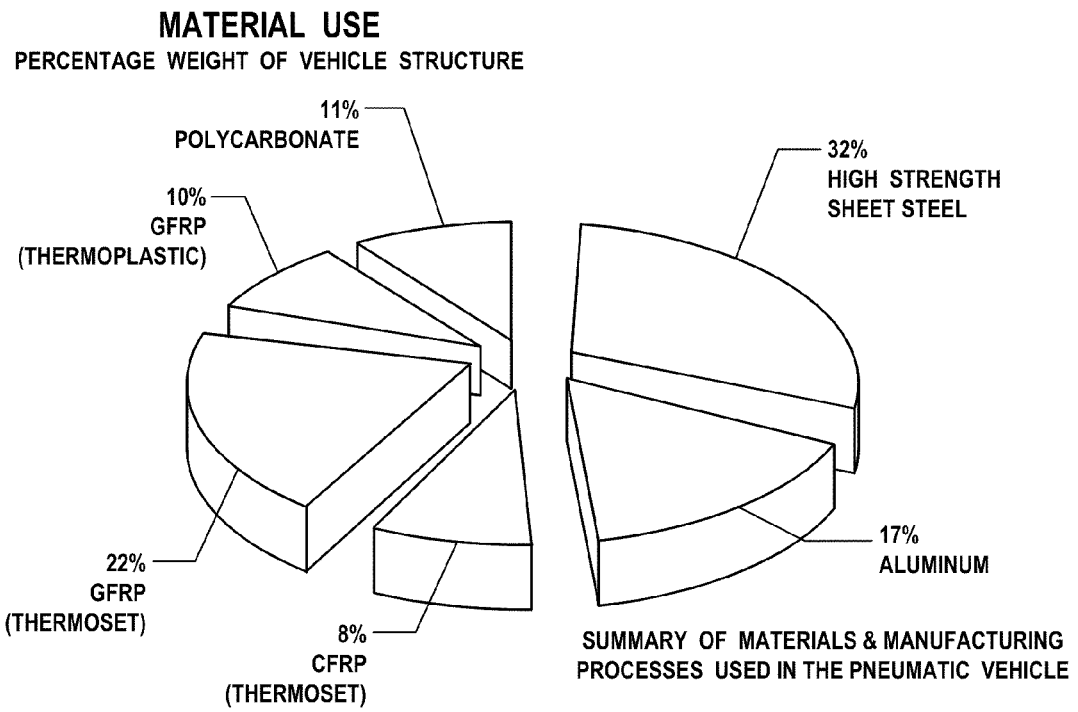
FIG. 57 is pie charts illustrating a summary of materials (57a) and manufacturing processes (57b) used in the pneumatic vehicle.
Figure 57B:
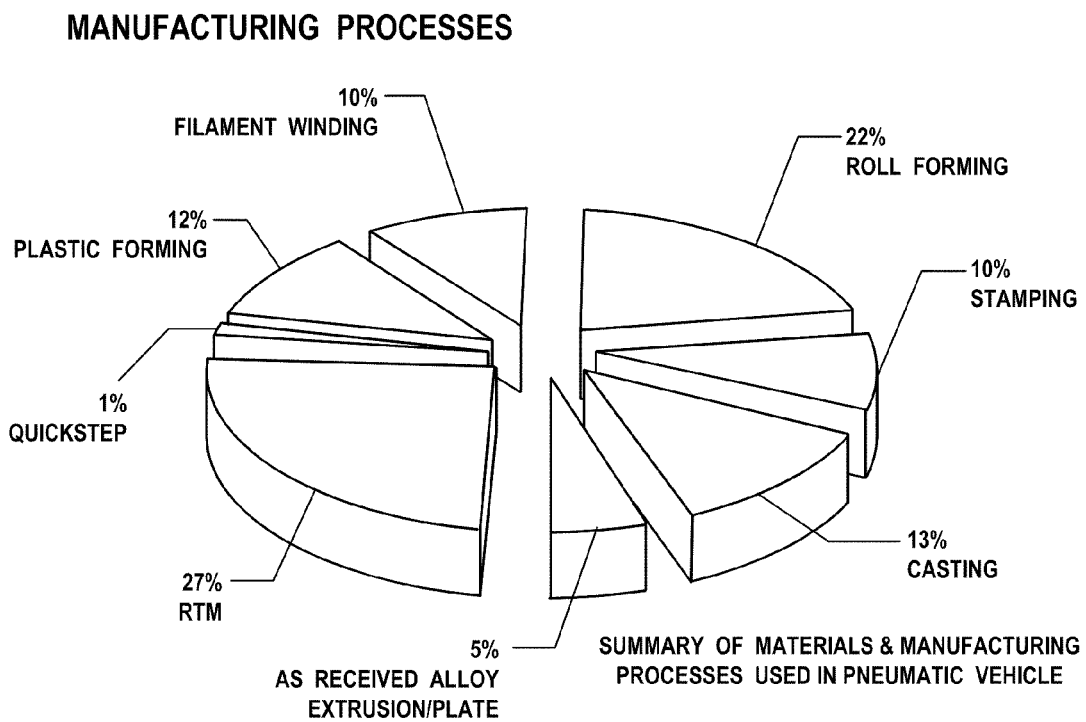
Figure 59A:
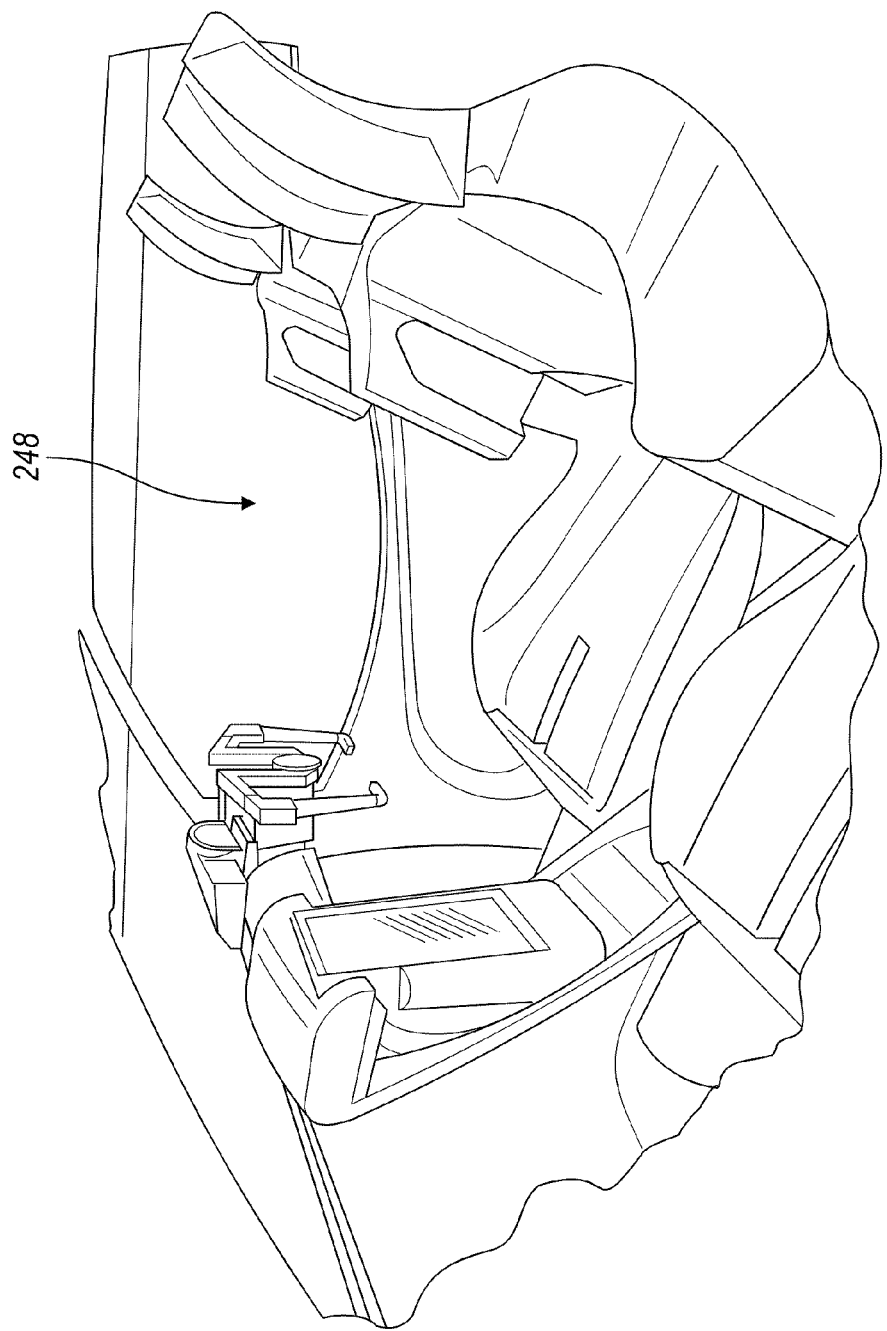
FIGS. 59a-c are side perspective views of an interior of the pneumatic vehicle.
Figure 59B:
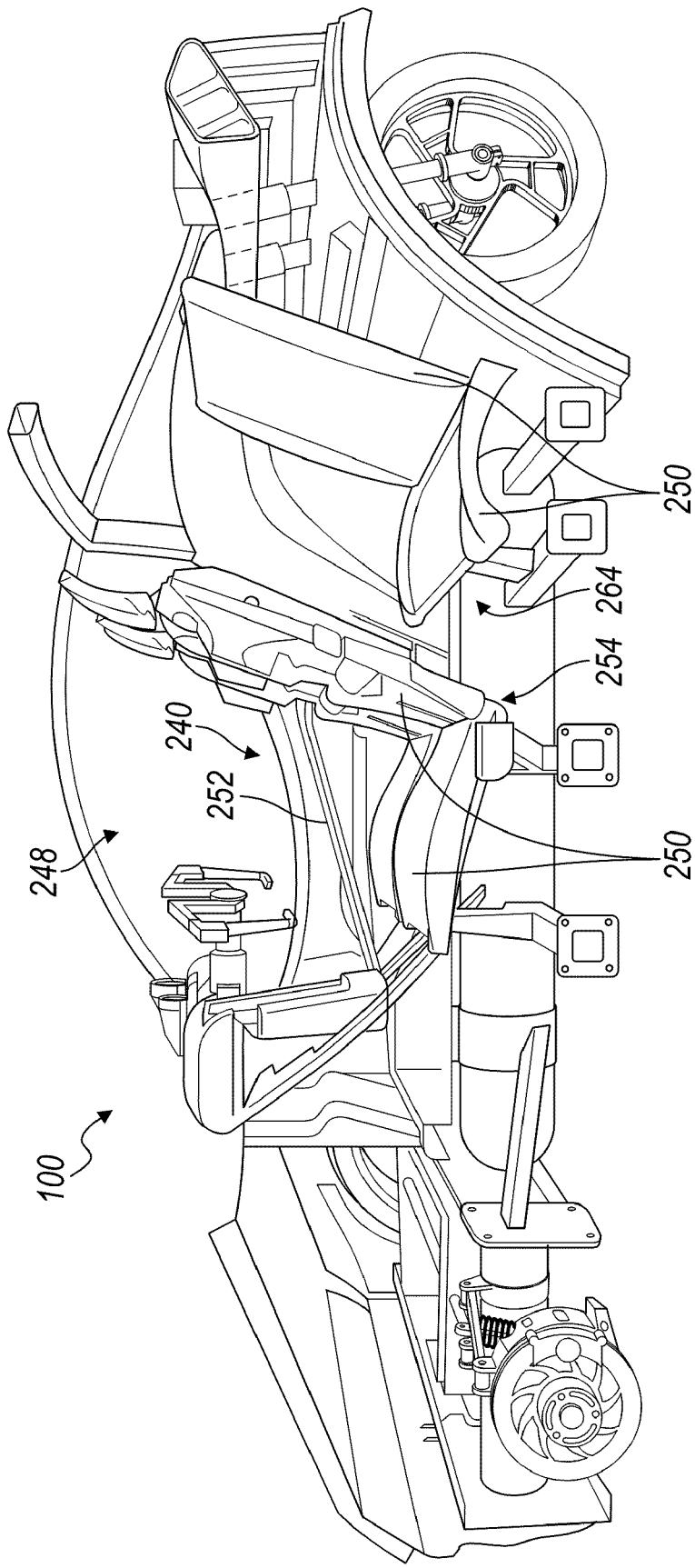
Figure 59C:
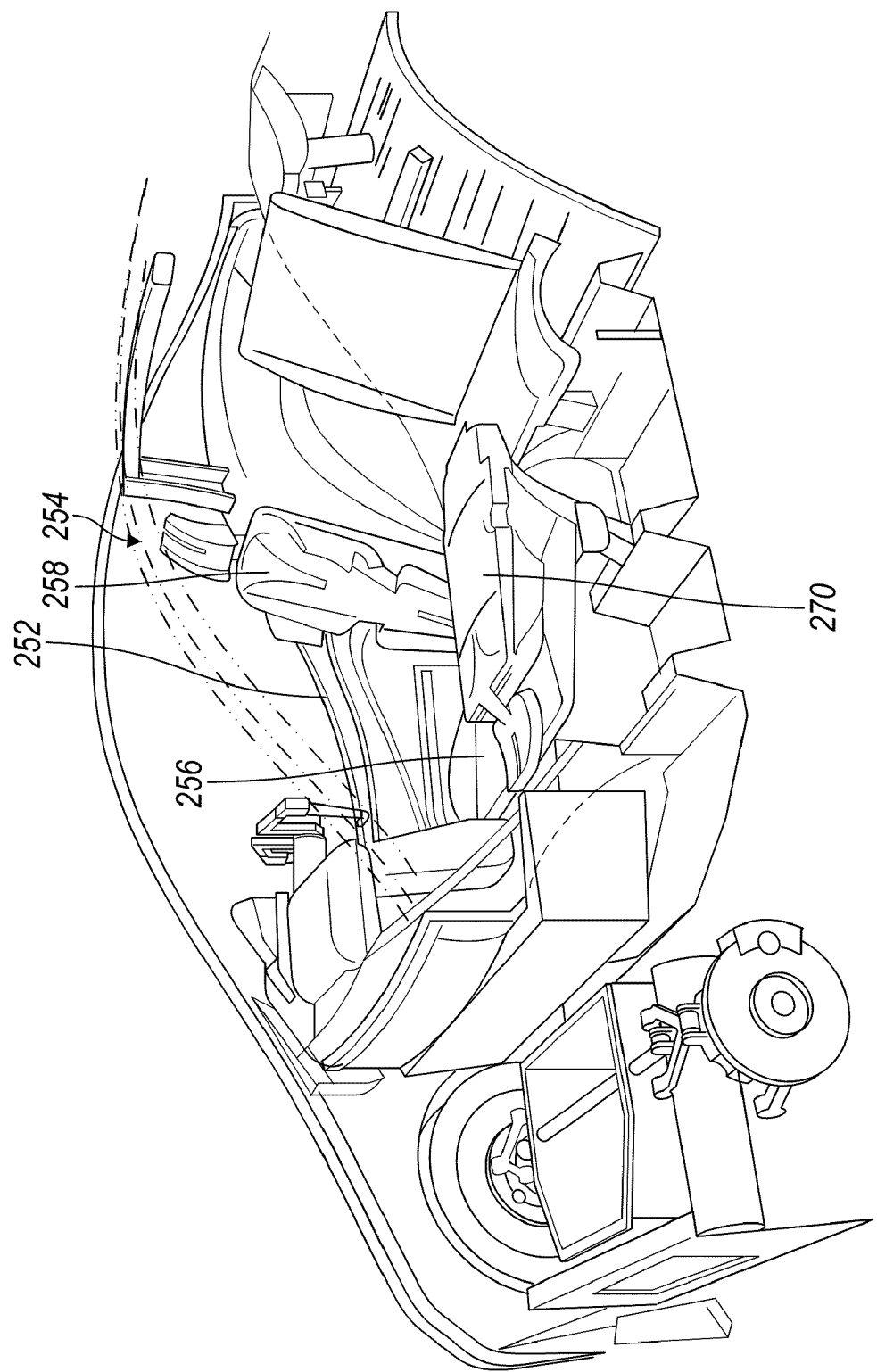

It is evident that a lightweight low cost and high strength vehicle body and structure has been achieved through an integrated and simplistic design. This is achieved by taking advantage of new manufacturing techniques and novel materials. These are summarized in FIGS. 57a and 57b.

These charts highlight the significant use of these new processes compared to current methods, such as stamping which is only responsible for 10% of the structure. Traditional stamping techniques have been replaced with roll forming and RTM processes, which are used to manufacture almost 50% of the structure. The main advantages these processes have to offer include: reduced cost through a reduction in complex tooling, increased efficiency through reduced part count, and assembly processes and a significant reduction in weight. In addition these allow for increased flexibility and modularity in terms of future concept designs and the outsourcing of production processes. See FIG. 58 for a parts list of the upper vehicle body 198.

Vehicle Interior

A vehicle interior 248 was designed with careful consideration of several attributes to ensure that the car interior 248 was stylish but flexible so that it could appeal to a variety of market groups. These attributes were:

User customization;
Manufacturability;
Cost;
Weight;
Variety;
Ease of use.

As the interior space 248 is the most interactive part for the user of the car 100, our design philosophy of "integrated simplicity" was combined with the concept of "user customization". This provided a platform that could be optimized to suit the owner's needs.

The use of simple interchangeable interior components, as well as plug and play electronics, were enablers for the design.

The Concept

The vehicle interior 248 concept is focused around simple interchangeable seat and door trims 250, 252. The interior is represented in FIGS. 59a, 59b, 59c and 60. Door trims 252 utilize a quick fix panel system that can be cheaply produced and quickly attached to the door structure 240. The seats 254 follow a similar concept with an easily interchangeable upper and lower cover 250 that fix to the frame of the seat. This enables damaged, faded or unfashionable seat covers to be simply replaced with new factory or aftermarket covers 250. Both of these allow the user to quickly adapt a new or used car to their preference providing increased satisfaction in their purchase.

The interchangeable door trims 252 also enable a break from the traditional specification and delivery of interior systems. Currently the customer either accepts a standard interior or they order a custom interior that is fitted by the factory with large delays in delivery and costs to the customer. With the pneumatic vehicle 100 concept, the car 100 can be delivered to the dealership and the interior 248 can be added to the car 100 by dealer qualified fitters. One way for a dealer to specify out the car 100 would be to have a virtual car package set up on the internet. The customer could view and interact with the interior 248 of the car 100 using the virtual world (this is known as haptics) assessing a range of different interior set ups. This could include colors, patterns and materials. The interior components would be orderable over the internet and installed by either the dealer or the owner.

Seats

The design concept for the pneumatic vehicle seats 254 is to utilize the same RTM manufacturing process used for the vehicle's body as a base platform to support the inflatable seat adjustment system. See FIGS. 60 and 61.

RTM was selected for the seat base 256 as it enables a twin piece seat 254 to be made at a relatively low cost. In order to provide strength and stiffness the seat frame 258 is manufactured using a Glass Fiber Reinforced Thermoset plastic (GFRP). This material setup allows for accurate fiber management to be achieved, whereby the fibers are orientated in the direction of the load paths. The base structure 256 is far simpler than that of a conventional seat as it does not require any spot welding or steel pressing. The two halves of the seat 254 can be pushed together and held in place by locking points 260 made as part of the molding process. This fixing system cuts down the inventory of parts required for fixing the two parts together during assembly. Along with the integrated clip system the integration points for air bladders 262 can be provided in the one molding process for the front part 250 of the seat mold. The simple manufacture and assembly process helps to cut the cost of producing the seat 254 and make it more reliable as there are less moving parts.

The GFRP base 256 can be achieved because of the unique air bladder cushioning system 262. The silicone rubber air bladder cushions 262 replace the need for springs and polyurethane foam and provide far more driver adaptability.

The use of low pressure air inflatable inserts 262 within the seats 254 allow for a wide range of adjustment with a single pressure controller and selector valve. The silicone rubber bladders are held in place by clip-in plastic inserts 260 that mount into the front half of the seat frame 258. Sealing is achieved by a thin layer of a silicone adhesive between the bladder edge and the seat front. The bladder system 262 allows multiple adjustments normally achieved by complex mechanical system.

Figure 62:
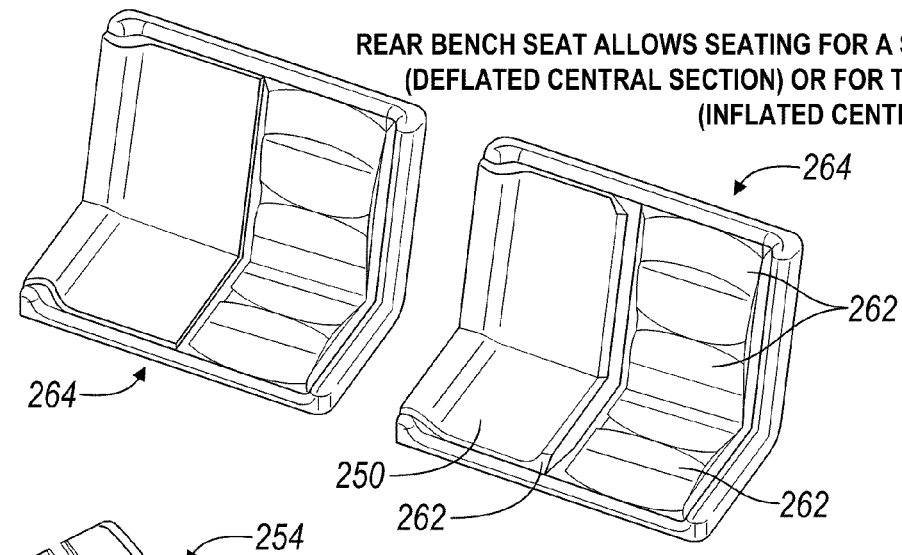
FIG. 62 is perspective views of a rear bench seat that allows seating for a single adult (deflated central section, left) or for two children (inflated central support, right)

This system 262 is particularly evident in a rear passenger seat 264, see FIG. 62. This seat 264 is designed to hold either a single adult or two children. This is achieved by the inflatable bladders 262 that are positioned to inflate into a center division forming two small bucket seats. These then deflate to form a bench seat for a single adult.

The elimination of accelerator and brake pedals means that the seats 254 can be fixed in a constant position within the car 100. This means that seat mounts 266 can be simplified to one-piece brackets that have no moving parts while the driver comfort is achieved through the tilt and projection of a steering wheel 268.

Figure 63:
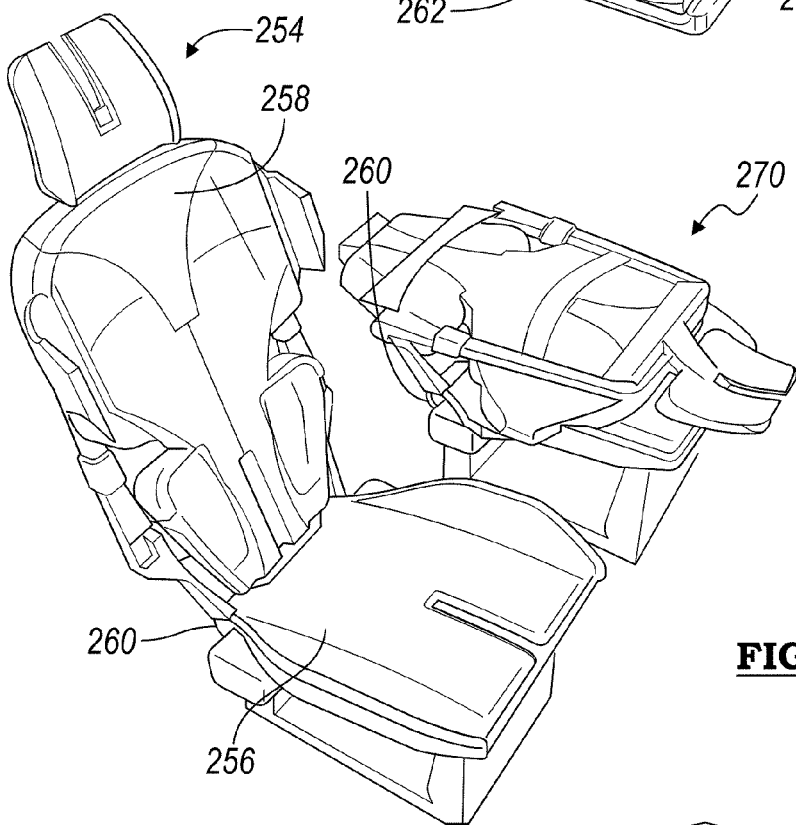
FIG. 63 is a perspective view of front vehicle seats illustrating how a front passenger seat can fold horizontally flat, allowing a great ingress/egress and storing space.

While fixed to the structure of the car 100, the front seats 254 still have a range of hinged movement between the base 256 and back support 258. The driver's seat 254 is restricted to a small tilt for adjusting driver comfort but the passenger seat 270 is allowed a greater range to fold down parallel to the base 256 as in FIG. 63. This creates a flat 'table' area for extra storage space across the front passenger seat 270 and into the rear bench seat 264.

The fabric coatings 250 for the seats 254 complement the interior trims 252 and carpets 272 and are easily changeable. The seat 254 does not have a conventional sewn cover that is permanently attached to the car 100. The seat coverings 250 are slipped over a semi-ridged hoop that stretches down over the inflatable bladders 262 to be fastened at the seat structure 254. One method for manufacturing the base model car seat cover 250 would be using a fully fashioned circular knitting machine. The seat cover 250 knitted using this method would have limited waste; no edge seams and limited requirements for cut and sew. All of these savings help to reduce the manufacturing costs. The use of a high stretch textured synthetic filament allows for good conformation over both the inflated and un-inflated bladder system.

Traditional cut and sew construction could be utilized to allow covers to be made from multiple material types and some of these include woven fabric, velour fabric, leather and vinyl. This enables a wide variety of options for the consumer to customize their car 100. Like the interior trims 252 and carpet 272, the seat covers 250 can be changed to suit the latest fashion or to get rid of staining or dirt.

Floorings

The design of the flooring follows the same concept of flexibility and choice found in the rest of the interior. The floor pan 138 has been designed to be flat with turned up sides that allow for simple pressed flooring shapes. Choice of floor materials is wide providing high flexibility and a wide variety of choices for the consumer. Materials such as Polypropylene non-woven fabrics, tufted polypropylene carpet or rubber matting are a few examples that could accommodate end uses from the base model, luxury interiors through to a tradesman's vehicle.

The carpet manufacture system is simple. Non-woven mats can have a melt-bonded edge applied to the carpet 272 during pressing to shape. This incorporates two steps into one and provides for a slightly flatter edge that can be inserted easily under the retaining trims. The non-woven floor covering is a low manufacturing cost alternative for the base model car 100.

Figure 64:
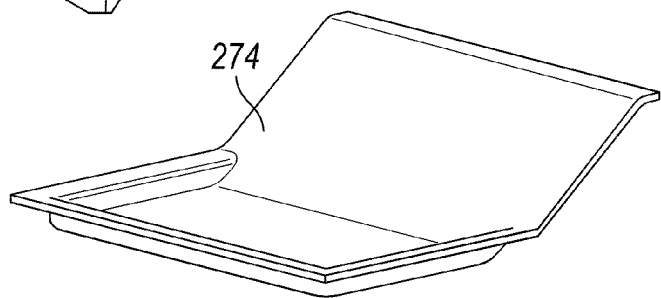
FIG. 64 is a perspective view of a removable interior floor lining.

Rubber matting 276 is designed to insert inside the non-woven matting floor, see FIG. 64. The rubber matting 276 can be utilized in many ways including as a protective cover when the pneumatic vehicle 100 is used for deliveries or by a tradesman. The rubber lining 276 can then be removed and the car 100 can be used as a family car 100 on the weekends or for special occasions.

To keep with the concept of adaptability, the flooring 276 can be colored and patterned using digital printers to provide designer flooring 276. This would be unique within the auto industry as the flooring 276 could be designed to match or complement the other parts of the interior and once again the low cost non-woven material matting could be easily changed to suit the owner's needs.

Door Linings

The door lining 252 consists of two components; a solid panel and a decorative trim. The solid panel is multi functional acting as both a mounting point for the door trim 252 and as a sound deadener for the door cavity. The decorative trim 252 is adhesively backed and easily interchangeable for optimum adaptability of the interior.

The door trim 252 is designed with an adhesive backing laminated to it during manufacture. It allows for trim selection and fitting at the point of purchase or by the customer. The trim can be changed if the color fades, becomes soiled from use or just a change in appearance.

Door trims could be made out of a variety of different materials and after laminating could be cut out with an automated laser cutting and patterning system. This range of both factory and non-factory trims would provide flexibility in the interior styling to suit a wide range of market types.

Multiple trim materials allow for several levels of interior fit out. These levels would include base model, sports, luxury, tradesman and designer. Materials used could include woven textile, velour textile, carpet, leather and plastic film.

The trim system would cut down the inventory of parts required by the manufacturer for the assembly of the car 100. The car 100 would be supplied to dealer without trim and the dealer would hold the inventory of trim or consumers could order specialized trims from the internet and have them delivered flat packed in express mail as the shape and weight of the trims would be low.

The solid panel is a clever composite made from a bi-layer air-laid needle punched non-woven fabric. Air-laid non-woven material has high production rates at a low cost. They have the most uniform tensile properties of all of the non-woven manufacturing techniques as the fibers have a good distribution in both the machine and cross machine directions. The bi-layer material is selected as it provides a solid layer for structural conformity and a soft layer for noise deadening.

The difference between the two layers is the ratio of the fibers used. The solid layer is made from a mixture of 50% low melt temperature synthetic fiber and the 50% natural fiber. The soft layer is made from a mixture of 90% natural fiber and 10% synthetic fiber. In the solid part of the panel the natural fiber is used as reinforcement for the panel after hot molding. In the soft panel it is used for adsorbing the noise generated within the door cavity. The synthetic used could be either polypropylene for low cost or polylactic acid for an environmentally degradable product. The synthetic is used to bond the natural fibers together in both of the layers. In the solid layer the synthetic provides a solid structure after hot pressing whereas the synthetic in the soft layer bonds fibers but still allows openness of the layer. The two layers are connected during needle punching and remain interconnected after the hot compression molding phase of the door construction.

Control Systems

Figure 65:
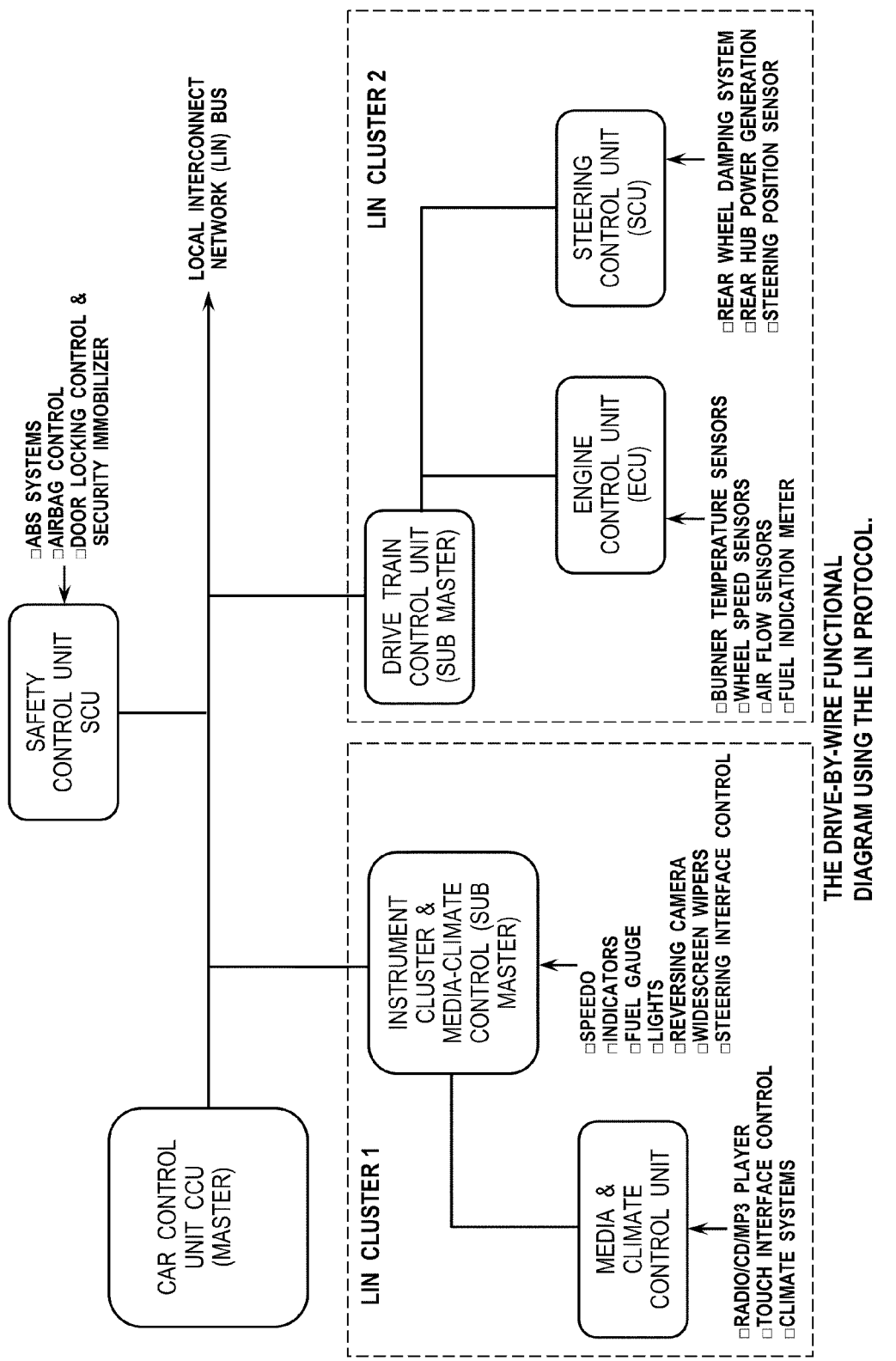
FIG. 65 is a functional diagram of the drive-by-wire using a Local Interconnect (LIN) protocol.

Referring to FIG. 65, an electronic drive-by-wire system 276 that will be used to control the various systems throughout the pneumatic vehicle 100. Using a complete drive-by-wire system 276 allows precise control over all systems, including the powertrain 102, braking system 186, steering system 140 and other Human Machine Interfaces (HMI). This ties in with the design philosophy of total integration. Using embedded low cost devices, a modular system 276 has been developed which allows for a plug-and-play style system of independent interconnected networked elements, which control and monitor dedicated sub-systems under the control of a master processor, achieving a level of total integration. Like the original Model T which had a production life span of twenty years, the pneumatic vehicle 100, through the central computer system, allows the ability to plug-and-play hardware and update of control software with ease, turning the pneumatic vehicle 100 into a flexible and customizable appliance. In the following sections each element in the drive-by-wire system will be described in detail.

Car Control Unit (CCU)

A car control unit (CCU) is the master controller within the car's communication system 276. Based on a master/slave concept, the master oversees the high level operations of the lower slave modules which are dedicated to individual control tasks. Consisting of a low cost embedded microprocessor, the CCU uses a Local Interconnect Network communication protocol (LIN) which comprises of a single wire, which is a much more simple solution to the current communication methods used in today's motor vehicles.

The CCU involves tasks such as, defining transmission speeds, sending synchronization pulses to the slave modules, data monitoring and recording within the pneumatic vehicle 100, switching slave nodes to sleep/wake up mode, acting as the central brain of the pneumatic vehicle 100.

FIG. 65 demonstrates the drive-by-wire functional diagram showing how the CCU master is connected to the slaves via the LIN method. In the next section, the LIN protocol is described.

Local Interconnect Network communication protocol (LIN)

The LIN (Local Interconnect Network) is a low cost serial communication system intended for the primary communication method in the distributed electronic system in vehicles. LIN complements the existing methods of automotive communication networks (see FIG. 66) and provides an effective solution to the embedded control methods within the pneumatic vehicle 100.

In the regular car market, the typical applications for the LIN methods are in assembly units such as doors, steering wheel, seats, climate control, lighting, rain sensor, etc. In these units, the cost sensitive nature of LIN enables the introduction of mechatronic elements such as smart sensors and actuators to be included as part of the design. They can be easily connected to the current car network and become accessible to all types of diagnostics and control services. For the low cost car market, the LIN method can replace the conventional car networks, (such as CAN), and can enable a cost-effective communication for smart sensors and actuators where the bandwidth and versatility of CAN is not required.

Figure 66:
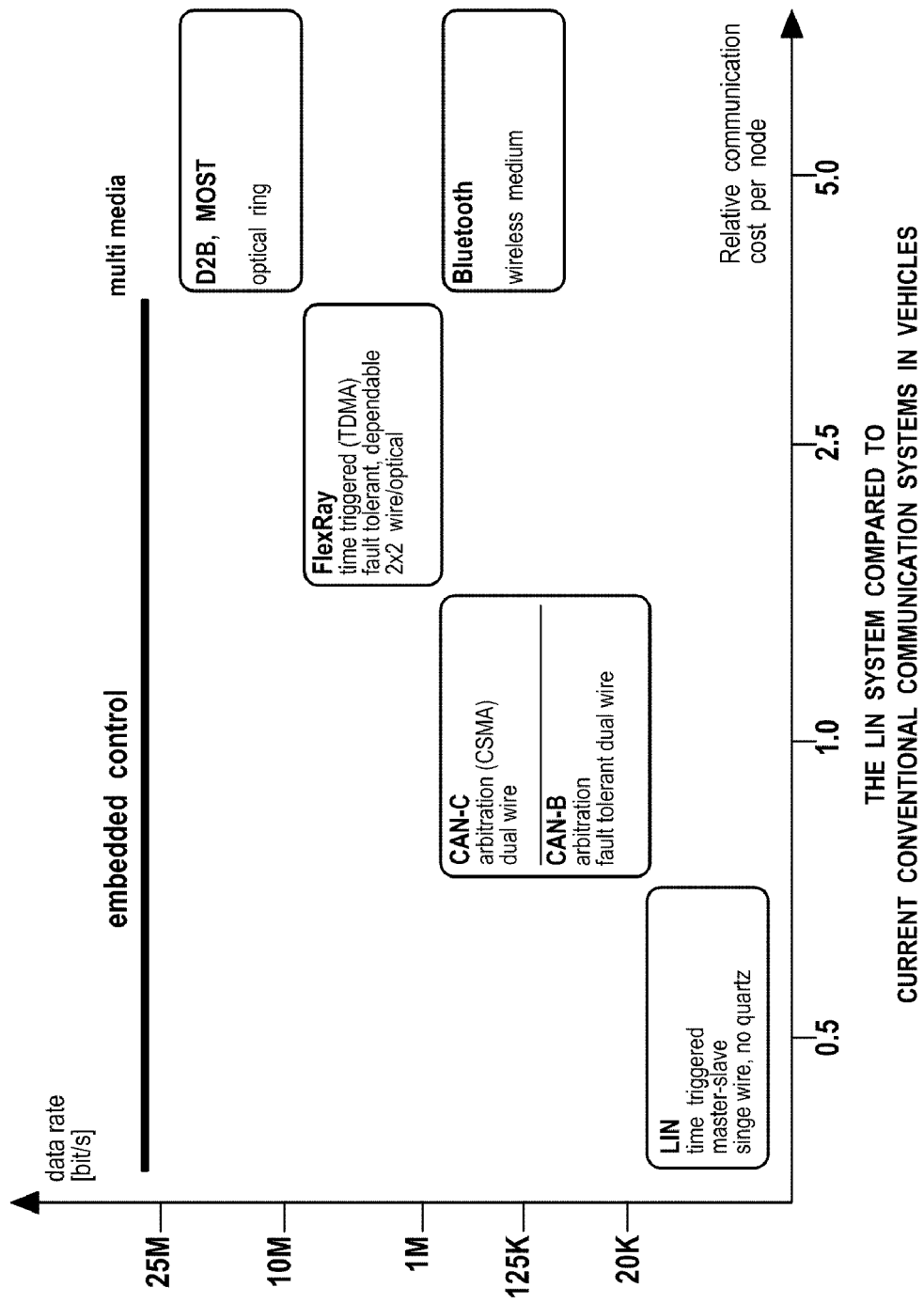
FIG. 66 is a graph illustrating the LIN system compared to current conventional communication systems in pneumatic vehicles in terms of data rate.

The communication is based on an SCI (UART) data format, a single-master/multiple-slave concept, a single-wire 12V bus, and clock synchronization for nodes without a stabilized time base (LIN, http://www.lin-subbus.org/). This method reduces the need for a large wiring harness and cuts the cost of development, production, service, and logistics in vehicle electronics compared to that of existing low-end SCI based multiplex solutions (as shown in FIG. 66). Although it does not operate at high data rate speeds compared to conventional methods, such as CAN-B and CAN-A, its master slave concept and one wire interface allows for this method to be implemented in the low cost embedded systems area. With a relatively low communication cost per node, it is ideal for the low cost car market.

The benefits of the LIN method are as follows:
Low cost single-wire implementation,
Enhanced ISO 9141, VBAT-based speed up to 20 Kbit/s,
Acceptable speed for many applications (limited for EMI-reasons),
Single Master/Multiple Slave concept,
No arbitration necessary,
Low cost silicon implementation based on common UART/SCI interface hardware,
Almost any microcontroller has necessary hardware on chip,
Self synchronization in the slave nodes without crystal or ceramics resonator,
Significant cost reduction of hardware platform,
Off-the-shelf slaves,
Flexibility because of configuration features,
Guaranteed latency times for signal transmission,
Predictable systems possible, and
Easily upgradable with plug and play items.

Safety Control Unit (SCU)

This module is design solely to coordinate the safety features of the car 100. Features such as ABS, Airbags and seatbelt restraints, along with the optional features such as an alarm or a security immobilizer are controlled via this slave processor.

Instrument Cluster and Media-Climate Control Unit (ICM-CCU)

Figure 67:
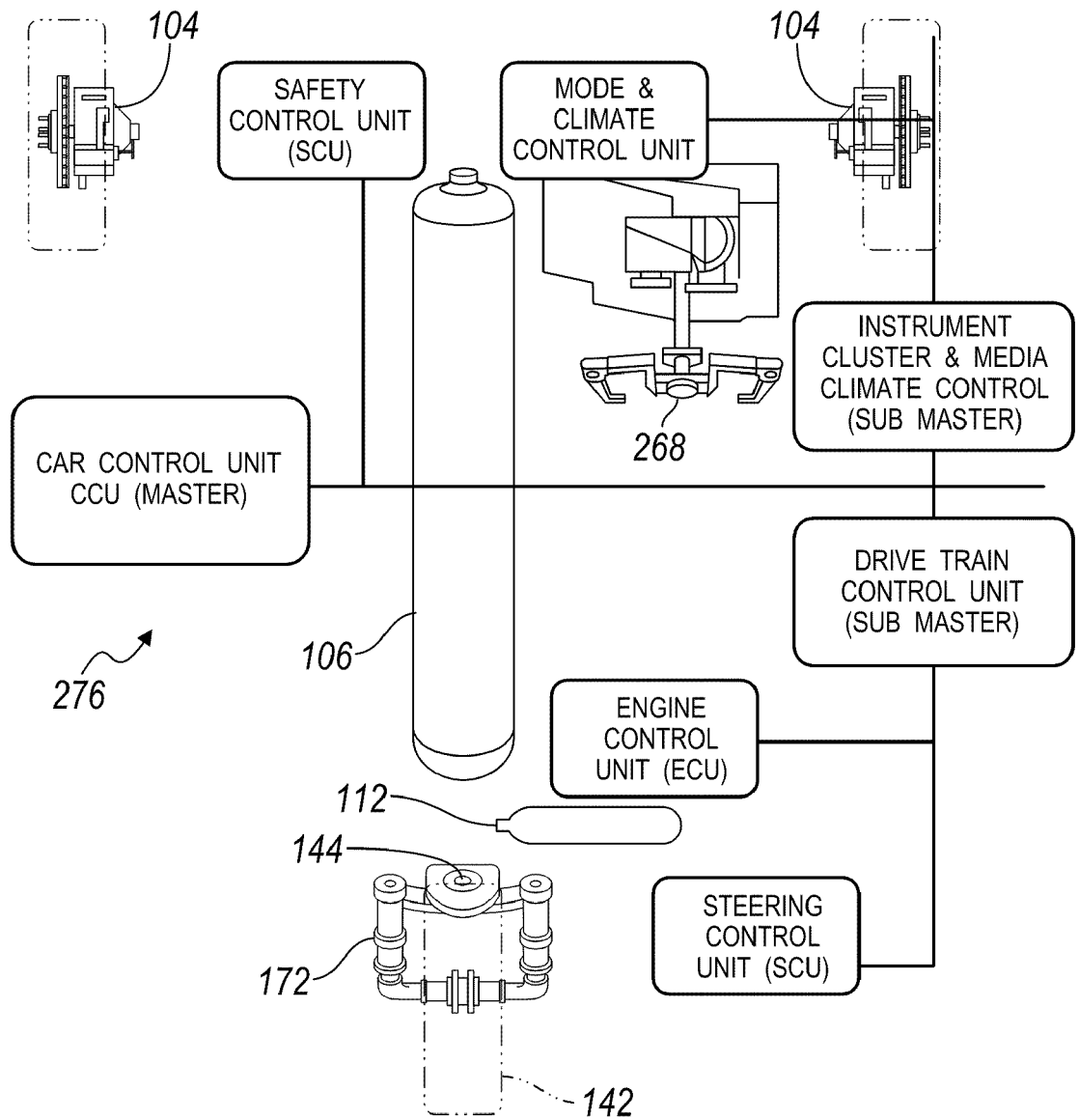
FIG. 67 is a schematic view illustrating the positioning of control units throughout the car, and their connectivity to a Car Control Unit (CCU)
Figure 68:
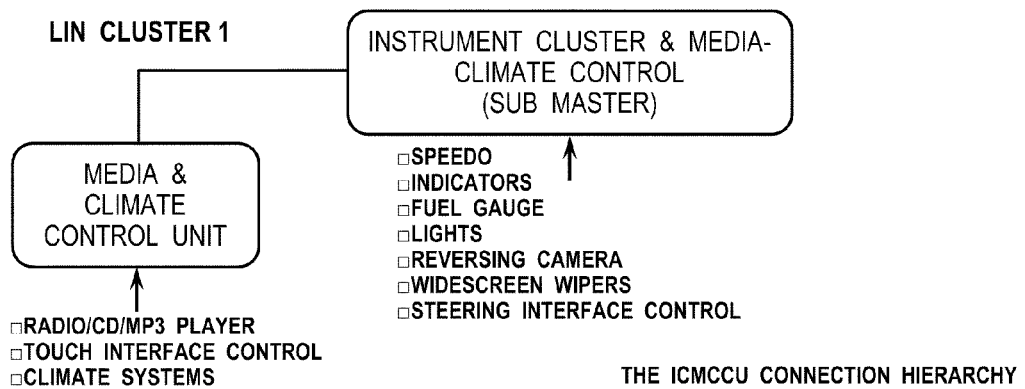
FIG. 68 is a schematic view illustrating an Instrument Cluster and Media-Climate Control Unit (ICMCCU) connection hierarchy.

This unit controls the main human-machine interface of the car 100. Once again using a master/slave concept, the Instrument cluster and Media-climate control Unit (ICMCCU) commands a sub unit using a LIN cluster method. The ICM-CCU directly controls elements such as the Speedometer, indicators, fuel gauge, lights etc by receiving digital signals from the appropriate sensors within the car 100, processing the information, and sending it to the CCU or an appropriate display unit (positioning shown in FIG. 67 and connection hierarchy shown in FIG. 68).

There are two main display units within the car 100, the instrument panel, and the Media and Climate center. These are explained in further detail below.

Instrument Cluster

The instrument cluster contains instrumentation and controls pertaining to operation of the pneumatic vehicle 100. Since this system is a modular, drive-by-wire system 276, it can be modified to the users liking and upgraded easily as the car 100 is upgraded.

Media and Climate Center

The media and climate center is the focal point within the dash and allows the users to interface with the car's heating and cooling system 128 along with the sound system. With the use of a low cost touch interface, the interface screen is free of mechanical knobs and buttons allowing it to be fully customizable and user friendly. With the addition of software updates, new features can be integrated through this system and extra features such as GPS, pneumatic vehicle diagnostic tools, performance measures etc, can be added as new systems become available.

Drive Train Control Unit (DTU)

Figure 69:
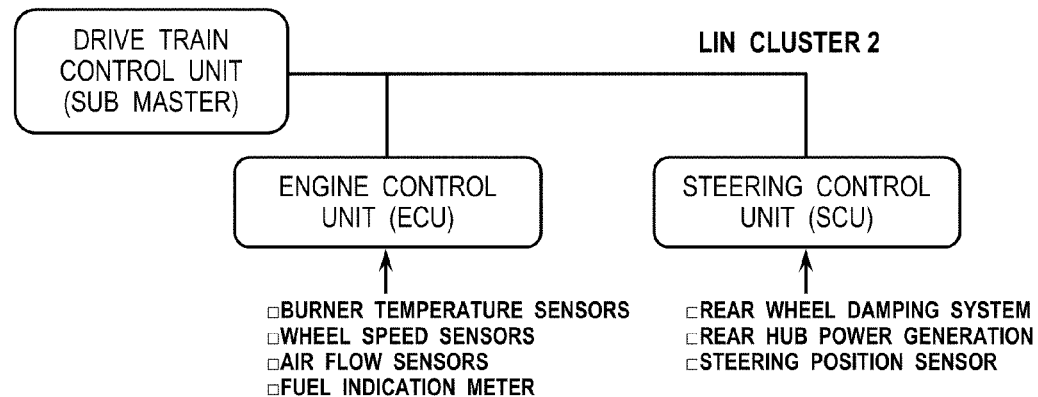
FIG. 69 is a connection diagram for a drive train control unit (DTU)

Once again using a master/slave concept, the Drive Train control unit (DTU) primary function is to oversee the control functions of the two sub systems, the Engine control unit and the Steering control unit. See FIG. 69. In addition, the DTU also determines what physical actions are needed to be taken for the pneumatic vehicle 100 to move. For example, if information from the Steering control unit contains the commands to turn left, and the Engine control unit sends the commands for acceleration, the DTU performs the control actions of open right valve more than the left valve, and injects hotter air into the system which would cause the pneumatic vehicle 100 to turn left at a fast speed.

Engine Control Unit (ECU)

This unit is primarily used to control the various aspects of the engine's operation. The role behind this unit's operation is to determine the quantity of fuel, pressure control, control heating systems 110, 130 and other parameters by monitoring the engine 104 through sensors. The monitoring and control of this system is done by using a control loop such as a PID controller.

For example, this system reads the throttle position and determines the amount of fuel that is needed to be provided to the motors 104. If the throttle pedal is pressed further down, this information will be sent to the DTU and this will open the valves and allow more air to be passed through the heat exchanger 108 and into the engine.

Steering Control Unit (StCU)

The Steering control unit (StCU) is primarily used to monitor and control three items: to control the rear wheel damping system 144, to control and monitor the regulation of the rear hub 196 power generation, and to monitor the steering position sensor. The StCU reads the position of the steering sensor in the steering wheel and sends this to the DTU for the control of the motors 104.

The rear wheel damping system 144 is also monitored and controlled via the StCU. This system obtains wheel speed sensor readings and either stiffens the dampening system 144 for high speeds, or relaxes it for low speeds.

Rear Hub Generation Method

For the pneumatic vehicle 100 to have sufficient power, a method of power generation is capable of running the onboard electronics. Since the rear wheel assembly 142 is free spinning, a regenerative system 196 is placed into the rear wheel assembly 142 that uses a geared alternator setup to generate power for recharging a battery pack 278.

A geared setup obtains the correct revolutions per minute (RPM) for the alternator 196 to become excited to produce enough voltage. When the RPM falls below the excitement threshold, the system will no longer produce charge and the battery 278 will become drained. The gearing system within the rear assembly 196 allows for a relatively low RPM to be used to produce a constant trickle charge throughout driving.

Figure 70:
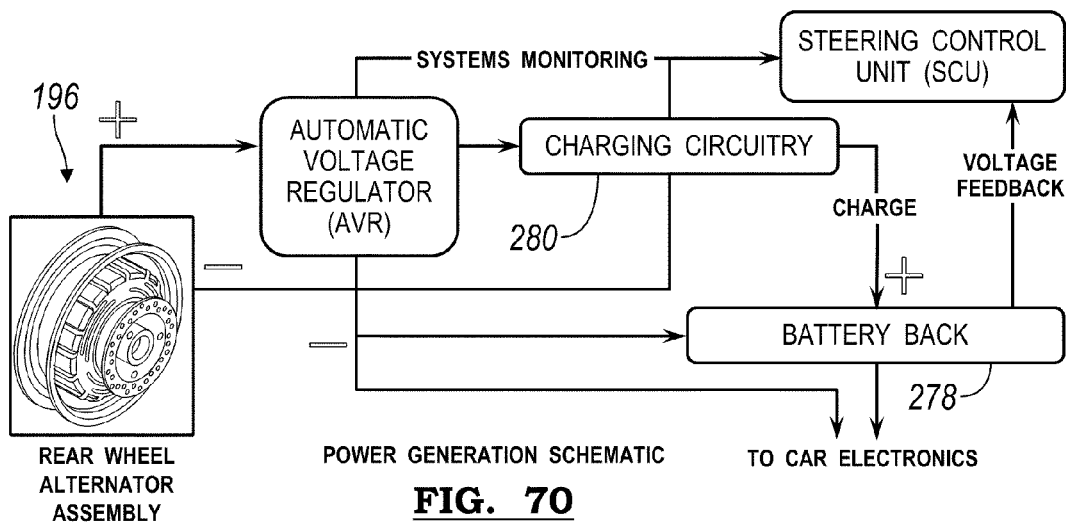
FIG. 70 is a schematic illustrating power generation and flow.

FIG. 70 depicts the connection setup for the power generation which consists of two main elements, the Automatic Voltage Regulator (AVR) and Charging Circuitry 280. The AVR converts the varying voltage from the alternator 196 into a usable form for the charging circuitry 280, and the charging circuitry 280 converts this voltage to charge the battery 278. The battery 278 used within the pneumatic vehicle 100 is of Lithium-polymer, or Lithium-ion type which is lighter compared to conventional lead-acid batteries and it can be specifically shaped to fit the housing environment. This technology was chosen for its greatly increased run times compared to conventional technologies, and it weight saving properties.

Future Expansion and Upgrades

The benefit of a drive-by-wire system 276 is that it allows for the technology to be upgraded and expanded with relative ease. Extra features such as GPS, cameras, environmental sensing technology, and head-up displays, etc., all can be added to the current system without any major modifications. The advantage of the LIN method allows for simple, low cost, plug and play modules to be added with relative ease at no cost to the current configuration of the electrical system. In addition, if any of the subsystems fail or need to be upgraded, they can be swapped for another module without hassle.

Business Proposal

This section outlines the pneumatic vehicle's costing and manufacturing processes for all the components and assemblies. Moreover, a business analysis has been performed regarding the launch of the pneumatic vehicle 100 in the Chinese market.

Manufacturing and Costing Report

Figure 71:
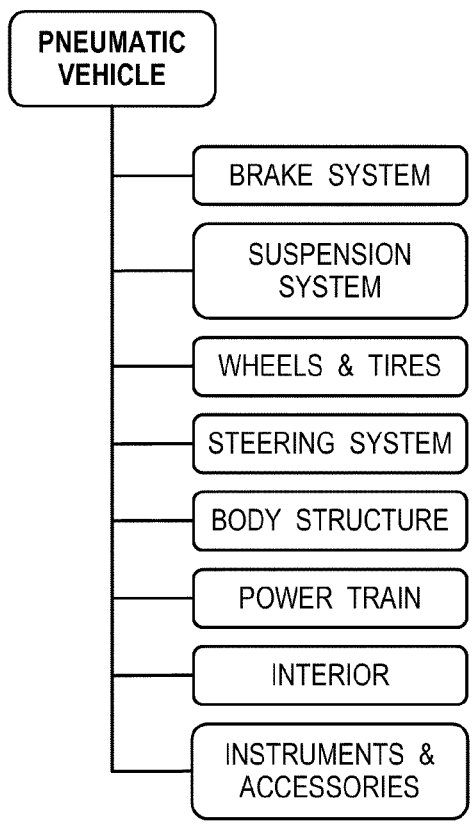
FIG. 71 is a schematic view of systems of the pneumatic vehicle that utilize manufacturing systems to reduce costs and vehicle weight.

The concept car 100 is designed as an entire system that is decomposed into sub-systems and components as illustrated in FIG. 71. Many of the systems have already been described previously. This section gives an overview on all of the systems regarding costs and manufacturing processes. Each system has been simplified where possible, and systems have used revolutionary manufacturing systems to reduce costs and vehicle weight.

Brake System

The concept car 100 comes with a conventional disk brake system 186 for the front wheels 114. The brake assembly 186 consists of the following major components: brake disk, master cylinder 194, braking solenoid, brake calliper and lining. The whole brake system is a conventional assembly; it can be outsourced and then assembled on the suspension system 152. The condition of the brake system is readily examinable, and the components that wear are designed to be adjusted or replaced at appropriate service intervals. The material used for the brake disk 190 is cast iron and manufactured by casting process and then machined, drilled and slotted. Ventilated disks are used so as to improve cooling action. Fixed front axle callipers are used so as they provide ample insulation space. The detailed calculations on the brake system can be found in the Vehicle Dynamics section.

Suspension System

Figure 72:
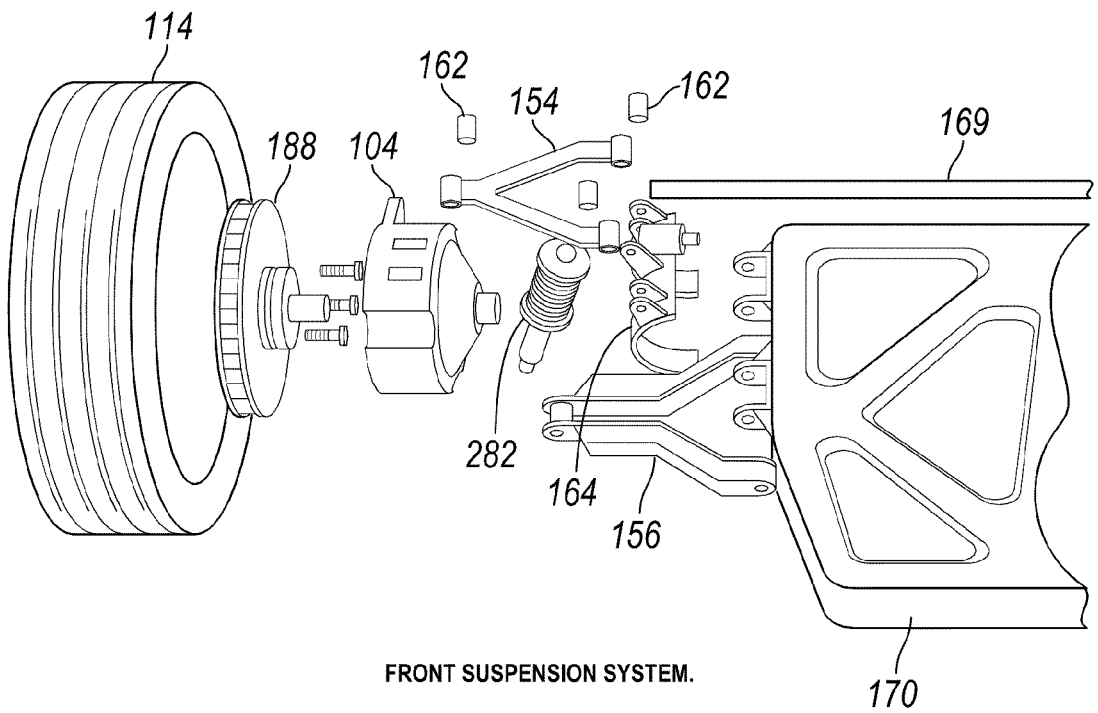
FIG. 72 is a perspective exploded view of a front suspension system.

The independent double wishbone suspension system 152 is used for both front wheels 114. The major components of this suspension system 152 (FIG. 72) are the lower and upper wishbones 156, 154 and coil over units 282. The material used for the upper arm 154 is a 6061 alloy and it is manufactured by a casting process. The lower arm 156 is manufactured by roll forming with Dual Phase steel. The cost is reduced by outsourcing the suspension system 152; this can be done as it is a conventional suspension set-up. The rear suspension system 172 consists of two telescopic forks 174 mounted on both sides of the wheel 142. The major components of the rear suspension system 172 are the upper and lower telescopic forks 174 with shocks 184 and coil springs 182 that are assembled to the fork crown 178. The front and rear suspension systems 152, 172 are directly assembled to the car 100. The front and rear suspension mounts 164, 220 are manufactured by casting with cast aluminum and 6061 alloy respectively.

Rear Steering System

The rear wheel 142 is allowed to swivel to enable steering. The steering angle of the rear wheel 142 is controlled by a rotary steering damper 144, which reduces the sweep angle and increases damping at higher speeds. More detail on the rotary steering damper 144 can be found in the Vehicle Dynamics section. The components manufactured in the rear steering system are the steering shaft 180 and a lock nut 284. The steering shaft 180 and lock nut 284 are cast using chrome stainless steel and alloy steel respectively. The rotary steering damper 144 can be purchased.

Wheel and Tires

Figure 73:
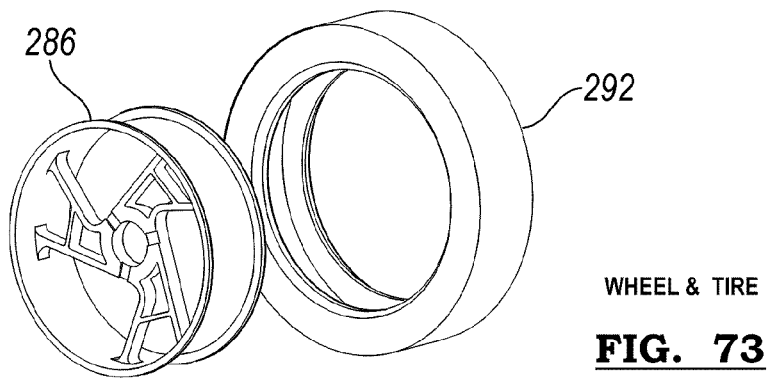
FIG. 73 is a perspective exploded view of a wheel and tire.

The front and the rear wheel rims 286, 288 are cast using a 6061 alloy, and then machined, slotted and drilled, see FIG. 73. The wheel diameter is 17 inches for both the front and the rear wheels 114, 142. A front wheel hub 290 is cast using an alloy steel, and then machined. The material used for the rear wheel hub 176 is a 6061 alloy, and it is manufactured using a casting process. The tires 292 can be purchased from a potential supplier.

Body Structure

The body structure comprises of two major sections, a lower section 200 and an exterior 198.

Lower Section

The manufacturing processes involved in creating the lower section 200 comprise stamping, casting, resin transfer mounding, extrusion, composite layering and roll forming. The firewall 208 and bumper 209 are stamped using a dual phase steel and a martensitic steel respectively. The wheel arches 294, a front access panel (not shown) and front sub frame 170 are manufactured using Resin Transfer Molding (RTM). The material used for the wheel arches 294 and the front access panel is glass fiber reinforced thermoplastic resin. Glass fiber reinforced epoxy is used for creating the front sub frame 170. The crash tubes 166 are manufactured using carbon fiber epoxy composite by the composite layer process. The cast components are the crash tube mounts 207 and the tank mounts 202 using cast iron and cast aluminum respectively. Roll forming is used to manufacture the martensitic steel rocker panels 210. RTM is used to manufacture the glass reinforced thermoplastic resin floor 138.

Exterior

The exterior section 198 consists of the bumper 236, the hood 238, two doors, a door ring reinforcement strip, a front reinforcement strip, several windows, and the roof and rear quarters. The manufacturing processes used are RTM and Injection Compression Molding (ICM). A glass fiber reinforced thermoplastic resin is used for the bumper 236, the hood 238, and the doors 240. A glass fiber reinforced epoxy is used for the rear section 246, the door ring, and the front reinforcement strips 242. All these components are manufactured using RTM except for the polycarbonate roof 244, which is Injection Molded.

Powertrain

The powertrain 102 consists of three units: the drive train 104, the jet burner 110 and the HVAC 128. The main component of the powertrain 102 is the rotary air motor 104. The motors 104 along with several other components, such as an air line 296, a throttle actuator (not shown), the regulator 120, and the fill tube 106 can be purchased from the supplier. The cost estimate allowed for the rotary air motor 104 is an estimate based on a review of the motor's use of materials, manufacturing methods and assembly processes. The Air fuel tank 106 and the CNG tank 112 are created from carbon fiber tube 116 with a filament winding. The jet burner unit 110 consists of: an exhaust tube 124, a burner jet 126, a base 298, burner housing 300, a safety valve 302, a diversion valve 304, a silicon manifold 306, and some connection pipes 308. The plastic exhaust tube 124 is injection molded, the brass burner jet 126 is machined, and the base 298 is cast out of cast iron. The rest of the components in this unit can be outsourced. The injection molding process is used to manufacture the parts in the HVAC unit 128, that is, the top and bottom housings 300, the dividing valves 304, cabin air ducting 310, and a fan housing 312. The detailed calculations on the compressed air tank 106, the CNG tank 112, and the HVAC unit 128 can be found in the Powertrain section.

Manufacturing Processes

Materials and technologies employed in automobiles reflect the available state-of-the-art. The material or method chosen is the one that best suits a given set of demands. The properties of individual materials show a significant difference in weight, strength, and cost. Steadily rising demands for safety and expected comfort, increasingly lead to lightweight design; and therefore to appreciably greater application of plastics and lightweight alloys. Some of the manufacturing techniques are described in more detail in some of the other system sections.

Resin Transfer Molding (RTM)

Figure 74:
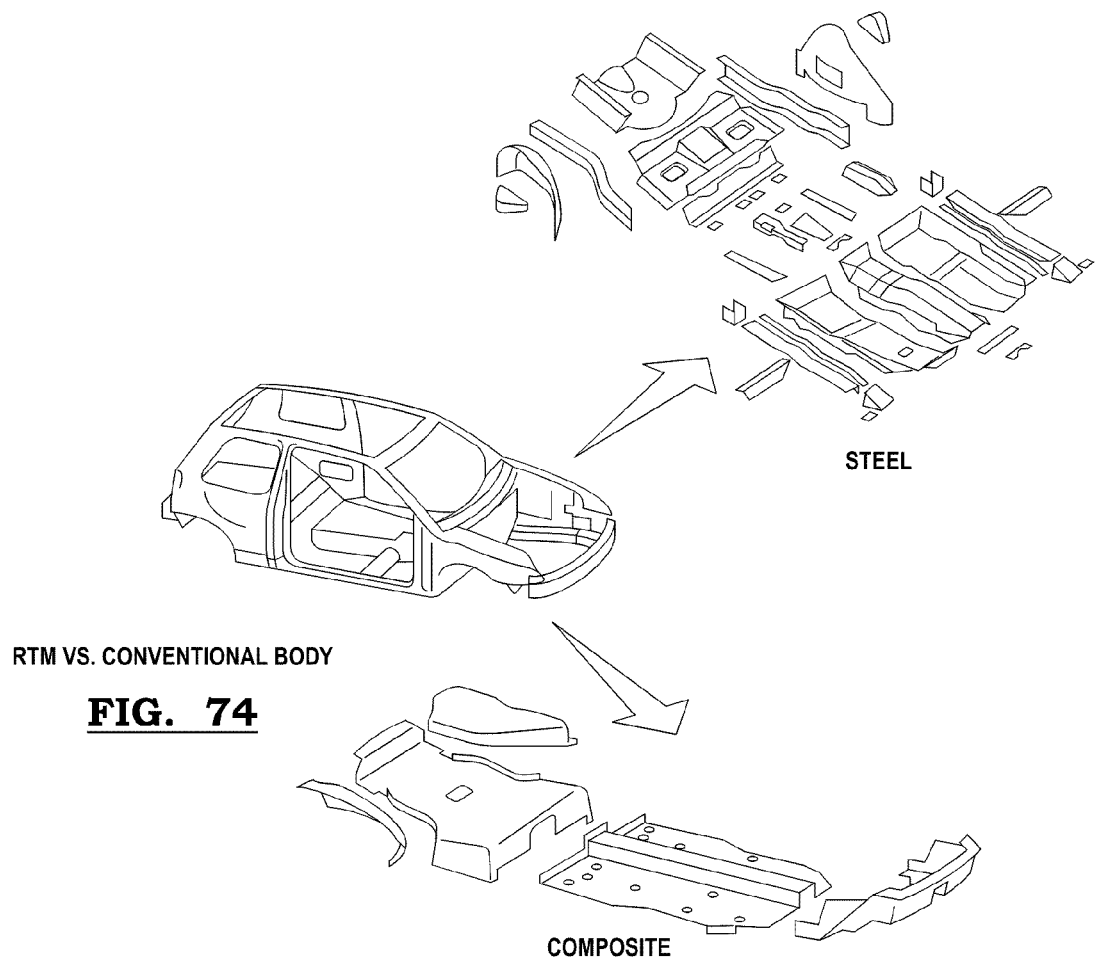
FIG. 74 is a schematic view illustrating the parts in a RTM versus a conventional body.

One feature of RTM is the complete integration of the reinforcement within the composite, such that all the air is removed from the mold. This leaves no dry patches in the cavity. RTM has been recognized as a useful fabrication method for large area panels, often relying upon vacuum assistance for reinforcement compaction and mold clamping in the automotive industry. The success of RTM has been attributed to greater flexibility in part design, with more emphasis on component recyclability and the reduction of emissions. Due to high volume of materials involved in automotive industry, the RTM material costs are very low, ranging typically from 20-30%, relative to a figure two or three times larger for a simple stamping or assembly. This is partly attributable to the smaller number of parts needed using RTM, than the larger number when using stamping (see FIG. 74).

Figure 75:
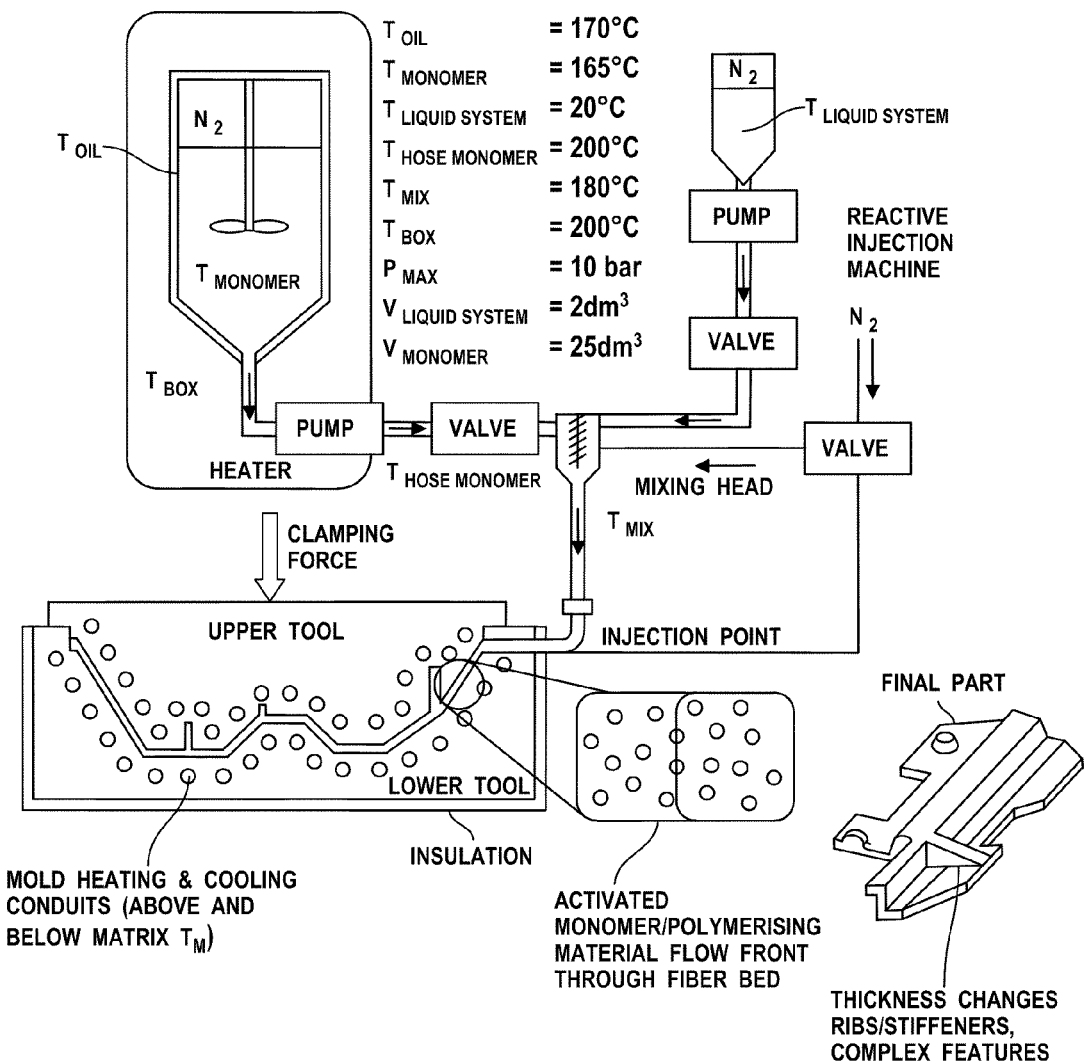
FIG. 75 is a schematic view illustrating the RTM process.

The RTM process uses a two sided mold set that forms both surfaces of the panel. The lower side is a rigid mold; the upper side can be rigid or flexible mold. The two sides fit together to produce a mold cavity. The distinguishing feature of RTM is that the reinforcement material is placed into this cavity and the mold set is closed prior to the introduction of matrix material. The details about the RTM process can be found in the Vehicle and Body Structure section and in FIG. 75.

Cycle Time: Thermoset resin transfer molding is a good technique for the automotive industry with an average cycle time of approximately 20 minutes. Parts manufactured using the RTM process are listed in FIG. 76.

Composite Layering Process

Figure 77:
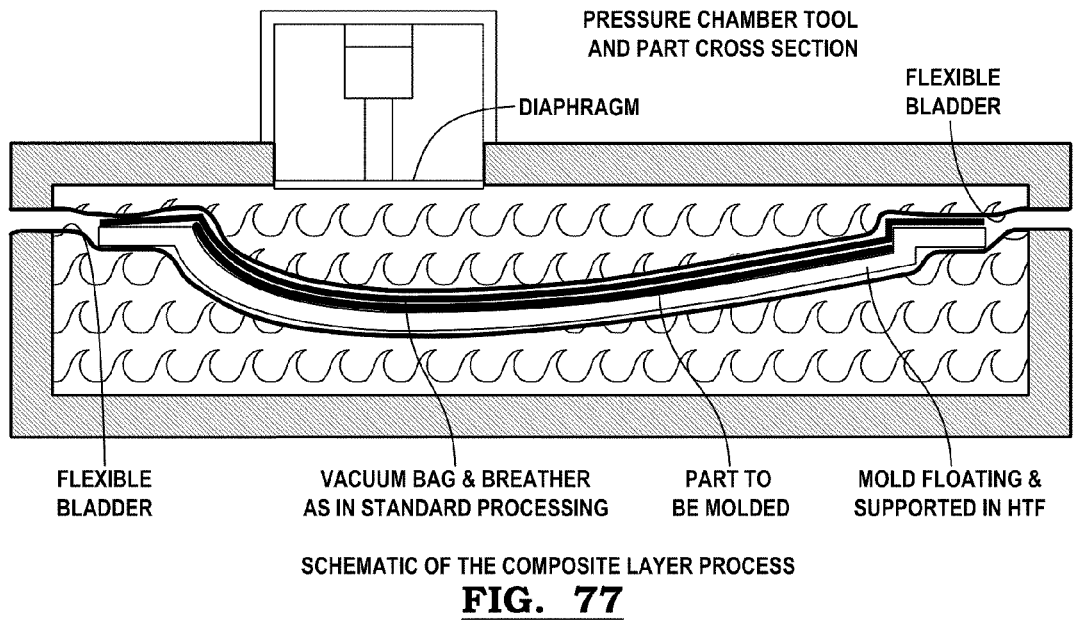
FIG. 77 is a schematic view of the composite layer process.

The composite layering process can be used in the out-of-autoclave manufacture of advanced composite materials, see FIG. 77. The composite layer process can be applied to the automotive industry, where strength and weight are important features. The composite layer process has reduced cycle time (relative to autoclaving) and product weight, as well as increasing strength and improving appearance. Moreover, it provides product properties superior to conventional curing techniques. The composite layer process data shows reductions of 50% to 90% over autoclave cycle times with high accuracy temperature control.

The component is first laid up by arranging prepreg plies on a mold tool, the mold will not be sturdy since it will be virtually floating in the heat transfer fluid. The next step is to cover the exposed side of the laminate with the vacuum bag and breather layer. The standard process then comes to an end as the mold tool is placed in a Composite layer machine. The component is placed under slight pressure achieved by using nitrogen gas to pressurize the contents of tanks containing the High Temperature Fluid (HTF). The pressure exerted against the bladder causes it to mate closely with the mold and confirm to its contours.

Cycle Time: Cure cycle times are expected to be between 40-60 minutes for most resin systems making a big saving over 4-8 hours typically required in an autoclave. The cycle time can be reduced to 20-30 minutes for a typical epoxy at 180° C. cycles.

The crash tubes 166 are manufactured by this technology using a carbon fiber epoxy composite. Compared to the conventional autoclave process for the similar part, the quick step process could make a saving of 65% on its tooling cost.

Roll Forming

Figure 78:
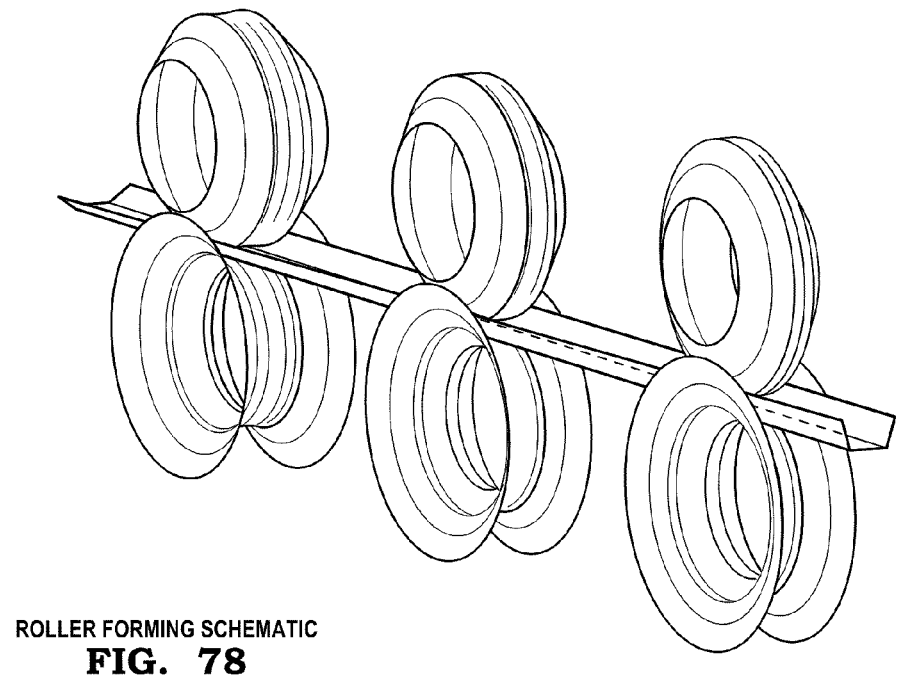
FIG. 78 is a schematic illustrating the bending forming process in roll forming.

Roll forming is a bending shape forming process where a long strip of metal (typically steel) is passed through a set of rolls or stands, see FIG. 78. The bending occurs gradually in several forming steps from an undeformed strip to a finished profile. Each step or stand continuously performs an incremental (low strain) part of the bend. A number of stands are used in the process until the desired cross section profile is obtained. Long length parts in large quantities are ideally best suited for the roll forming process. Continuous trimming and cutting operation with multiple configurations can be set up for roll forming lines to separate parts, which reduces time and cost of manufacturing.

This process is very beneficial due to the high speed in which complex profiles can be produced. High strength steel is the most common material to be roll formed. Moreover, roll forming is a low strain operation and enables profiles to be created on sheets with poor formability. For this reason, roll forming is seen as a potential process that can produce automotive parts out of Ultra High Strength Steels.

Cycle Time: The cycle time can be approximately calculated as 80 ft/min×60 min, that would be 4800 ft/hr. FIG. 79 lists parts manufactured using the Roll Forming process.

Stamping Process

The automotive stamping process is considered as the first step in the production of an automobile. In a stamping plant both internal and external parts can be produced. Stamping is a simple process where parts achieve their shape from forces applied through the die tooling. High volume sheet metal parts can be typically manufactured using the stamping process thus making them economical. The advantages of this process is that they provide suitability to produce small work pieces at a rapid rate and has the ability to save time and money by combining forming operations. Stamping also maintains close tolerances depending on the tool selected.

Cycle Time: The parts produced in an hour vary from 100 to 400 depending on the sheet thickness and the complexity of the part. FIG. 80 lists parts manufactured using a stamping process.

Casting

Casting is a versatile process for producing engineered metal parts by forcing molten metal by gravity or pressure into molds. Parts can be designed to produce a complex shape with high degree of accuracy and repeatability with smooth and textured surfaces. Casting is considered as a high volume mass production process. Casting provides complex shapes with closer tolerances than many other mass production processes. Little or no machining is required and thousands of identical castings can be produced before new tooling is required. Castings do not consist of separate parts nor are fastened together, the strength is that of the material rather than the joining process.

Cycle Time: The process consists of stages of clamping, injection, cooling, ejection and trimming. The total cycle time is very short typically between 2 sec to 5 min depending upon the geometry of the part. FIG. 81 lists parts manufactured by the injection molding process.

Injection Molding

Injection molding is the most commonly used manufacturing process for the fabrication of plastic parts. Parts can be manufactured which vary greatly in their shape, size, complexity and application. The process requires the use of an injection molding machine, raw plastic material and mold. Plastic is melted in the injection molding machine and then injected into the mold, where it cools down and solidifies into the final part. The cost of manufacturing depends on various factors such as number of cavities, size of parts, complexity of pieces, expected tool longevity and surface finish. The main advantages of injection molding are its ability to produce the parts in a fast paced environment, with very tight tolerance control, and the ability to produce the product in a variety of materials.

Figures 82, 83:
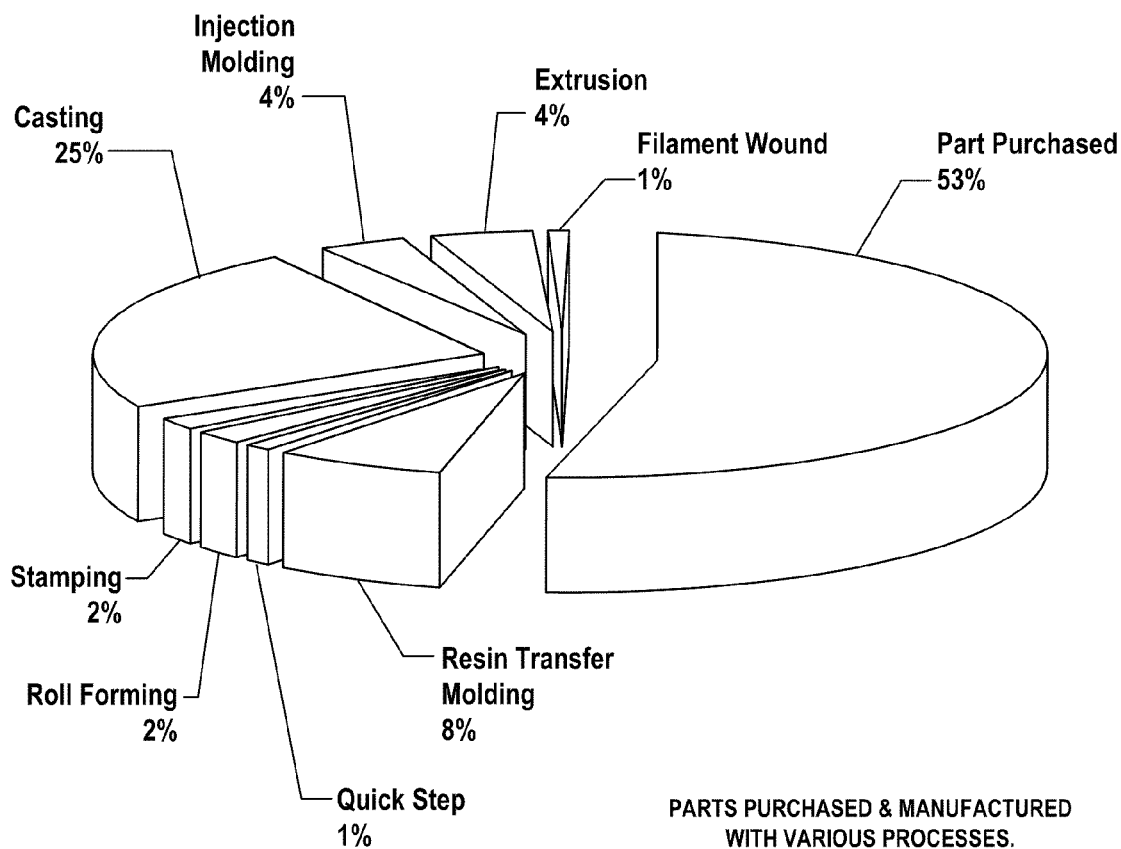
FIG. 82 is a table of Parts manufactured by the Injection Molding Process.
FIG. 83 is a pie chart illustrating parts purchased and manufactured with various processes.

Cycle Time: The process cycle for injection molding is very short typically between 2 sec to 2 mins. FIG. 82 lists parts manufactured by the injection molding process. FIG. 83 illustrates parts purchased and manufactured with various processes.

Life Cycle Assessment

This report will discuss the effects the pneumatic vehicle 100 may have on the environment. To assess the impact of this car 100 on the environment a number of tools/goals need to be considered which include:
 a life cycle assessment of the pneumatic vehicle 100,
 material selection for recyclability,
 manufacturing processes, and
 the carbon footprint of the pneumatic vehicle 100.

Vehicle as a Whole

The pneumatic vehicle 100 can be assembled in a plant similar to current practice. Alternatively, the vehicle 100 can be assembled, customized, inspected, serviced, exhibited, sold and financed at a common facility as depicted in FIG. 84. However, instead of welding the car's main structure (lower and upper vehicle 200, 198) a structural adhesive will be used. Answers.com defines a structural adhesive as "An adhesive capable of bearing loads of considerable magnitude; a structural adhesive will not fail when a bonded joint prepared from the thickness of metal, or other material typical for that industry, is stressed to its yield point." This implies that the joint will be as strong as a weld and not have the same stress concentration points as would occur if using a fastener.

Life of Vehicle

One advantage that the pneumatic vehicle 100 has is that it has almost zero operating emissions, the only emissions that will come from this vehicle 100 is from a small CNG heater 110 that will heat the air before it reaches the two hub motors 104. These two hub motors 104 (motors attached to the wheels 114) are powered by the heated compressed air. Therefore, there are very few harmful emissions emitted directly from this vehicle 100.

The car 100 may not emit many harmful substances but it still has to be refueled; this is done is using an air-compressor 314. There are two approaches to filling the pneumatic vehicle 100. In the first method, the user will be able to fill the pneumatic vehicle 100 at a filling station much like a petrol station except there will be a large compressor that will be able to fill the 65 liter air tank 106 in a minute. An efficient air compressor still uses energy to compress the gas and thus still makes a small impact on the environment but these emissions are significantly less than a standard petrol or diesel vehicle in two ways, firstly in the emissions from the pneumatic vehicle 100 directly ($CO_2$, $NO_2$, etc) and secondly the emissions and energy requirements made in the refining of the fuel do not exist as air does not have to be refined or purified before it goes into the tank 106. There are, obviously, no "secondary" emissions.

The second approach to refueling the pneumatic vehicle 100 is to refuel at home as illustrated in FIGS. 85*a* and 85*b*. The home compressors will not be as big as the petrol station one and therefore will take longer to refuel (4-6hrs). Some ideas have been put forward for future infrastructure to accommodate this vehicle 100. For example solar panels 316 could be installed on modern houses to offset the power requirements of the compressor 314 and the large quantities of heat generated by the compressors 314 will be used in a hot water heating system 318 to help heat the water for a house 320 thus making the overall efficiency and energy use less (see diagram below).

Other things that influence the environment during this stage are the maintenance and servicing of the pneumatic vehicle 100. As with all vehicles, the pneumatic vehicle 100 may require maintenance and repair to keep the pneumatic vehicle 100 operating smoothly and efficiently over its lifespan. Maintenance will involve the use of new spare parts which will have the same effects on the environment as making the part for the car 100 originally. Second hand or recycled parts are also able to be used in maintenance, these parts are better for the environment as they are not being remanufactured.

Disposal of oils (Das 2001) is often one of the biggest environmental problems in this stage. If oils are not disposed of properly they can contaminate soil and water. The pneumatic vehicle 100 reduces this problem significantly as it does not have as many types of oil or large quantities of oil. The only oils used in the pneumatic vehicle 100 may be a hydraulic brake fluid and a few other minor lubricants as opposed to the liters of oil often found in gear boxes and engine blocks of regular cars. This difference will make a large contribution to an environmentally safe pneumatic vehicle 100.

End-of-Life Vehicles (ELV)

The end-of-life vehicle or waste management stage considers what happens to the vehicle after is has served its useful life (once the car is more expensive to repair than it is worth). This stage is important environmentally because it decides what parts of the car can be reused, recycled and disposed of in landfills or incinerators. According to Das (2001) 24% of current vehicles end up in a landfill site.

When a vehicle has been written off it is taken to an auto disassembler; this is where the car is stripped of all its reusable parts. These parts are often refurbished and sold on the second hand parts market. According to Das (2001) " . . . this implies that for a disassembly activity to be profitable, the labor time, equipment needs, energy needs, skill needs, and space requirements must be relatively small." For this to happen Das (2001) suggests that when a car is designed it should be designed for disassembly; that is, designed to be pulled apart easily. If the car can be taken apart easily more people are likely to want to recycle the car and thus the recyclability of the car will go up.

Currently in the recycling of cars, the car is taken to an auto disassembler and all the parts that can be salvaged are removed. Once all the useful parts have been removed the car is crushed and sent to a shredder where it is shredded and separated into 3 different categories: ferrous materials, non-ferrous materials and fluff (rubber, glass and other materials that are difficult to separate).

The ferrous materials are separated using a magnet and sent to a steel recycling center where it is melted down with more original steel and re-used. Das (2001) implies that 25% of a new car is made from recycled steel.

The non-ferrous materials which are often aluminum, copper and nickel are sent to their relative recycling plants.

The fluff is usually disposed of in land fill sites because its composition changes from hour to hour.

One of the biggest advantages the pneumatic vehicle 100 has is its ease of disassembly. The hub motors 104 can be removed more easily than in a conventional combustion engine as they are connected to the wheels 114 and are easy to get to. In a conventional vehicle, the engine block is much larger and heavier and often needs special hoists to remove it as well as a special place to remove the engine to, so that the oils from the engine block do not contaminate the soil. The hub motors 104 will be able to be refurbished or used again.

The fuel tank 106 and air hoses 296 are easy to remove from the bottom of the pneumatic vehicle 100 and most of these parts can be refurbished and reused. Any parts that cannot be reused will have to go to a land fill site; this is because of the difficulty in recycling carbon fiber 116 (air cylinder 106) and rubber (air hoses). These materials are used because the weight and safety of a regular aluminum/steel cylinder are not adequate to keep the pneumatic vehicle 100 efficient on the compressed air.

The electric cables and electronic components can be pulled out of the dash board and reused or recycled depending on what they are. For example the copper in wires are often recycled and some batteries can be recycled or reused. The seats and can be pulled out of the pneumatic vehicle 100 easily and the air bladders 262 used in the seats 254 can be recycled along with the foam in the seats 254. The fabric 250 can be incinerated or placed in a land fill site.

The upper part 198 of the car 100 can then be separated from the lower 200 by using heat to remove the adhesive. Once the adhesive reaches a certain temperature, the upper and lower vehicle 198, 200 can be separated. The upper vehicle 198 can then be sent to the shredder and used for concrete filler. The lower vehicle 200 can have the last pieces of the interior and all suspension and steering components removed and reused/recycled. The rest of the lower vehicle 200 will be sent to the shredder so that the steel can be recycled.

The fluff in this pneumatic vehicle 100 will be reduced as the upper part 198 of the vehicle 100 can be separated easily from the lower part 200 by heating the adhesive that bonds the two surfaces. This will mean that the lower part 200 that will primarily be steel that can be sent off to the crusher and shredder; while the upper part 198 can be shredded and sent to a place to be used as filler in concrete or asphalt as it will be a homogenous materials of fiber glass.

Inventory Analysis Summary

FIG. 86 gives an estimate of the wastes produced by various raw materials from cradle to grave.

FIG. 87 indicates the environmental hazards that a generic vehicle will contribute to the environment over its life. As can be seen in the table, the most wastes that the car 100 contributes to the environment are in the fuel use column with carbons, sulphurs and nitrogens contributing the most. As the pneumatic vehicle 100 is powered by compressed air theses emissions will be significantly reduced. It will not reach zero as the compressor that is used to refuel the car 100 requires energy which in turn will emit some harmful substances.

As the car 100 is a lot smaller we should also see a small decrease across the board; lowering all the air, water and soil pollutants.

Impact Analysis

According to the ISO 14044 standard, impact analysis is the phase of life cycle analysis aimed at understanding and evaluating the magnitude and significance of the potential environmental impacts for a product system throughout the life of the product. That is to take the emissions that the vehicle will produce over its life and define what harm it can do to the environment. FIG. 88 gives all the relevant information on the emissions; this table was adapted from FIG. 87.

There are 4 mediums of pollution in this life cycle analysis (LCA) they are:
  Air—Emissions released into the air;
  Water—Emissions released into the water;
  Soil—Soil contaminated by pollutants;
  Energy—Energy requirements.

The 6 types of pollution are further categorized to a specific type of pollution, the 6 types are:
  Global Warming—Pollution that contribute to global warming;
  Acidification—Pollutants that contribute to acidification of air, water and soil;
  Nitrification—Pollutants that cause nitrification in the environment;
  Eco-toxicity—Pollutants that cause toxic effects on eco-systems;
  Human Toxicity—Cause toxic effect on humans;
  Resource Depletion—The effect on non-renewable resources.

The pneumatic vehicle 100 will have similar effects on the environment as a regular car 100 but in much smaller proportions. For instance the extracting and manufacturing stages will use far less materials as the car 100 is far smaller and lighter than current vehicles. The use stage will be significantly less, with almost negligible CO2, NO2, etc being emitted directly from the car 100; this means that this stage will be significantly less than a conventional car 100 operating today. The pneumatic vehicle 100 has also been designed for disassembly and recyclability with most of the car 100 being able to be recycled easily and effectively. Thus, the overall effect on the environment and carbon footprint of this car 100 will be significantly less than that of a current vehicle.

The pneumatic vehicle 100 has a maximum weight of 550 kg so it uses far less materials than a current small car; this means that every unit of the pneumatic vehicle 100 will have a smaller impact on the environment than most other vehicles.

According to the Australian government the use stage is the most harmful stage to the environment as this is where the most emissions come from, currently these include carbon, nitrogen and sulphur emissions (when burning fossil fuels). As the pneumatic vehicle 100 only has a small gas heater 110 to heat the compressed air before it reaches the hub motors 104, the amount of emissions is a fraction of a normal car. This should reduce the emission contributed by the car 100 by a large amount. To refuel this vehicle 100 an air compressor is utilized. The air compressor 314 will require some energy to refuel the car 100 however this is small compared to the amount of energy required to refine petrol from crude oil. The heat generated by the air compressor 314 at home can also be used to help warm water in a boiler 318. Thus the impact on the environment in the use stage is far less than the average car produces now.

Another relevant stage for the pneumatic vehicle 100 is the waste management stage. This stage is becoming increasingly more important as what we do with the cars 100 when their useful life is over also effects the environment. An important thing to consider when designing a car 100 today is to design it for disassembly. This means that the car 100 should be designed to be taken apart easily at a recycler so that they can easily remove parts to be refurbished and resold on the second hand market as well as easily remove the parts that are to be recycled. If a car 100 can be taken apart easily there is more incentive for the disassembler to recycle the car 100 as they are not spending large amounts of money in labor and time to process the car 100 for recycling. The pneumatic vehicle 100 has been designed so that it can be recycled more easily than a modern day car and it uses materials that cannot be recycled only where absolutely necessary, for example the carbon fiber filament winding 116 that is utilized for safety and strength on the air cylinder 106. By increasing the recyclability of the car 100, less will end up in a landfill and the eco-toxicity and human toxicity will be reduced.

In conclusion, the pneumatic vehicle 100 will have a far smaller impact on the environment than a conventional car today has in all aspects. This reduction in impact ranges from the amount of materials required to construct the car 100 (thus lower energy requirements required to make the car 100), all the way down to its high recyclability. See FIG. 88.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:
1. A pneumatic vehicle comprising:
  a first sub-assembly including a chassis, a pair of B-pillars, and a pair of rear rails to provide support for the vehicle body;

an air tank supported on the chassis, wherein the air tank is generally cylindrical and extends longitudinally and provides a load-bearing structural member in the chassis;

a second sub-assembly including at least a part of a vehicle body, the second sub-assembly being supported on the chassis;

a structural adhesive bonding the second sub-assembly to the first sub-assembly;

a first series of side support members connected to the air tank and extending laterally outboard from a first lateral side of the air tank;

a second series of side support members connected to the air tank and extending laterally outboard from a second lateral side of the air tank opposite of the first lateral side;

a first side panel connected to the first series of side support members at a lateral end thereof; and a second side panel connected to the second series of side support members at a lateral end thereof;

wherein each B-pillar extends upright from one of the side panels to provide support for the vehicle body; and wherein each rear rail extends upright and rearward from a rearward portion of one of the side panels, the rear rails providing support for a rear wheel, and the rear rails serving as C-pillars to provide support for the vehicle body.

2. The pneumatic vehicle of claim 1 wherein the air tank is formed from a composite material; and wherein the air tank further comprises a series of metal mounting rings, each ring bonded to the tank to provide mounting points for the side support members, the mounting rings removably attached to the side support members.

3. The pneumatic vehicle of claim 1 wherein the second sub-assembly further comprises:

a pair of A-pillars, each A-pillar extending upright and rearward; and a pair of roof rails each extending longitudinally from one of the A-pillars, the A-pillars and roof rails collectively providing support for the vehicle body.

4. The pneumatic vehicle of claim 3 wherein the A-pillars and roof rail are formed from a fiber composite material with the fibers of the composite generally oriented in the direction of a vehicle impact load path.

5. The pneumatic vehicle of claim 4 wherein the fiber composite material is further defined as a glass fiber reinforced thermoset plastic.

6. The pneumatic vehicle of claim 3 wherein the second sub-assembly further comprises a unitary roof and windshield assembly formed from a single sheet of a high impact strength thermoplastic polymer and their derivatives, the roof and windshield assembly being bonded to the A-pillar and roof rails using the structural adhesive.

7. The pneumatic vehicle of claim 6 wherein the impact resistant thermoplastic polymer is further defined as a polycarbonate.

8. The pneumatic vehicle of claim 1 wherein the second sub-assembly further comprises:

a bumper panel mounted to the chassis and extending transversely across the forward portion of the vehicle; and a pair of front fender panels, each extending rearward from the bumper panel on the outboard sides of the vehicle to provide a pair of front wheel arches, the pair of front fender panels bonded to the bumper panel to define an opening for the hood.

9. The pneumatic vehicle of claim 1 wherein the second sub-assembly further comprises a pair of rear quarter panels and a back panel formed integrally into a aft panel, the aft panel being sized to fit over a rear structure of the vehicle as one component, the aft panel extending transversely across the rear of the vehicle and forward on both outboard sides of the vehicle to provide a rear wheel opening.

10. The pneumatic vehicle of claim 9 wherein the aft panel is formed from a glass fiber reinforced thermoset plastic providing structural integrity.

11. The pneumatic vehicle of claim 1 further comprising:

a vehicle seat including an upper and lower frame, both of the frames molded from a fiber composite material, the upper and lower frame rotatably connected to one another such that the upper frame is configured to selectively fold into a flat position;

an air bladder system with a plurality of air bladders, the bladders bonded to the vehicle seat; and a pressure controller and selector valve to adjust the bladders.

12. The pneumatic vehicle seat of claim 11 wherein the fiber composite material is defined as a glass fiber reinforced thermoset plastic.

13. A pneumatic vehicle comprising:

a first sub-assembly including a chassis, an air tank, and at least a part of a vehicle body;

a pair of B-pillars in the first sub-assembly extending upright from the chassis to provide support for the vehicle body;

a pair of rear rails in the first sub-assembly extending upright and rearward from the rearward portion of the chassis to provide support for a rear wheel and to support the vehicle body as C-pillars;

a second sub-assembly including at least another part of the vehicle body;

a pair of A-pillars in the second sub-assembly, the A-pillars extending upright to provide support for the vehicle body; and a pair of roof rails in the second sub-assembly, the roof rails extending from the A-pillars to provide support for the roof of the vehicle.

14. The pneumatic vehicle of claim 13 further comprising a structural adhesive for bonding the B-pillars and rear rails of the first sub-assembly to the roof rails of the second sub-assembly, and for bonding the A-pillars of the second sub-assembly to the chassis of the first sub-assembly.

15. The pneumatic vehicle of claim 14 wherein the air tank is attached to the chassis and the air tank is structurally integrated into the chassis.

* * * * *